(12) United States Patent
Watanebe et al.

(10) Patent No.: US 7,817,347 B2
(45) Date of Patent: Oct. 19, 2010

(54) ZOOM LENS AND IMAGING APPARATUS INCORPORATING THE SAME

(75) Inventors: Masahito Watanebe, Shibuya-ku (JP); Tomoyuki Satori, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 104 days.

(21) Appl. No.: 12/229,743

(22) Filed: Aug. 25, 2008

(65) Prior Publication Data

US 2009/0103187 A1    Apr. 23, 2009

(30) Foreign Application Priority Data

Aug. 30, 2007    (JP) .............................. 2007-224240

(51) Int. Cl.
   *G02B 15/14*    (2006.01)
(52) U.S. Cl. ...................................... 359/687; 359/684
(58) Field of Classification Search ................. 359/684, 359/685, 686, 687

See application file for complete search history.

(56) References Cited

U.S. PATENT DOCUMENTS

| 6,606,200 | B1 | 8/2003 | Nakayama et al. |
| 7,466,496 | B2 * | 12/2008 | Hoshi .......................... 359/687 |
| 7,554,746 | B2 * | 6/2009 | Ohashi ........................ 359/687 |
| 7,609,456 | B2 * | 10/2009 | Saori ........................... 359/687 |
| 2006/0098301 | A1 | 5/2006 | Miyajima |

FOREIGN PATENT DOCUMENTS

| JP | 8-271788 | 10/1996 |
| JP | 11-052244 | 2/1999 |
| JP | 2006-171055 | 6/2006 |

* cited by examiner

*Primary Examiner*—David N Spector
(74) *Attorney, Agent, or Firm*—Kenyon & Kenyon LLP

(57) ABSTRACT

The invention relates to a zoom lens and an imaging apparatus incorporating the same, and more particularly to a zoom lens of small format that lends itself to imaging apparatus inclusive of video cameras and digital cameras. The zoom lens comprises, in order from its object side, a first lens group G1 of positive refracting power, a second lens group G2 of negative refracting power and a third lens group G3 of positive refracting power. Zooming is implemented by changing the space between the respective lens groups. The first lens group G1 comprises one negative lens and one positive lens in order from the object side. The zoom lens satisfies conditions (1) and (2):

$$5.0 < f_t/f_w < 50.0 \quad (1)$$

$$1.4 < N_{d1p} < 1.7 \quad (2)$$

where $f_w$ is the focal length of the whole zoom lens system at a wide-angle end, $f_t$ is the focal length of the whole zoom lens system at a telephoto end, and $N_{d1p}$ is the d-line refractive index of the positive lens in the first lens group.

25 Claims, 23 Drawing Sheets

ZOOM LENS AND IMAGING APPARATUS INCORPORATING THE SAME

This application claims benefit of Japanese Application No. 2007-224240 filed in Japan on Aug. 30, 2007, the content of which are incorporated by this reference.

BACKGROUND OF THE INVENTION

The present invention relates generally to a zoom lens and an imaging apparatus incorporating the same, and more particularly to a zoom lens of small format that lends itself to imaging apparatus inclusive of video cameras and digital cameras.

In recent years, imaging apparatus such as digital cameras designed to take images of subjects using solid-state imaging devices such as CCDs or CMOSs have became mainstream in place of silver-halide film cameras. Further, they have now a wide spectrum of categories from the commercial high-end type to the compact low-end type.

The present invention gives weight to the compact low-end type category in particular. Users of such low-end type digital cameras would enjoy snapping shots over a wide range of scenes at anytime in anyplace. For this reason, preference is given to small-format digital cameras, especially of the type that can be well put away in the pockets of clothing or baggage, is convenient to carry around, and is slimmed down in their thickness direction, and there is a mounting demand for size reductions of taking lens systems, too.

On the other hand, as the pixels of imaging devices are now on the increase, there is an increasing demand for higher optical performance keeping pace with a lot more pixels. Further, to make sure mass productivity, it is required to minimize the sensitivity of optical performance deterioration to production errors in the process, of processing and assembling lenses. From the point of view of making taking ranges wide, high zooming lenses having zoom ratios exceeding 5 or 7, too, are generally available; much higher zoom ratios are expected, and so are wider-angle arrangements.

To meet such demands, there are now various types of zoom lenses proposed in the art. Among prior zoom lenses having relatively high zoom ratios and compact format, there is a type comprising, in order from its object side, a first lens group of positive refracting power, a second lens group of negative refracting power, a third lens group of positive refracting power and a fourth lens group of positive refracting power, as set forth in the following patent publications 1, 2 and 3.

[Patent Publication 1]
JP(A)2006-171055
[Patent Publication 2]
JP(A)11-52244
[Patent Publication 3]
JP(A)8-271788

Problems with the zoom lenses put forward in Patent Publications 1, 2 and 3 are, however, that as their total lens length gets short at increased zoom ratios, the effect of surface precision to aberration properties grows too large, resulting in difficulty with which lenses are processed, and an increase in lens fabrication costs.

Having being accomplished in view of such problems, the present invention has for its object to provide a zoom lens the total length of which is curtailed at increased zoom ratios, thereby reducing the ensuing effect of surface precision with good enough aberration properties, and an imaging apparatus incorporating the same.

SUMMARY OF THE INVENTION

According to the invention, the aforesaid object is accomplishable by the provision of a zoom lens comprising, in order from an object side thereof, a first lens group of positive refracting power, a second lens group of negative refracting power and a third lens group of positive refracting power, wherein zooming is implemented by changing the spacing between the respective lens groups, and said first lens group consist of, in order from the object side, one negative lens and one positive lens, with the satisfaction of the following conditions:

$$5.0 < f_t/f_w < 50.0 \quad (1)$$

$$1.4 < N_{d1p} < 1.7 \quad (2)$$

where $f_w$ is the focal length of the whole zoom lens system at a wide-angle end, $f_t$ is the focal length of the whole zoom lens system at a telephoto end, and $N_{d1p}$ is the d-line refractive index of the positive lens in the aforesaid first lens group.

The requirements for, and the advantages of, such arrangement are now explained.

In the invention, the zoom lens comprises, in order from the object side, a first lens group of positive refracting power, a second lens group of negative refracting power and a third lens group of positive refracting power, and implements zooming by changing the spacing between the respective lens groups. Such arrangement permits the zoom function to be shared between the respective lens groups, and prevents an increase in the amounts of movement of the respective lens groups while minimizing aberration fluctuations during zooming, leading to a decrease in the size of the optical system. The location of one negative lens and one positive lens in the first lens group ensures good correction of aberrations.

As the upper limit to condition (1) is exceeded, it renders it difficult for the inventive arrangement to make sure sufficient optical performance. As the lower limit to condition (1) is not reached, the merit of the inventive arrangement in terms of size and cost is no longer obtained, because the object of the invention is achievable even with a simpler arrangement.

More preferably, condition (1) should be satisfied:

$$8.0 < f_t/f_w < 30.0 \quad (1)$$

Most preferably, condition (1) should be satisfied:

$$9.5 < f_t/f_w < 20.0 \quad (1)$$

To develop a small-format, high-zooming zoom lens that is easy to manufacture, the material for the positive lens in the first lens group should be selected in such a way as to satisfy condition (2). It is then possible to minimize deterioration of the performance due to fabrication errors from the lens surface shape in the first lens group.

Abiding by the upper limit of condition (2) provides an arrangement preferable for fabrication because of minimizing fabrication errors from the surface shape of the positive lens in the first lens group. Abiding by the lower limit of condition (2) makes sure availability of vitreous material and so prevents cost increases and facilitates mass fabrication.

More preferably, condition (2) should be satisfied:

$$1.42 < N_{d1p} < 1.65 \quad (2)$$

Most preferably, condition (2) should be satisfied:

$$1.45 < N_{d1p} < 1.6 \quad (2)$$

Furthermore, the invention as described above should preferably satisfy any one of the following requirements.

Preferably, the image-side surface in the first lens group should be configured in aspheric form having positive power becoming weak with a distance from an optical axis. It is then possible to minimize spherical aberrations and coma produced at the first lens group. It is here noted that the aforesaid arrangement renders distortion at the wide-angle end likely to grow large. However, this arrangement for the first lens group makes the most of its merit of achieving compactness when used with an electronic imaging apparatus designed to store distortion correction data for each zoom position and produce images with distortion reduced by image processing.

It is preferable to satisfy the following condition:

$$0.8 < ((R_{pr}+R_{pf})/(R_{pr}-R_{pf})+1)/N_{d1p} < 1.4 \quad (3)$$

where $R_{pr}$ is the radius of curvature of the image-side surface of the positive lens in the aforesaid first lens group, $R_{pf}$ is the radius of curvature of the object-side surface of the positive lens in the aforesaid first lens group, and $N_{d1p}$ is the d-line refractive index of the positive lens in the aforesaid first lens group.

To, during zooming, implement well-balanced correction of field curvature at the wide-angle end and coma at the telephoto end, it is preferable for the first lens group to have a −+ construction from the object side and satisfy the aforesaid condition, because various off-axis aberrations can be held back in a well-balanced state all over the zoom range. Most preferably, the positive lens in the first lens group should be configured in double-convex form having a larger radius of curvature on the image-plane side, because various off-axis aberrations can be minimized in a well-balanced state all over the zoom range.

Abiding by the upper limit of condition (3) makes sure the positive lens in the first lens group has power on the image plane side and the zoom lens has a large zoom ratio. Abiding by the lower limit of condition (3) enables the image plane-side power of the positive lens in the first lens group to diminish, and holds back axial field curvature and chromatic aberrations. It is also preferable for making sure the edge thickness of the positive lens in the first lens group.

More preferably, condition (3) should be satisfied:

$$1.0 < ((R_{pr}+R_{pf})/(R_{pr}-R_{pf})+1)/N_{d1p} < 1.3 \quad (3)$$

Most preferably, condition (3) should be satisfied:

$$1.1 < ((R_{pr}+R_{pf})/(R_{pr}-R_{pf})+1)/N_{d1p} < 1.2 \quad (3)$$

The negative and positive lenses in the first lens group may be cemented together. This allows for effective correction of axial chromatic aberration apt to become a problem when the focus length grows long at the telephoto end due to an increased zoom ratio. Further, it is possible to hold back deterioration of the optical performance from lens relative decentration due to assembly errors, contributing to yield improvements and cost decreases.

Alternatively, the negative and positive lenses in the first lens group may comprise independent lens components. This allows for more effective correction of distortion and coma at the wide-angle end, and coma at the telephoto end.

To keep the whole length of the zoom lens short at a long focus length at the telephoto end, the first lens group must have strong power. To correct aberrations from positive power, the negative lens must have a relatively high power, too; however, the radius of curvature of the negative lens is likely to become small. In the first lens group having positive refracting power, the negative lens is usually located on a high dispersion side for the need of correction of chromatic aberrations.

As the radius of curvature of the negative lens decreases, there is the likelihood of higher-order chromatic aberration of magnification. In particular, there is higher-order chromatic aberration of magnification produced under the influences of that high dispersion to such an extent that its amount exceeds that of chromatic aberrations produced from the positive lens, giving rise to some considerable deterioration of the quality of taken images. The more off the optical axis, the more that amount is, and the wider the angle of view at the wide-angle end, the more its influences show up: it is difficult to balance axial chromatic aberrations at the telephoto end against chromatic aberration of magnification.

For this reason, it is of vital importance to properly select the vitreous material for the negative lens in the first lens group. Specifically, it is preferable for the vitreous material for the negative lens in the first lens group to satisfy the following conditions (4) and (5):

$$1.99 < N_{d1n} < 2.3 \quad (4)$$

$$13.0 < \nu_{d1n} < 35.0 \quad (5)$$

$$0.02 < d_{1n}/d_{1p} < 0.35 \quad (6)$$

where $N_{d1n}$ is the d-line refractive index of the negative lens in the aforesaid first lens group, $\nu_{d1n}$ is the Abbe constant of the negative lens in the aforesaid first lens group, $d_{1n}$ is the axial thickness of the negative lens in the aforesaid first lens group, and $d_{1p}$ is the axial thickness of the positive lens in the aforesaid first lens group.

Abiding by the upper limit of condition (4) makes sure availability of vitreous material, averts cost increases, and allows for easy mass fabrication. Abiding by the lower limit of condition (4) prevents the radius of curvature of the negative lens from getting small, and holds back the occurrence of off-axis chromatic aberration of magnification. It also makes sure the negative lens has negative power, working for correction of spherical aberrations, coma and other aberrations produced at the positive lens.

More preferably, condition (4) should be satisfied:

$$2.04 < N_{d1n} < 2.25 \quad (4)$$

Most preferably, condition (4) should be satisfied:

$$2.08 < N_{d1n} < 2.20 \quad (4)$$

Further, condition (4) may be satisfied:

$$1.92 < N_{d1n} < 2.3 \quad (4)$$

Furthermore, condition (4) may be satisfied:

$$1.94 < N_{d1n} < 2.3 \quad (4)$$

Abiding by the upper limit of condition (5) allows for an arrangement preferable for correction of axial chromatic aberration. Abiding by the lower limit of condition (5) is preferable for prevention of the partial dispersion ratio of the vitreous material from growing high, holding back the occurrence of chromatic aberrations on a short wavelength side, and correction of secondary spectral correction of chromatic aberrations.

More preferably, condition (5) should be satisfied:

$$14.0 < \nu_{d1n} < 32.0 \quad (5)$$

Most preferably, condition (5) should be satisfied:

$$15.0 < \nu_{d1n} < 30.0 \quad (5)$$

For such reasons as described above, if conditions (4) and (5) are satisfied, then it is possible to easily achieve a small-format, high-zooming optical system that has improved optical performance.

Condition (6) is to implement well-balanced correction of chromatic aberration of magnification and axial chromatic aberration at the telephoto end. Abiding by the upper limit of condition (6) allows for an arrangement preferable for averting overcorrection of chromatic aberration of magnification, and correction of axial chromatic aberration at the telephoto end. Abiding by the lower limit of condition (6) allows for an arrangement for averting overcorrection of axial chromatic aberration at the telephoto end, and correction of chromatic aberration of magnification as well. It prevents the negative lens from running short of strength, and facilitates lens fabrication.

More preferably, condition (6) should be satisfied:

$$0.03 < d_{1n}/d_{1p} < 0.30 \quad (6)$$

Most preferably, condition (6) should be satisfied:

$$0.04 < d_{1n}/d_{1p} < 0.25 \quad (6)$$

The negative lens in the first lens group may as well be configured in meniscus form convex on its object side. It is then possible to decrease the angle of incidence of off-axis rays on the lens surface, thereby minimizing the aberrations produced.

It is then preferable to satisfy the following condition (7):

$$-15.0 < (R_{nr} + R_{nf})/(R_{nr} - R_{nf}) < -1.0 \quad (7)$$

where $R_{nr}$ is the radius of curvature of the image plane-side of the negative lens in the aforesaid first lens group, and $R_{nf}$ is the radius of curvature of the object side of the negative lens in the aforesaid first lens group.

Abiding by the upper limit of condition (7) is preferable for holding back the occurrence of higher-order chromatic aberrations with no need of extremely reducing the radius of curvature of both lens surfaces to maintain the negative power. Abiding by the lower limit of condition (7) provides an arrangement for making sure the negative lens has negative power so that aberrations from the positive lens in this group can be fully canceled out.

More preferably, condition (7) should be satisfied:

$$-12.0 < (R_{nr} + R_{nf})/(R_{nr} - R_{nf}) < -4.0 \quad (7)$$

Most preferably, condition (7) should be satisfied:

$$-9.3 < (R_{nr} + R_{nf})/(R_{nr} - R_{nf}) < -7.5 \quad (7)$$

With the first lens group comprising two lenses, it is preferable for the first lens group to have as high a refractive index as possible and for an Abbe constant difference between the negative lens and the positive lens to be as large as possible, because monochromatic aberrations and chromatic aberrations are reduced while allowing the first lens group to have a relatively strong positive power, thereby obtaining good enough aberration performance. To this end, it is preferable to satisfy the following conditions (8) and (9) with respect to the vitreous material for the negative and positive lenses:

$$0.20 < N_{d1n} - N_{d1p} < 0.70 \quad (8)$$

$$35 < \nu_{d1p} - \nu_{d1n} < 80 \quad (9)$$

where $N_{d1n}$ is the d-line refractive index of the negative lens in the aforesaid first lens group, $\nu_{d1n}$ is the Abbe constant of the negative lens in the aforesaid first lens group, $N_{d1p}$ is the d-line refractive index of the positive lens in the aforesaid first lens group, and $\nu_{d1p}$ is the Abbe constant of the positive lens in the aforesaid first lens group.

Abiding by the upper limit of condition (8) provides an arrangement preferable for keeping the refractive index of the positive lens from going down and the radius of curvature of the lens surface from getting small, thereby holding back the occurrence of coma that is likely to occur at the telephoto end in particular. Abiding by the lower limit of condition (8) provides an arrangement preferable for preventing the refractive index of the positive lens in the first lens group from growing too high, thereby making sure an Abbe constant difference between the positive lens and the negative lens and so implementing good enough correction of chromatic aberrations.

More preferably, condition (8) should be satisfied:

$$0.30 < N_{d1n} - N_{d1p} < 0.65 \quad (8)$$

Most preferably, condition (8) should be satisfied:

$$0.40 < N_{d1n} - N_{d1p} < 0.60 \quad (8)$$

Abiding by the upper limit of condition (9) provides an arrangement preferable for preventing the refractive index of the positive lens from going down and so preventing the radius of curvature of the lens surface from getting small, thereby holding back the occurrence of coma that is likely to occur at the telephoto end in particular. As the radius of curvature of the lens surface grows large, it gives rise to excessive coma at the telephoto end in particular. Abiding by the lower limit of condition (9) provides an arrangement preferable for preventing the refractive index of the positive lens in the first lens group from growing too high, thereby making sure an Abbe constant difference between the positive lens and the negative lens and so implementing good enough correction of chromatic aberrations.

More preferably, condition (9) should be satisfied:

$$37 < \nu_{d1p} - \nu_{d1n} < 75 \quad (9)$$

Most preferably, condition (9) should be satisfied:

$$40 < \nu_{d1p} - \nu_{d1n} < 70 \quad (9)$$

The inventive zoom lens should preferably satisfy the following condition with respect to the power of the first lens group:

$$0.2 < f_1/f_t < 1.0 \quad (10)$$

where $f_1$ is the focal length of the aforesaid first lens group, and $f_t$ is the focal length of the whole zoom lens system at the telephoto end.

Abiding by the upper limit of condition (10) is preferable for keeping the power of the first lens group from getting small and shortening the total length of the whole zoom lens system, thereby reducing the size of the lens barrel. Abiding by the lower limit of condition (10) is preferable for preventing the power of the first lens group from growing too strong and holding back the occurrence of spherical aberrations and coma at the telephoto end, thereby making sure good enough optical performance.

More preferably, condition (10) should be satisfied:

$$0.5 < f_1/f_t < 0.8 \quad (10)$$

Most preferably, condition (10) should be satisfied:

$$0.6 < f_1/f_t < 0.75 \quad (10)$$

The inventive zoom lens may as well satisfy the following condition with respect to the focal length of the second lens group:

$$-0.5 < f_2/f_t < -0.05 \quad (11)$$

where $f_2$ is the focal length of the aforesaid second lens group, and $f_t$ is the focal length of the whole zoom lens system at the telephoto end.

This condition is about the balance between size reductions and aberration performance. Abiding by the upper limit of condition (11) provides an arrangement preferable for preventing the power of the second lens group from growing too strong and holding back the occurrence of various off-axis aberrations at the wide-angle end and spherical aberrations at the telephoto end. Abiding by the lower limit of condition (11) is preferable for preventing the power of the second lens group from getting too weak and reducing the size of the whole lens system.

More preferably, condition (11) should be satisfied:

$$-0.2 < f_2/f_t < -0.10 \quad (11)$$

Most preferably, condition (11) should be satisfied:

$$-0.15 < f_2/f_t < -0.13 \quad (11)$$

The inventive zoom lens system may as well be of a four-group arrangement comprising, in order from its object side, a first lens group of positive refracting power, a second lens group of negative refracting power, a third lens group of positive refracting power and a fourth lens group of positive refracting power. The location of the fourth lens group of positive refracting power on the image plane side of the third lens group makes it easy to locate an exit pupil at a far position, and can reduce a decrease in rim light due to compatibility with an imaging device.

Referring to the zooming operation from the wide-angle end to the telephoto end of a zoom lens optical system comprising four lens groups with an aperture stop located in place, it is preferable that the first lens group moves such that it is positioned more on the object side at the telephoto end than at the wide-angle end; the second lens group moves; the third lens group moves such that it is positioned more on the object side at the telephoto end than at the wide-angle end; the fourth lens group moves; the fourth lens group moves; and the aforesaid aperture stop moves. In this case, the first lens group may move toward the object side alone or toward the object or image side in a convex locus; the second lens group may move toward the object side alone or toward the object or image side in a convex locus; the third lens group may move toward the object side alone or toward the object side in a convex locus; and the fourth lens group may move such that it is positioned more on the object or image side at the telephoto end than at the wide-angle end, or toward the object or image side monotonously or in a convex locus.

Alternatively, the inventive zoom lens may just as well be of a five-group arrangement comprising, in order from the object side, a positive first lens group, a negative second lens group, a positive third lens group, a negative fourth lens group and a positive fifth lens group. Referring to the zooming operation from the wide-angle end to the telephoto end of a zoom lens optical system further comprising an aperture stop, it is preferable that the first lens group moves such that it is positioned more on the object side at the telephoto end than at the wide-angle end; the second lens group moves; the third lens group moves such that it is positioned more on the object side at the telephoto end than at the wide-angle end; the fourth lens group moves; the fifth lens group moves; and the aforesaid aperture stop moves.

In that case, the first lens group may move toward the object side alone or toward the object or image side in a convex locus; the second lens group may move toward the object side alone or toward the object or image side in a convex locus; the third lens group may move toward the object side alone or toward the object or image side in a convex locus; the fourth lens group may move toward the object side alone or toward the object or image side in a convex locus; and the fifth lens group may move such that it is positioned more on the object or image side at the telephoto end than at the wide-angle end, or toward the object or image side monotonously or in a convex locus.

Preferably, the aperture stop and a shutter unit are located between the second lens group and the third lens group, and they move in unison with the third lens group during zooming. This enables the entrance pupil to be positioned at a position near to the object side, and the exit pupil to be away from the exit plane. The position where these components are located is also where the height of off-axis rays goes down: the shutter unit is prevented from getting bulky, and there is a decrease in the dead space in moving the aperture stop and shutter unit. By moving all the lens groups in this way, the zoom function can be effectively shared between the respective lens groups, and even a wide-angle, high-zoom arrangement can perform better. By the movement of the aperture stop, not only is it possible to improve performance by effective correction of chromatic aberration of magnification and distortion, but it is also possible to gain proper control of both the entrance pupil position and the exit pupil position. More specifically, it is possible to attain a sensible balance between the heights of off-axis light beams at the wide-angle end and the telephoto end: the outer diameter of the first lens group and the outer diameter of the lens group located nearest to the image side can be kept compact in a well-balanced state. Reducing the outer diameter of the first lens group at the wide-angle end in particular would lead to a reduction in the size of the zoom lens in the thickness direction. It is also possible to control the zoom lens such that there is a decrease in fluctuations of the exit pupil position during zooming: it is possible to maintain the angle of incidence of light rays on a CCD, CMOS or the like in a suitable range, thereby getting around shading at the corners of the screen and, hence, using the zoom lens with an electronic imaging apparatus.

The inventive zoom lens should preferably be composed of a total of up to 9 lenses. A lot more lenses give rise to increases in the size and cost of the zoom lens system.

By the incorporation of an imaging device adapted to covert an image formed through the zoom lens into electric signals, it is possible to provide an electronic imaging apparatus that satisfies the requirements for size reductions, high zoom ratios and a wide-angle arrangement, and allows to the quality of taken images to be well and easily maintained.

The inventive zoom lens should preferably satisfy the following condition:

$$0.5 < I_{mw}/f_w < 1.0 \quad (12)$$

where $I_{mw}$ is an image height at the wide-angle end, and $f_w$ is the focal length of the whole zoom lens system at the wide-angle end.

As the upper limit of condition (12) is exceeded, it is difficult to make sure sufficient optical performance with the inventive arrangement. As the lower limit of condition (12) is not reached, the inventive arrangement can no longer make the most of its own merit of achieving size and cost reductions, because the object of the invention is accomplishable even with a simpler arrangement.

More preferably, condition (12) should be satisfied:

$$0.6 < I_{mw}/f_w < 0.95 \quad (12)$$

Most preferably, condition (12) should be satisfied:

$$0.7 < I_{mw}/f_w < 0.8 \quad (12)$$

The inventive zoom lens should preferably satisfy the following condition with respect to its total length.

$$5.0 < L_t/I_{mw} < 17.5 \quad (13)$$

where $L_t$ is the total length of the whole zoom lens system at the telephoto end, and $I_{mw}$ is an image height at the wide-angle end.

Abiding by the upper limit of condition (13) provides an arrangement preferable for preventing the total length of the lens system from getting long, thereby making the size of the lens barrel small upon received at a lens mount. Abiding by the lower limit of condition (13) works favorably for preventing the power of each lens group from growing too strong, thereby reducing the amount of various aberrations produced.

More preferably, condition (13) should be satisfied:

$$8.0 < L_t/I_{mw} < 16.8 \quad (13)$$

Most preferably, condition (13) should be satisfied:

$$14.0 < L_t/I_{mw} < 16.0 \quad (13)$$

It is also preferable to have an image transformation block wherein electric signals containing distortion from the zoom lens are transformed into image signals with distortion corrected by image processing. The toleration of the distortion from the zoom lens would work more for a decrease in the number of lenses and its size reductions.

Furthermore, it is preferable to have an image transformation block wherein image processing is applied to electric signals containing distortion from the zoom lens, thereby implementing distortion correction with a value changed for each color so that distortion and chromatic aberration of magnification can be corrected. The toleration of the distortion and chromatic aberration of magnification of the zoom lens would work more for a decrease in the number of lenses and its size reductions.

As can be appreciated from the foregoing explanation, the invention provides a zoom lens that, albeit having an increased zoom ratio, can be reduced in terms of its total length, and the ensuing surface precision is kept from showing up so that good enough aberration properties are obtainable.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In the following examples that underlies the invention, there are less costly zoom lens optical system provided, which, through such tweaks as described above, meet simultaneously the requirements for a downsized arrangement and a wide-angle/higher zoom ratio arrangement for cameras that satisfy users demands for making the taking area involved wider than ever before without detrimental to the ability of cameras to be carried around, enable the quality of taken images to be well maintained, and lend themselves to electronic imaging devices such as CCDs or CMOSs.

The following examples are each directed to a zoom lens of the type wherein lenses are let out at the startup of an imaging apparatus as well as an imaging apparatus incorporating the same. More exactly, Examples 1 to 20 each provide a zoom lens having higher optical performance and improved in terms of compactness. Throughout Examples 1 to 20, the effective imaging area is of constant rectangular shape in all zooming states. In the respective examples, the values for the specific conditions have been found at the time of focusing on an object point at infinity. Total Length is the axial distance from the entrance surface to the exit surface of the zoom lens plus a back focus as calculated on an air basis.

The zoom lens of the invention is now explained with reference to Examples 1 to 10. FIGS. 1 to 10 are illustrative in lens arrangement section of Examples 1 to 10 at the wide-angle ends (a), in the intermediate states (b) and at the telephoto ends (c) upon focusing on an object point at infinity. Throughout FIGS. 1 to 10, G1 stands for the first lens group;

G2 the second lens group; S an aperture stop; G3 the third lens group; G4 the fourth lens group; G5 the fifth lens group; F an optical low-pass filter; C the cover glass of a CCD that is an electronic imaging device; and I the image plane of the CCD. Note here that for a near infrared sharp cut coating, for instance, it may be coated directly on the optical low-pass filter F or, alternatively, there may be another infrared cut absorption filter located.

It is here noted that drawings for Examples 11 to 20 are not attached hereto because they are similar in construction to Examples 1 to 10, respectively.

Example 1

Figure 1A:
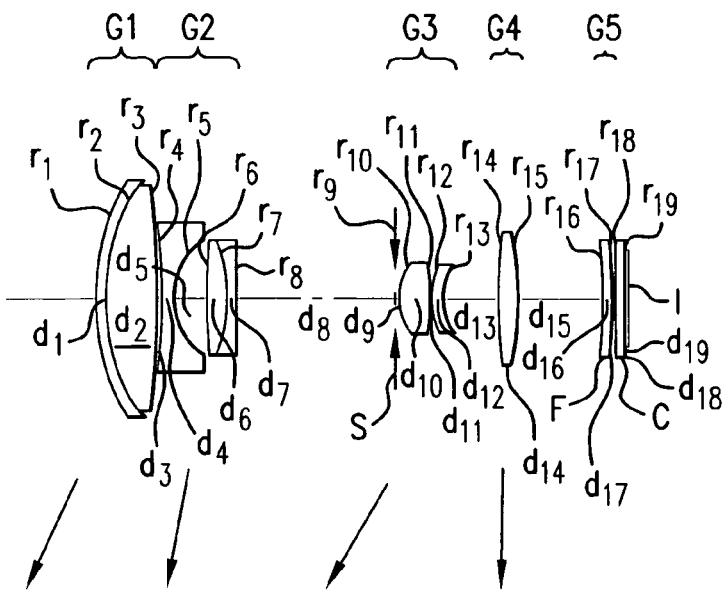
FIG. 1 is illustrative in lens arrangement section of Example 1 of the inventive zoom lens at the wide-angle end (a), in an intermediate state (b) and at the telephoto end (c) upon focusing on an object point at infinity.
Figure 1B:
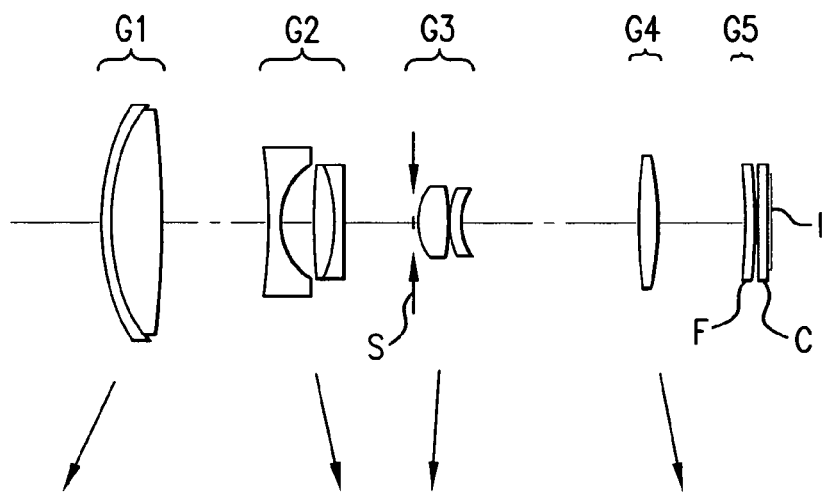
Figure 1C:
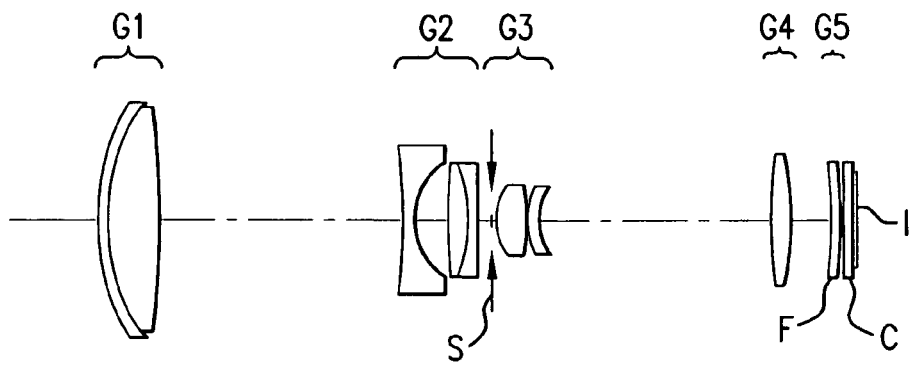

Example 1 is directed to a zoom lens made up of, in order from its object side, the first lens group G1 of positive refracting power, the second lens group G2 of negative refracting power, the aperture stop S, the third lens group G3 of positive refracting power, the fourth lens group G4 of positive refracting power and the fifth lens group G5 of negative refracting power, as shown in FIG. 1.

Upon zooming from the wide-angle end to the telephoto end, the respective lens groups move as follows. Throughout Examples 1 to 10, the intermediate state is defined as the point of change in the direction of movement of the second lens group G2, the third lens group G3 or the fourth lens group G4 from the wide-angle end to the telephoto end.

The first lens group G1 moves toward the object side from the wide-angle end to the telephoto end.

From the wide-angle end to the intermediate state, the second lens group G2 moves toward the object side while the spacing between the first lens group G1 and it grows wide and the spacing between it and the third lens group G3 becomes narrow and, from the intermediate state to the telephoto end, the second lens group G2 moves toward the image side while the spacing between the first lens group G1 and it grows wide and the spacing between it and the third lens group G3 becomes narrow. In the intermediate state, the second lens group G2 is positioned more on the object side than at the wide-angle end, and at the telephoto end, it is positioned a little more on the image side than at the wide-angle end.

From the wide-angle end to the telephoto end, the aperture stop S and the third lens group G3 move in unison toward the object side.

From the wide-angle end to the intermediate state, the fourth lens group G4 moves toward the object side while the spacing between the third lens group G3 and it grows wide and the spacing between it and the fifth lens group G5 becomes narrow, and from the intermediate state to the telephoto end, the fourth lens group G4 moves toward the image side while the spacing between the third lens group G3 and it grows wide and the spacing between it and the fifth lens group G5 becomes narrow. In the intermediate state, the fourth lens group G4 is positioned a little more on the object side than at the wide-angle end, and at the telephoto end, it is positioned more on the image side than at the wide-angle end.

In order from the object side, the first lens group G1 is made up of a cemented lens of a negative meniscus lens convex on its object side and a double-convex positive lens; the second lens group G2 is made up of a double-concave negative lens and a cemented lens of a double-convex positive lens and a double-concave negative lens; the third lens group G3 is made up of a double-convex positive lens and a negative meniscus lens convex on its object side; the fourth lens group G4 is made up of one double-convex positive lens; and the fifth lens group G5 is made up of one negative meniscus lens convex on its image side.

Eight aspheric surfaces are used: one at the surface of the cemented lens located in, and nearest to the image side of, the first lens group G1, two at both surfaces of the double-concave negative lens in the second lens group G2, one at the surface of the cemented lens nearest to the image side of the second lens group G2, two at both surfaces of the double-convex positive lens in the third lens group G3, one at the image-side surface of the negative meniscus lens in the third lens group G3, and one at the object-side surface of the negative meniscus lens in the fifth lens group G5.

Example 2

Figure 2A:
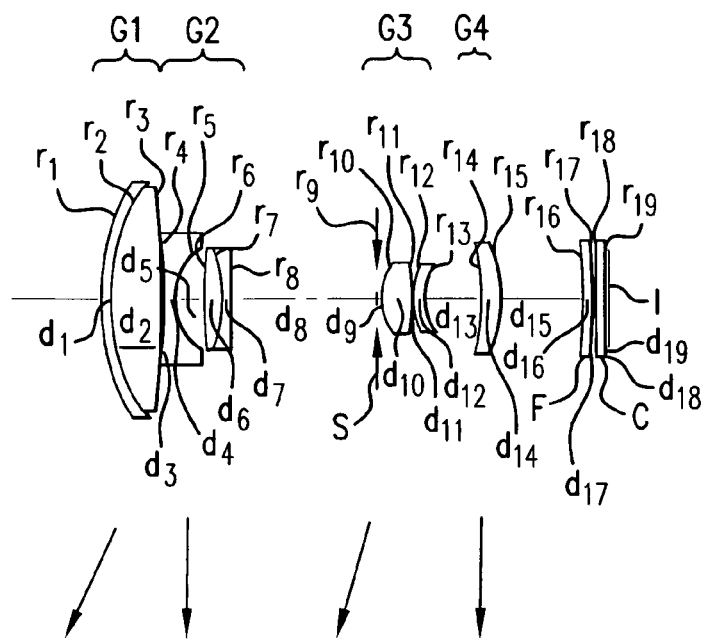
FIG. 2 is illustrative, as in FIG. 1, of Example 2 of the inventive zoom lens.
Figure 2B:
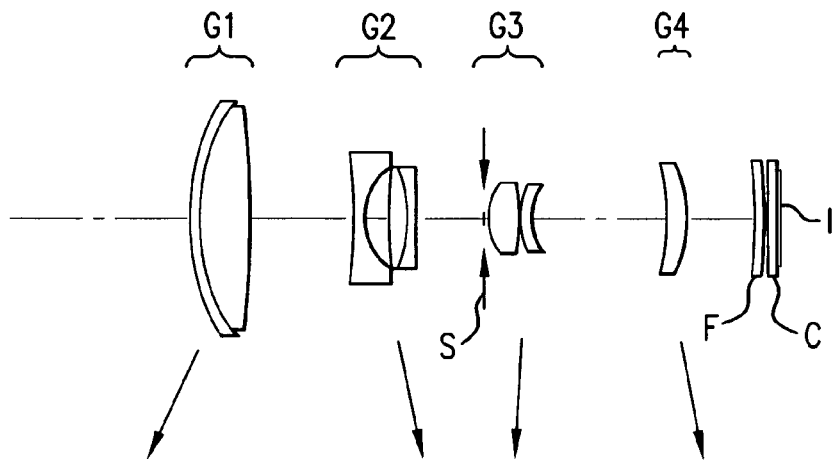
Figure 2C:
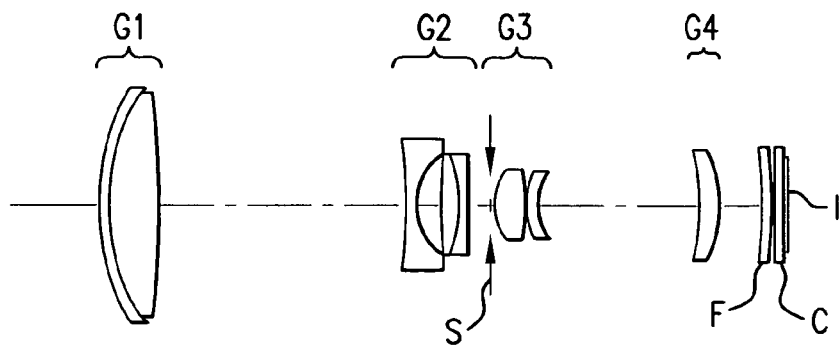

Example 2 is directed to a zoom lens made up of, in order from its object side, the first lens group G1 of positive refracting power, the second lens group G2 of negative refracting power, the aperture stop S, the third lens group G3 of positive refracting power and the fourth lens group G4, as shown in FIG. 2.

The first lens group G1 moves toward the object side from the wide-angle end to the telephoto end.

From the wide-angle end to the intermediate state, the second lens group G2 moves toward the object side while the spacing between the first lens group G1 and it grows wide and the spacing between it and the third lens group G3 becomes narrow and, from the intermediate state to the telephoto end, the second lens group G2 moves toward the image side while the spacing between the first lens group G1 and it grows wide and the spacing between it and the third lens group G3 becomes narrow. In the intermediate state, the second lens group G2 is positioned a little more on the object side than at the wide-angle end, and at the telephoto end, it is positioned more on the image side than at the wide-angle end.

From the wide-angle end to the intermediate state, the aperture stop S and the third lens group G3 move toward the object side while the spacing between the second lens group G2 and them becomes narrow and the spacing between them and the fourth lens group G4 grows wide, and from the intermediate state to the telephoto end, they move toward the image side while the spacing between the second lens group G2 and them becomes narrow and the spacing between them and the fourth lens group G4 grows wide. In the intermediate state, they are positioned more on the object side than at the wide-angle end and at the telephoto end, they are positioned more on the object side at the wide-angle end and more on the image side than in the intermediate state.

From the wide-angle end to the telephoto end, the fourth lens group G4 moves toward the image side while the spacing between the third lens group G3 and it grows wide. In the intermediate state, the fourth lens group G4 is positioned more on the image side than at the wide-angle end, and at the telephoto end, it is positioned more on the image side than in the intermediate state.

In order from the object side, the first lens group G1 is made up of a cemented lens of a negative meniscus lens convex on its object side and a double-convex positive lens; the second lens group G2 is made up of a double-concave negative lens and a cemented lens of a double-convex positive lens and a double-concave negative lens; the third lens group G3 is made up of a double-convex positive lens and a negative meniscus lens convex on its object side; and the fourth lens group G4 is made up of a positive meniscus lens convex on its image side.

Eight aspheric surfaces are used: one at the surface of the cemented lens located in, and nearest to the image side of, the first lens group G1, two at both surfaces of the double-concave negative lens in the second lens group G2, one at the surface of the cemented lens nearest to the image side in the second lens group G2, two at both surfaces of the double-convex positive lens in the third lens group G3, one at the image-side surface of the negative meniscus lens in the third lens group G3, and one at the image-side surface of the positive meniscus lens in the fourth lens group G4.

Example 3

Figure 3A:
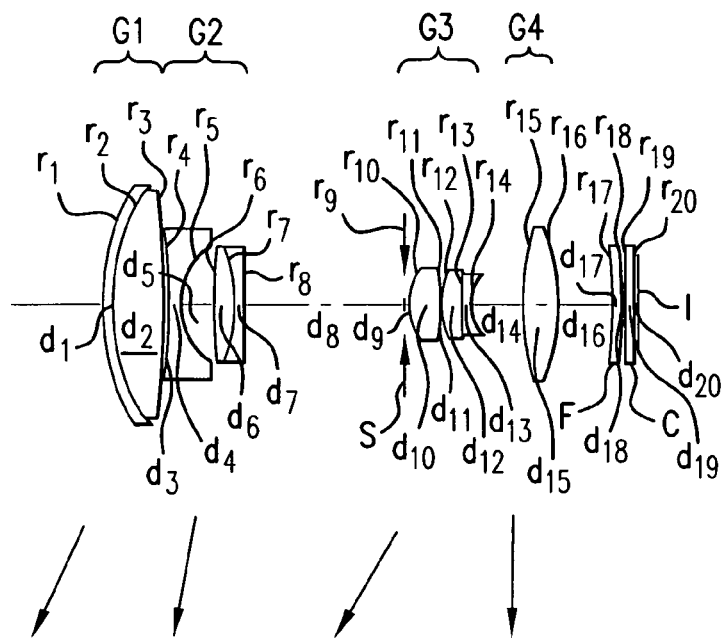
FIG. 3 is illustrative, as in FIG. 1, of Example 3 of the inventive zoom lens.
Figure 3B:
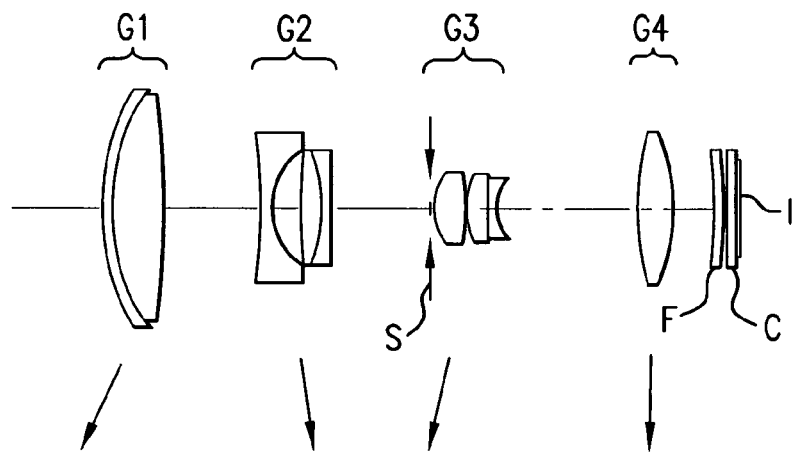
Figure 3C:
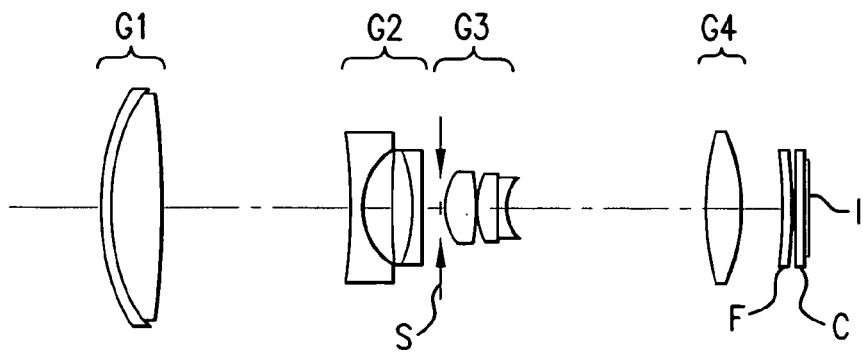

Example 3 is directed to a zoom lens made up of, in order from its object side, the first lens group G1 of positive refracting power, the second lens group G2 of negative refracting power, the aperture stop S, the third lens group G3 of positive refracting power and the fourth lens group G4, as shown in FIG. 3.

Upon zooming from the wide-angle end to the telephoto end, the respective lens groups move as follows.

The first lens group G1 moves toward the object side from the wide-angle end to the telephoto end.

From the wide-angle end to the intermediate state, the second lens group G2 moves toward the object side while the spacing between the first lens group G1 and it grows wide and the spacing between it and the third lens group G3 becomes narrow and, from the intermediate state to the telephoto end, the second lens group G2 moves toward the image side while the spacing between the first lens group G1 and it grows wide and the spacing between it and the third lens group G3 becomes narrow. In the intermediate state, the second lens group G2 is positioned a little more on the object side than at the wide-angle end, and at the telephoto end, it is positioned more on the image side than at the wide-angle end.

From the wide-angle end to the intermediate state, the aperture stop S and the third lens group G3 move toward the object side while the spacing between the second lens group G2 and them becomes narrow and the spacing between them and the fourth lens group G4 grows wide, and from the intermediate state to the telephoto end, they move toward the image side while the spacing between the second lens group G2 and them becomes narrow and the spacing between them and the fourth lens group G4 grows wide. In the intermediate state, they are positioned more on the object side than at the wide-angle end and at the telephoto end, they are positioned more on the object side than in the intermediate state.

From the wide-angle end to the telephoto end, the fourth lens group G4 moves toward the image side while the spacing between the third lens group G3 and it grows wide. In the intermediate state, the fourth lens group G4 is positioned more on the image side than at the wide-angle end, and at the telephoto end, it is positioned more on the image side than in the intermediate state.

In order from the object side, the first lens group G1 is made up of a cemented lens of a negative meniscus lens convex on its object side and a double-convex positive lens; the second lens group G2 is made up of a double-concave negative lens and a cemented lens of a positive meniscus lens convex on its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of a double-convex positive lens.

Eight aspheric surfaces are used: one at the surface of the cemented lens located in, and nearest to the image side of, the first lens group G1, two at both surfaces of the double-concave negative lens in the second lens group G2, one at the surface of the cemented lens nearest to the image side in the second lens group G2, two at both surfaces of the double-convex positive lens in the third lens group G3, and two at both surfaces of the double-convex positive lens in the fourth lens group G4.

Example 4

Figure 4A:
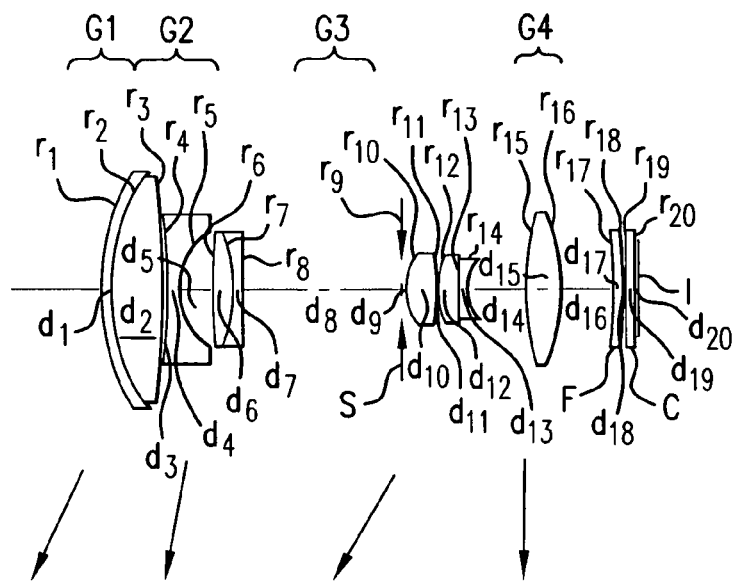
FIG. 4 is illustrative, as in FIG. 1, of Example 4 of the inventive zoom lens.
Figure 4B:
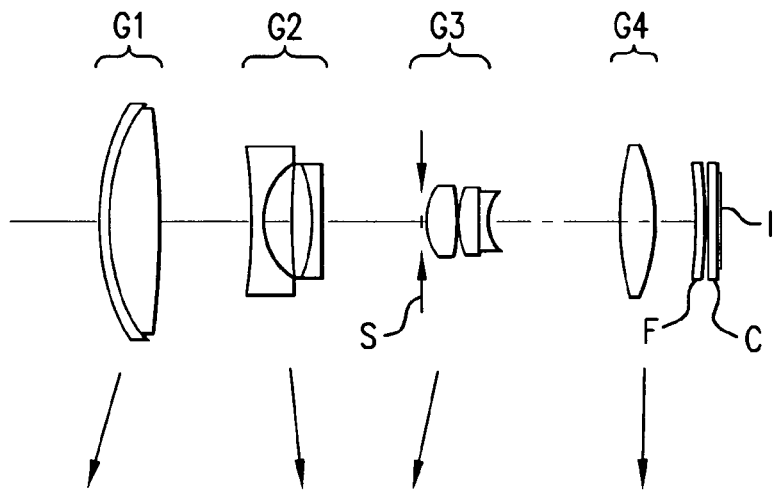
Figure 4C:
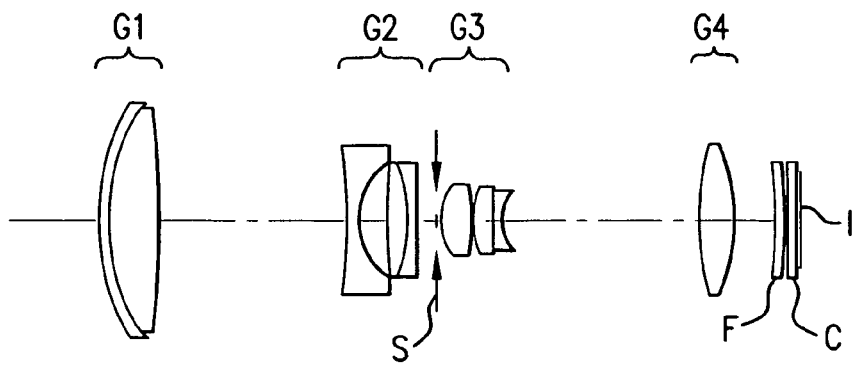

Example 4 is directed to a zoom lens made up of, in order from its object side, the first lens group G1 of positive refracting power, the second lens group G2 of negative refracting power, the aperture stop S, the third lens group G3 of positive refracting power and the fourth lens group G4, as shown in FIG. 4.

Upon zooming from the wide-angle end to the telephoto end, the respective lens groups move as follows.

The first lens group G1 moves toward the object side from the wide-angle end to the telephoto end.

From the wide-angle end to the intermediate state, the second lens group G2 moves toward the object side while the spacing between the first lens group G1 and it grows wide and the spacing between it and the third lens group G3 becomes narrow and, from the intermediate state to the telephoto end, the second lens group G2 moves toward the image side while the spacing between the first lens group G1 and it grows wide and the spacing between it and the third lens group G3 becomes narrow. In the intermediate state, the second lens group G2 is positioned a little more on the object side than at the wide-angle end, and at the telephoto end, it is positioned more on the image side than at the wide-angle end.

From the wide-angle end to the intermediate state, the aperture stop S and the third lens group G3 move toward the object side while the spacing between the second lens group G2 and them becomes narrow and the spacing between them and the fourth lens group G4 grows wide, and from the intermediate state to the telephoto end, they move toward the image side while the spacing between the second lens group G2 and them becomes narrow and the spacing between them and the fourth lens group G4 grows wide. In the intermediate state, they are positioned more on the object side than at the wide-angle end and at the telephoto end, they are positioned more on the object side than in the intermediate state.

From the wide-angle end to the telephoto end, the fourth lens group G4 moves toward the image side while the spacing between the third lens group G3 and it grows wide. In the intermediate state, the fourth lens group G4 is positioned a little more on the image side than at the wide-angle end, and at the telephoto end, it is positioned more on the image side than in the intermediate state.

In order from the object side, the first lens group G1 is made up of a cemented lens of a negative meniscus lens convex on its object side and a double-convex positive lens; the second lens group G2 is made up of a double-concave negative lens and a cemented lens of a positive meniscus lens convex on its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of a double-convex positive lens.

Eight aspheric surfaces are used: one at the surface of the cemented lens located in, and nearest to the image side of, the first lens group G1, two at both surfaces of the double-concave negative lens in the second lens group G2, one at the surface of the cemented lens nearest to the image side in the second lens group G2, two at both surfaces of the double-convex positive lens in the third lens group G3, and two at both surfaces of the double-convex positive lens in the fourth lens group G4.

Example 5

Figure 5A:
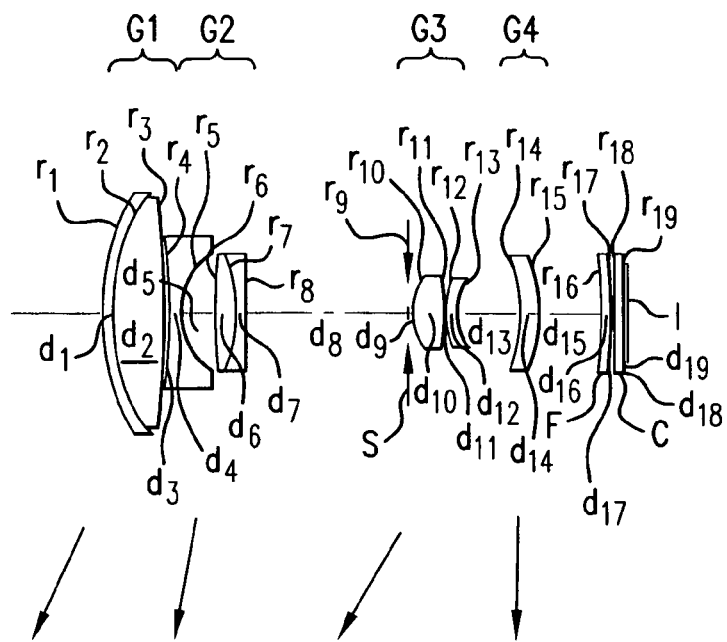
FIG. 5 is illustrative, as in FIG. 1, of Example 5 of the inventive zoom lens.
Figure 5B:
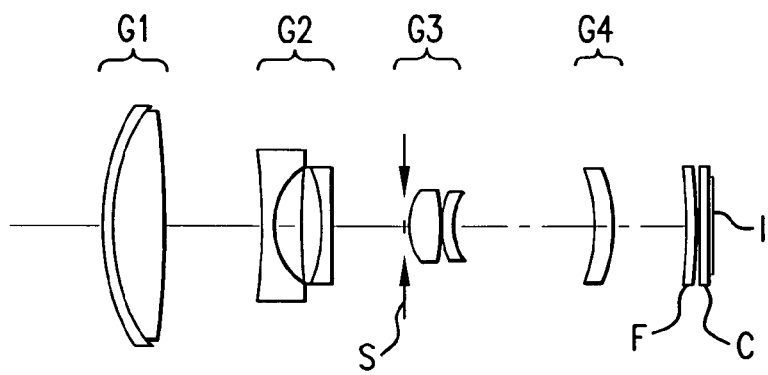
Figure 5C:
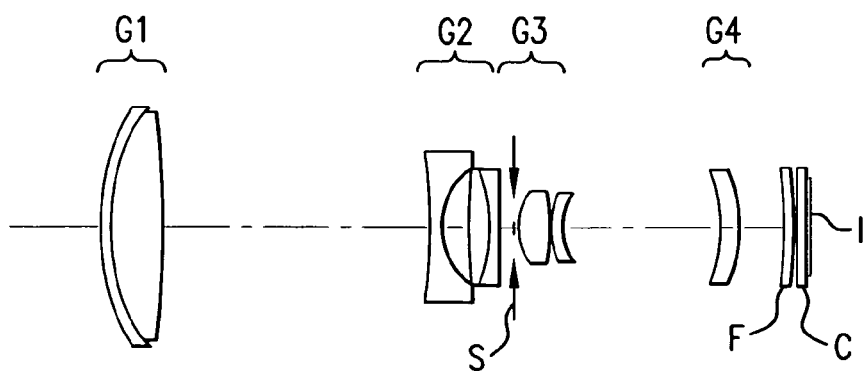

Example 5 is directed to a zoom lens made up of, in order from its object side, the first lens group G1 of positive refracting power, the second lens group G2 of negative refracting power, the aperture stop S, the third lens group G3 of positive refracting power and the fourth lens group G4, as shown in FIG. 5.

Upon zooming from the wide-angle end to the telephoto end, the respective lens groups move as follows.

The first lens group G1 moves toward the object side from the wide-angle end to the telephoto end.

From the wide-angle end to the intermediate state, the second lens group G2 moves toward the object side while the spacing between the first lens group G1 and it grows wide and the spacing between it and the third lens group G3 becomes narrow and, from the intermediate state to the telephoto end, the second lens group G2 moves toward the image side while the spacing between the first lens group G1 and it grows wide and the spacing between it and the third lens group G3 becomes narrow. In the intermediate state, the second lens group G2 is positioned a little more on the object side than at the wide-angle end, and at the telephoto end, it is positioned more on the image side than at the wide-angle end.

From the wide-angle end to the intermediate state, the aperture stop S and the third lens group G3 move toward the object side while the spacing between the second lens group G2 and them becomes narrow and the spacing between them and the fourth lens group G4 grows wide, and from the intermediate state to the telephoto end, they move toward the image side while the spacing between the second lens group G2 and them becomes narrow and the spacing between them and the fourth lens group G4 grows wide. In the intermediate state, they are positioned more on the object side than at the wide-angle end and at the telephoto end, they are positioned more on the object side than at the intermediate state and a little more on the image side than in the intermediate state.

From the wide-angle end to the telephoto end, the fourth lens group G4 moves toward the image side while the spacing between the third lens group G3 and it grows wide. In the intermediate state, the fourth lens group G4 is positioned more on the image side than at the wide-angle end, and at the telephoto end, it is positioned more on the image side than in the intermediate state.

In order from the object side, the first lens group G1 is made up of a cemented lens of a negative meniscus lens convex on its object side and a double-convex positive lens; the second lens group G2 is made up of a double-concave negative lens and a cemented lens of a double-convex positive lens and a double-concave negative lens; the third lens group G3 is made up of a double-convex positive lens and a negative meniscus lens convex on its object side; and the fourth lens group G4 is made up of a positive meniscus lens convex on its image side.

Eight aspheric surfaces are used: one at the surface of the cemented lens located in, and nearest to the image side of, the first lens group G1, two at both surfaces of the double-concave negative lens in the second lens group G2, one at the surface of the cemented lens nearest to the image side in the second lens group G2, two at both surfaces of the double-convex positive lens in the third lens group G3, one at the image side-surface of the negative meniscus lens in the third lens group G3, and one at the image-side surface of the positive meniscus lens in the fourth lens group G4.

Example 6

Figure 6A:
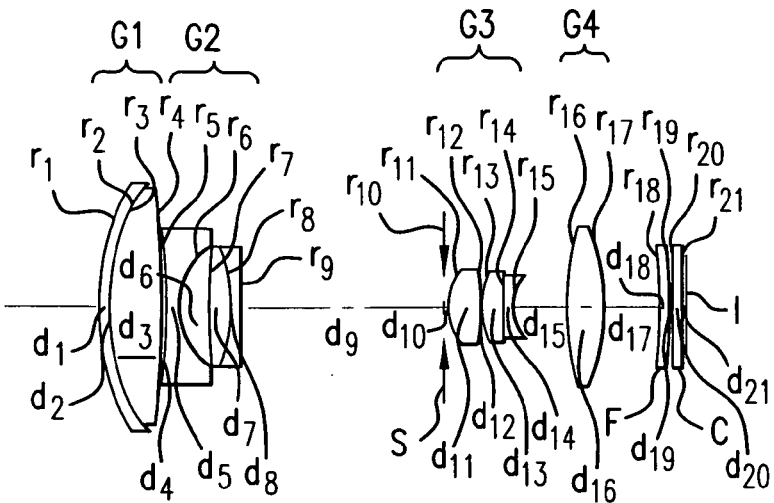
FIG. 6 is illustrative, as in FIG. 1, of Example 6 of the inventive zoom lens.
Figure 6B:
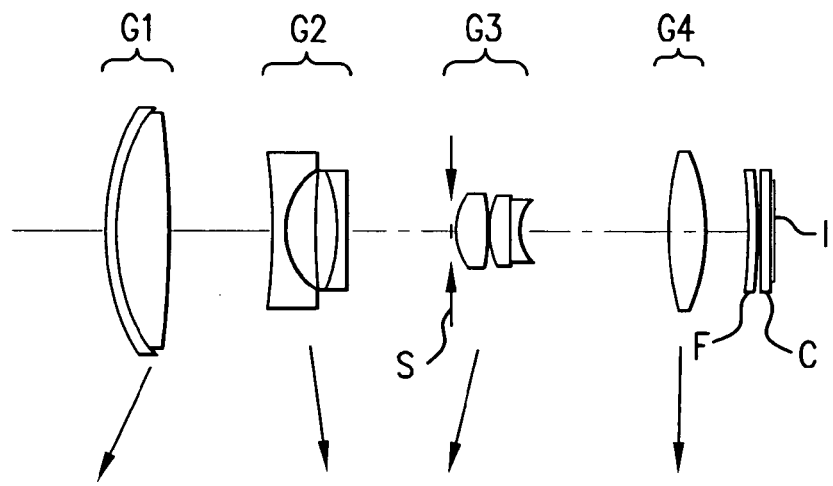
Figure 6C:
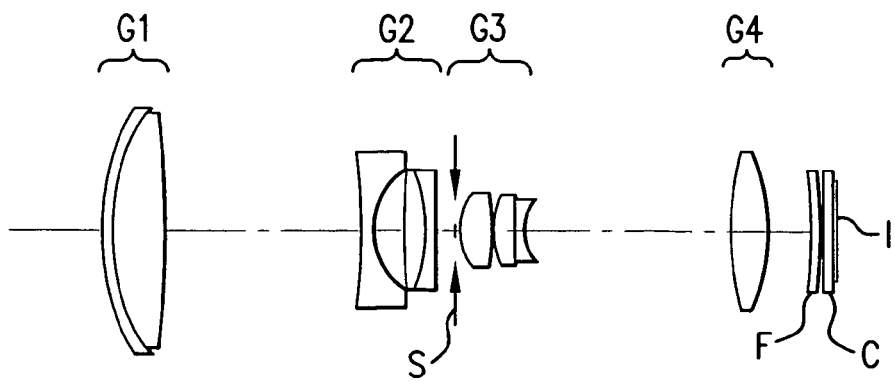

Example 6 is directed to a zoom lens made up of, in order from its object side, the first lens group G1 of positive refracting power, the second lens group G2 of negative refracting power, the aperture stop S, the third lens group G3 of positive refracting power and the fourth lens group G4, as shown in FIG. 6.

Upon zooming from the wide-angle end to the telephoto end, the respective lens groups move as follows.

The first lens group G1 moves toward the object side from the wide-angle end to the telephoto end.

From the wide-angle end to the intermediate state, the second lens group G2 moves toward the object side while the spacing between the first lens group G1 and it grows wide and the spacing between it and the third lens group G3 becomes narrow and, from the intermediate state to the telephoto end, the second lens group G2 moves toward the image side while the spacing between the first lens group G1 and it grows wide and the spacing between it and the third lens group G3 becomes narrow. In the intermediate state, the second lens group G2 is positioned a little more on the object side than at the wide-angle end, and at the telephoto end, it is positioned more on the image side than at the wide-angle end.

From the wide-angle end to the intermediate state, the aperture stop S and the third lens group G3 move toward the object side while the spacing between the second lens group G2 and them becomes narrow and the spacing between them and the fourth lens group G4 grows wide, and from the intermediate state to the telephoto end, they move toward the image side while the spacing between the second lens group G2 and them becomes narrow and the spacing between them and the fourth lens group G4 grows wide. In the intermediate state, they are positioned more on the object side than at the wide-angle end and at the telephoto end, they are positioned more on the image side than in the intermediate state.

From the wide-angle end to the telephoto end, the fourth lens group G4 moves toward the image side while the spacing between the third lens group G3 and it grows wide. In the intermediate state, the fourth lens group G4 is positioned a little more on the image side than at the wide-angle end, and at the telephoto end, it is positioned more on the image side than in the intermediate state.

In order from the object side, the first lens group G1 is made up of a cemented lens of a negative meniscus lens convex on its object side and a double-convex positive lens; the second lens group G2 is made up of a double-concave negative lens and a cemented lens of a positive meniscus lens convex on its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of a double-convex positive lens.

Eight aspheric surfaces are used: one at the image-side surface of the double-convex positive lens in the first lens group G1, two at both surfaces of the double-concave negative lens in the second lens group G2, one at the surface of the cemented lens nearest to the image side in the second lens group G2, two at both surfaces of the double-convex positive lens in the third lens group G3, and two at both surfaces of the double-convex positive lens in the fourth lens group G4.

Example 7

Figure 7A:
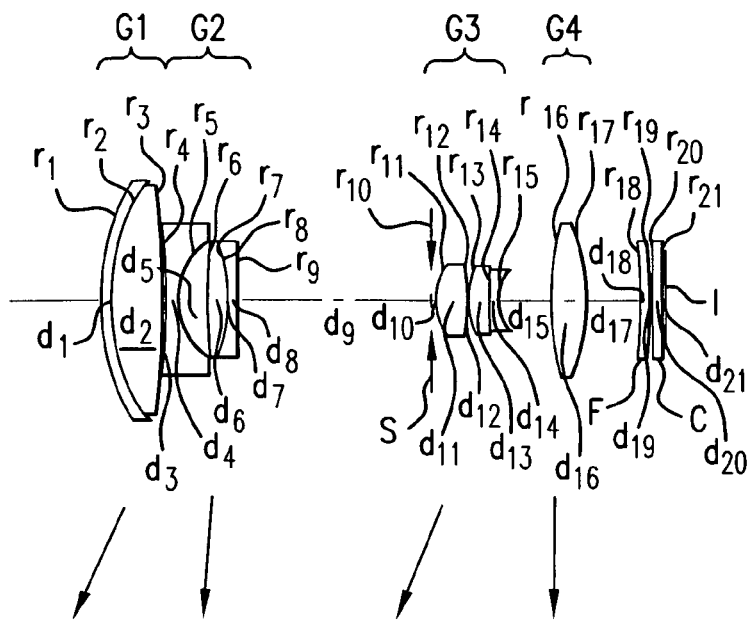
FIG. 7 is illustrative, as in FIG. 1, of Example 7 of the inventive zoom lens.
Figure 7B:
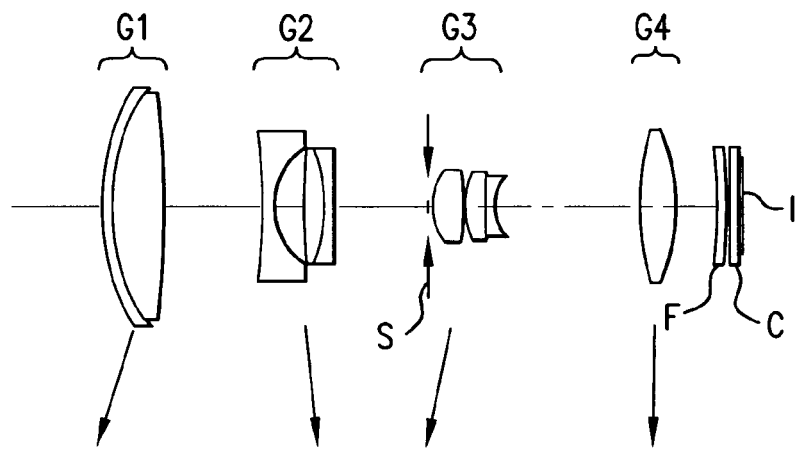
Figure 7C:
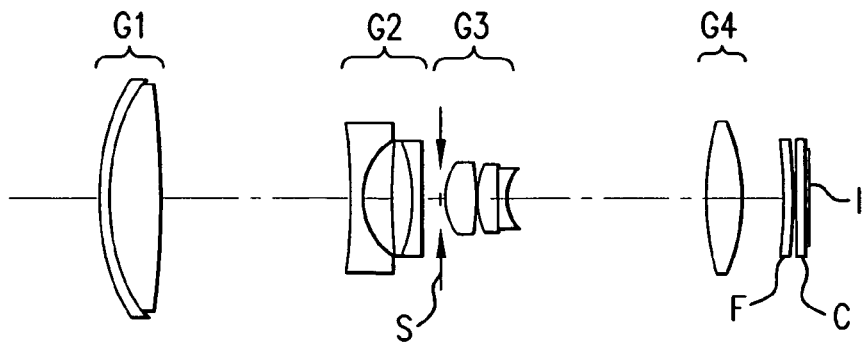

Example 7 is directed to a zoom lens made up of, in order from its object side, the first lens group G1 of positive refracting power, the second lens group G2 of negative refracting power, the aperture stop S, the third lens group G3 of positive refracting power and the fourth lens group G4, as shown in FIG. 7.

Upon zooming from the wide-angle end to the telephoto end, the respective lens groups move as follows.

The first lens group G1 moves toward the object side from the wide-angle end to the telephoto end.

From the wide-angle end to the intermediate state, the second lens group G2 moves toward the object side while the spacing between the first lens group G1 and it grows wide and the spacing between it and the third lens group G3 becomes narrow and, from the intermediate state to the telephoto end, the second lens group G2 moves toward the image side while the spacing between the first lens group G1 and it grows wide and the spacing between it and the third lens group G3 becomes narrow. In the intermediate state, the second lens group G2 is positioned a little more on the object side than at the wide-angle end, and at the telephoto end, it is positioned more on the image side than at the wide-angle end.

From the wide-angle end to the intermediate state, the aperture stop S and the third lens group G3 move toward the object side while the spacing between the second lens group G2 and them becomes narrow and the spacing between them and the fourth lens group G4 grows wide, and from the intermediate state to the telephoto end, they move toward the image side while the spacing between the second lens group G2 and them becomes narrow and the spacing between them and the fourth lens group G4 grows wide. In the intermediate state, they are positioned more on the object side than at the wide-angle end and at the telephoto end, they are positioned more on the object side than in the intermediate state.

From the wide-angle end to the telephoto end, the fourth lens group G4 moves toward the image side while the spacing between the third lens group G3 and it grows wide. In the intermediate state, the fourth lens group G4 is positioned a little more on the image side than at the wide-angle end, and at the telephoto end, it is positioned more on the image side than in the intermediate state.

In order from the object side, the first lens group G1 is made up of a cemented lens of a negative meniscus lens convex on its object side and a double-convex positive lens; the second lens group G2 is made up of a double-concave negative lens, a positive meniscus lens convex on its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of a double-convex positive lens.

Eight aspheric surfaces are used: one at the surface of the cemented lens located in, and nearest to the image side of, the first lens group G1, two at both surfaces of the double-concave negative lens on the object side of the second lens group G2, one at the image-side surface of the double-concave negative lens on the image side of the second lens group G2, two at both surfaces of the double-convex positive lens in the third lens group G3, and two at both surfaces of the double-convex positive lens in the fourth lens group G4.

Example 8

Figure 8A:
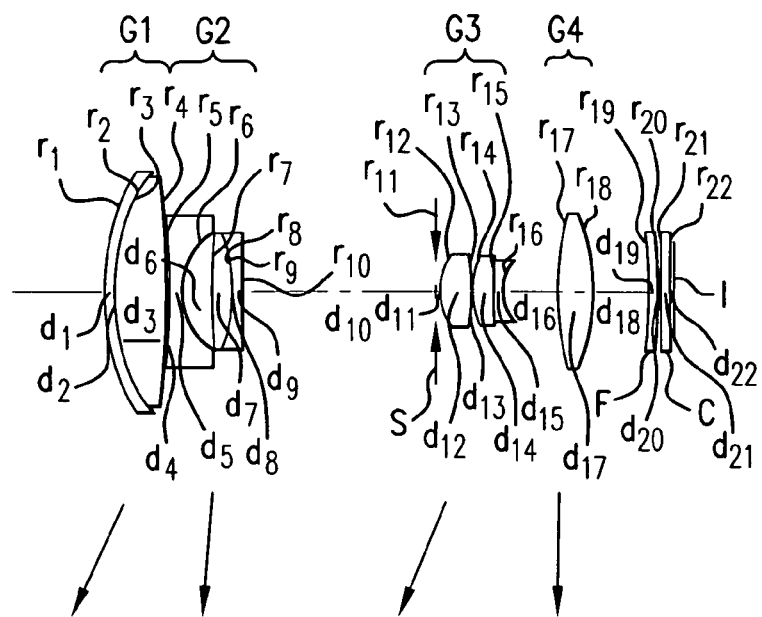
FIG. 8 is illustrative, as in FIG. 1, of Example 8 of the inventive zoom lens.
Figure 8B:
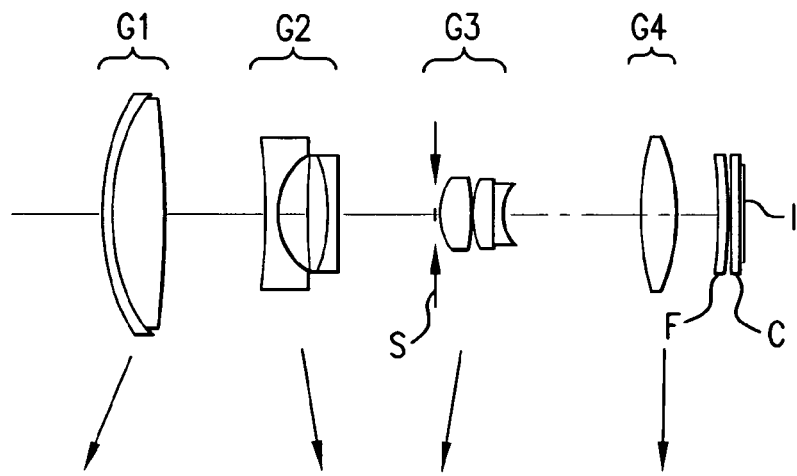
Figure 8C:
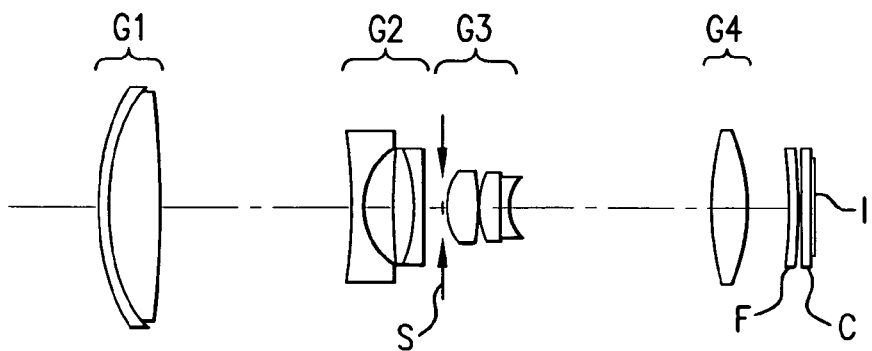

Example 8 is directed to a zoom lens made up of, in order from its object side, the first lens group G1 of positive refracting power, the second lens group G2 of negative refracting power, the aperture stop S, the third lens group G3 of positive refracting power and the fourth lens group G4, as shown in FIG. 8.

Upon zooming from the wide-angle end to the telephoto end, the respective lens groups move as follows.

The first lens group G1 moves toward the object side from the wide-angle end to the telephoto end.

From the wide-angle end to the intermediate state, the second lens group G2 moves toward the object side while the spacing between the first lens group G1 and it grows wide and the spacing between it and the third lens group G3 becomes narrow and, from the intermediate state to the telephoto end, the second lens group G2 moves toward the image side while the spacing between the first lens group G1 and it grows wide and the spacing between it and the third lens group G3 becomes narrow. In the intermediate state, the second lens group G2 is positioned a little more on the object side than at the wide-angle end, and at the telephoto end, it is positioned more on the image side than at the wide-angle end.

From the wide-angle end to the intermediate state, the aperture stop S and the third lens group G3 move toward the object side while the spacing between the second lens group G2 and them becomes narrow and the spacing between them and the fourth lens group G4 grows wide, and from the intermediate state to the telephoto end, they move toward the image side while the spacing between the second lens group G2 and them becomes narrow and the spacing between them and the fourth lens group G4 grows wide. In the intermediate state, they are positioned more on the object side than at the wide-angle end and at the telephoto end, they are positioned more on the object side than in the intermediate state.

From the wide-angle end to the telephoto end, the fourth lens group G4 moves toward the image side while the spacing between the third lens group G3 and it grows wide. In the intermediate state, the fourth lens group G4 is positioned a little more on the image side than at the wide-angle end, and at the telephoto end, it is positioned more on the image side than in the intermediate state.

In order from the object side, the first lens group G1 is made up of a negative meniscus lens convex on its object side and a double-convex positive lens; the second lens group G2 is made up of a double-concave negative lens, a positive meniscus lens convex on its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of a double-convex positive lens.

Eight aspheric surfaces are used: one at the image-side surface of the double-convex positive lens in the first lens group G1, two at both surfaces of the double-concave negative lens on the object side of the second lens group G2, one at the image-side surface of the double-concave negative lens on the image side of the second lens group G2, two at both surfaces of the double-convex positive lens in the third lens group G3, and two at both surfaces of the double-convex positive lens in the fourth lens group G4.

Example 9

Figure 9A:
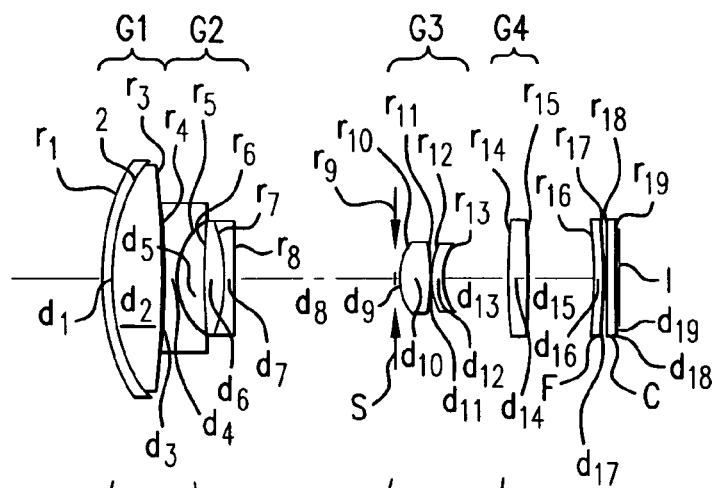
FIG. 9 is illustrative, as in FIG. 1, of Example 9 of the inventive zoom lens.
Figure 9B:
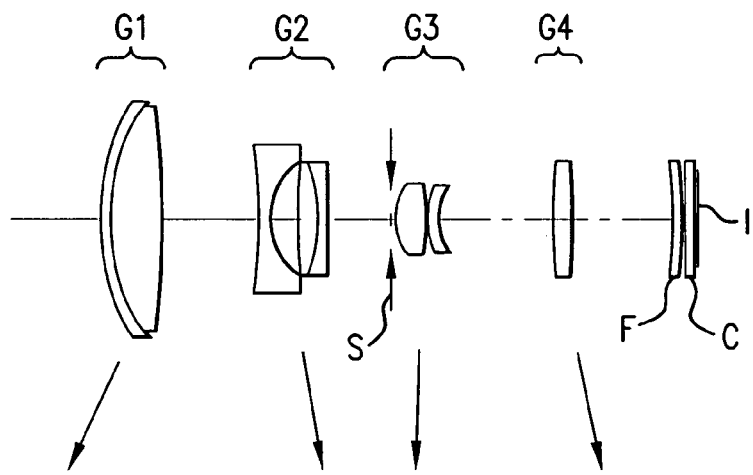
Figure 9C:
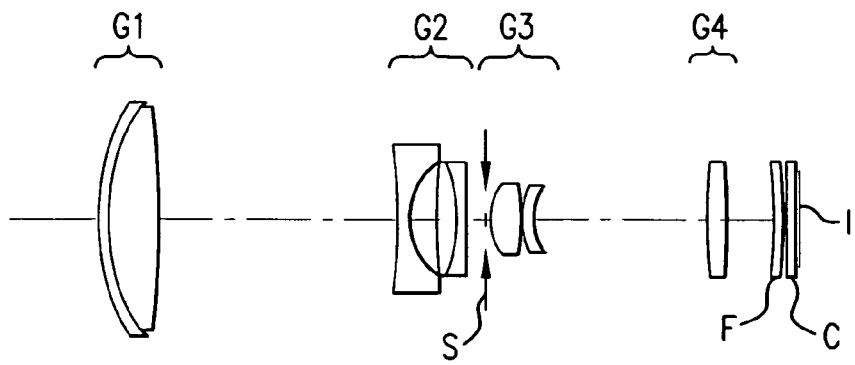

Example 9 is directed to a zoom lens made up of, in order from its object side, the first lens group G1 of positive refracting power, the second lens group G2 of negative refracting power, the aperture stop S, the third lens group G3 of positive refracting power and the fourth lens group G4, as shown in FIG. 9.

Upon zooming from the wide-angle end to the telephoto end, the respective lens groups move as follows.

The first lens group G1 moves toward the object side from the wide-angle end to the telephoto end.

From the wide-angle end to the intermediate state, the second lens group G2 moves toward the object side while the spacing between the first lens group G1 and it grows wide and the spacing between it and the third lens group G3 becomes narrow and, from the intermediate state to the telephoto end, the second lens group G2 moves toward the image side while the spacing between the first lens group G1 and it grows wide and the spacing between it and the third lens group G3 becomes narrow. In the intermediate state, the second lens group G2 is positioned more on the object side than at the wide-angle end, and at the telephoto end, it is positioned more on the image side than in the intermediate state From the wide-angle end to the telephoto end, the aperture stop S and the third lens group G3 move in unison toward the object side.

From the wide-angle end to the intermediate state, fourth lens group G4 moves toward the object side while the spacing between the third lens group G3 and it groves wide and the spacing between it the fifth lens group G5 grows wide, and from the intermediate state to the telephoto end, the fourth lens group G4 moves toward the image side while the spacing between the third lens group G3 and it grows wide and the spacing while it and the fifth lens group G5 becomes narrow. In the intermediate state, the fourth lens group G4 is positioned more on the object side than at the wide-angle end, and at the telephoto end, it is positioned more on the image side than at the wise-angle end.

In order from the object side, the first lens group G1 is made up of a cemented lens of a negative meniscus lens convex on its object side and a double-convex positive lens; the second lens group G2 is made up of a double-concave negative lens and a cemented lens of a double-convex positive lens and a double-concave negative lens; the third lens group G3 is made up of a double-convex positive lens and a negative meniscus lens convex on its object side; and the fourth lens group G4 is made up of one double-convex positive lens.

Eight aspheric surfaces are used: one at the surface of the cemented lens located in, and nearest to the image side of, the first lens group G1, two at both surfaces of the double-concave negative lens in the second lens group G2, one at the surface of the cemented lens nearest to the image side in the second lens group G2, two at both surfaces of the double-convex positive lens in the third lens group G3, one at the image side-surface of the negative meniscus lens in the third lens group G3, and one at the object-side surface of the double-convex positive lens in the fourth lens group G4.

Example 10

Figure 10A:
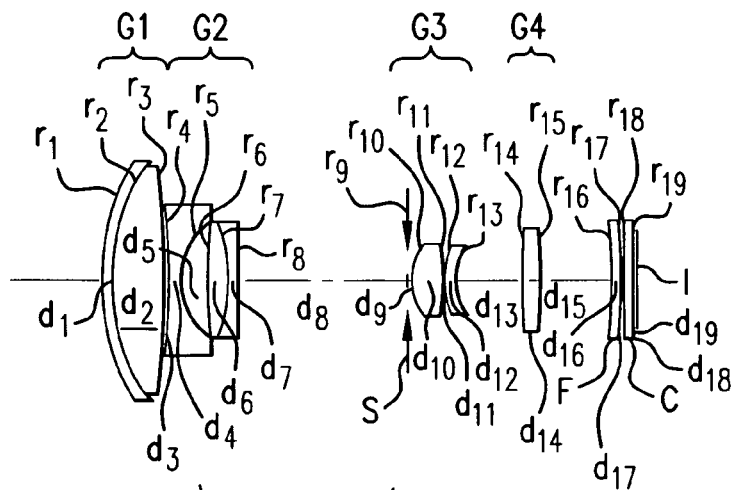
FIG. 10 is illustrative, as in FIG. 1, of Example 10 of the inventive zoom lens.
Figure 10B:
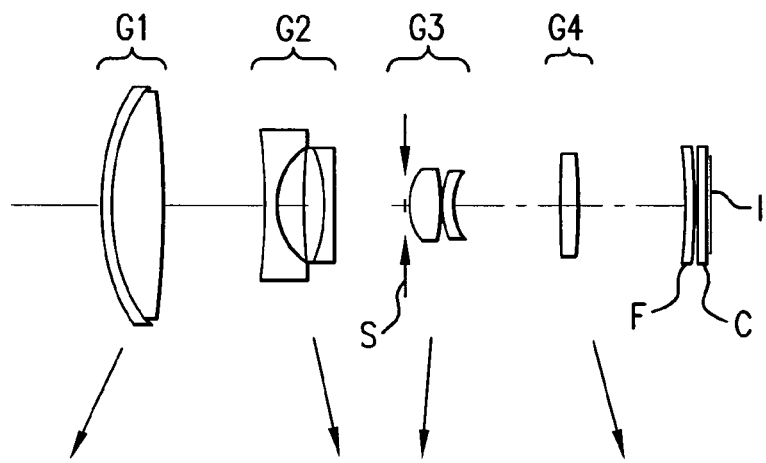
Figure 10C:
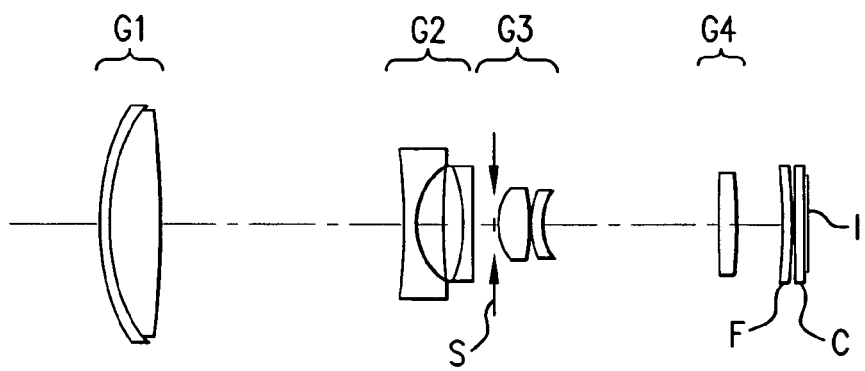
Figure 11A:
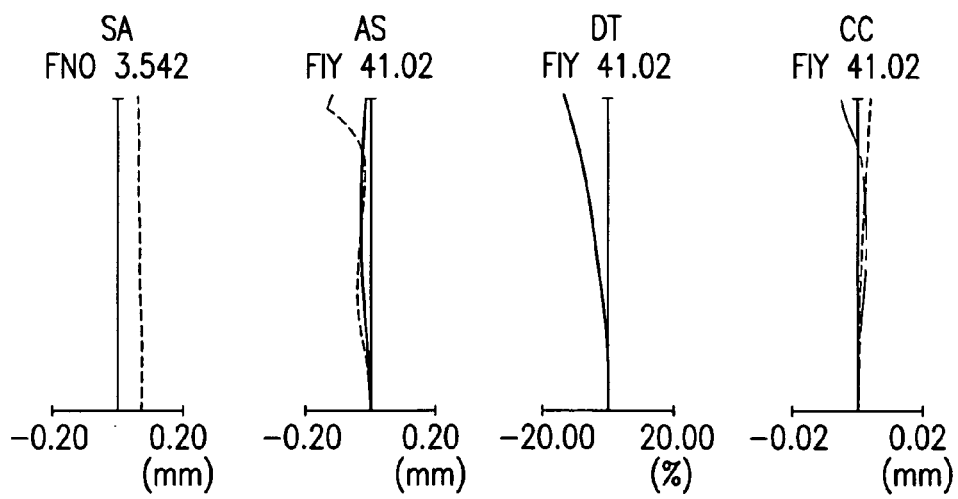
FIG. 11 is an aberration diagram for Example 1 upon focusing on an object point at infinity.
Figure 11B:
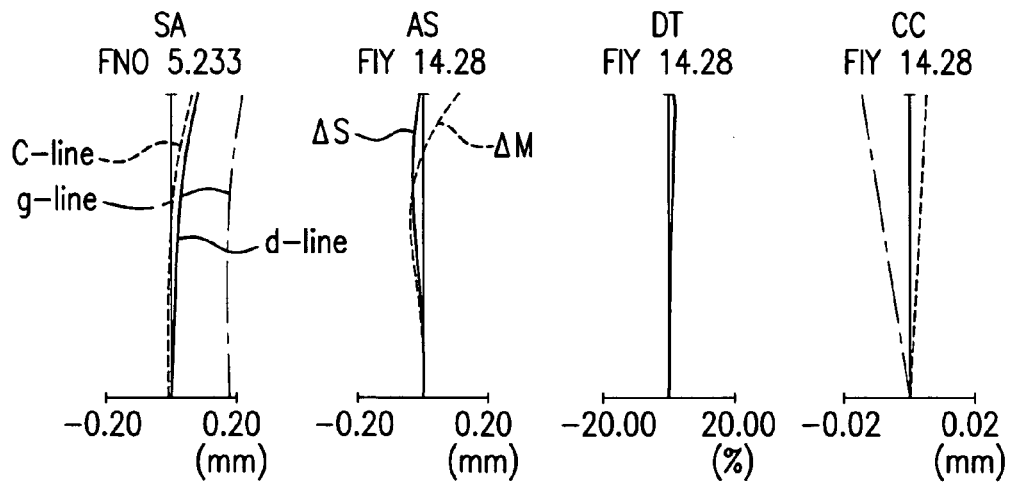
Figure 11C:
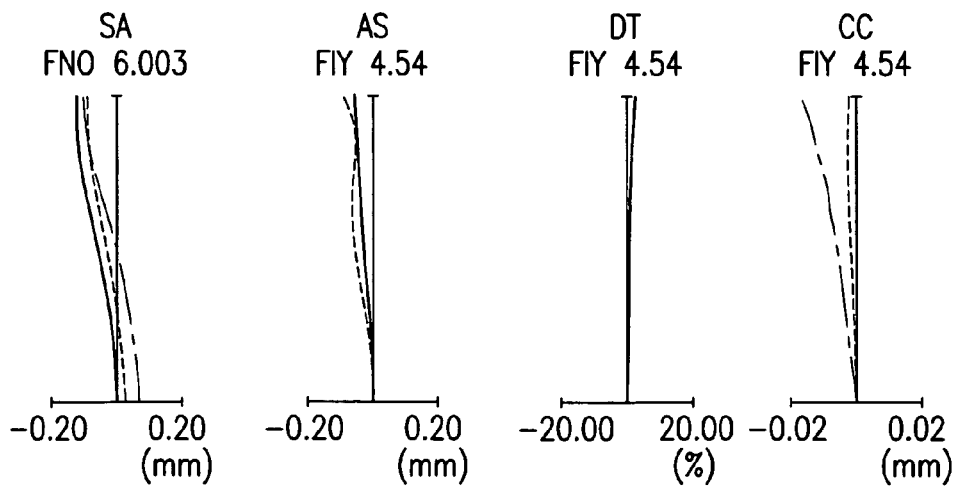
Figure 12A:
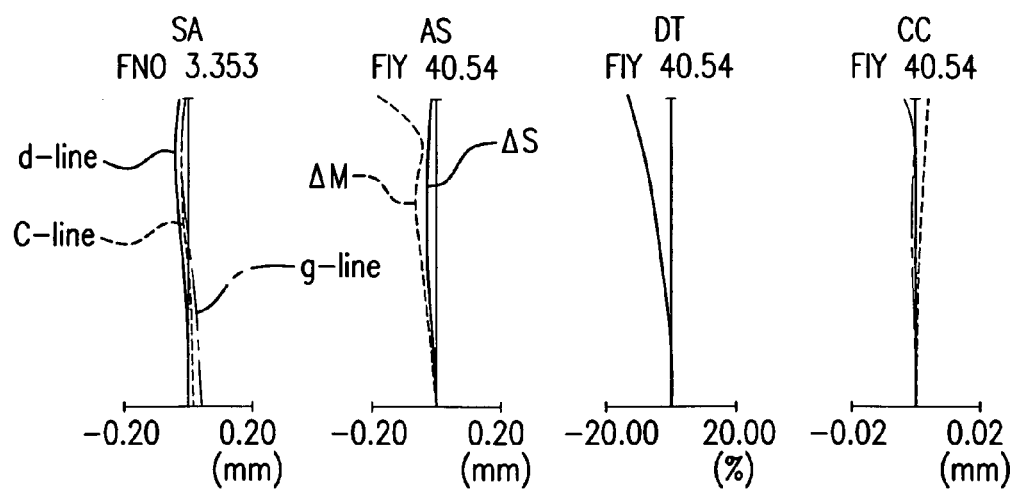
FIG. 12 is an aberration diagram for Example 2 upon focusing on an object point at infinity.
Figure 12B:
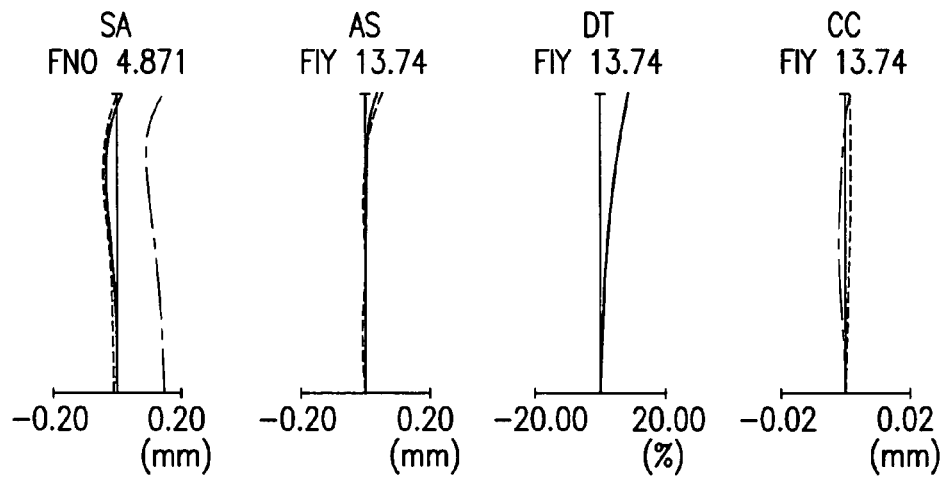
Figure 12C:
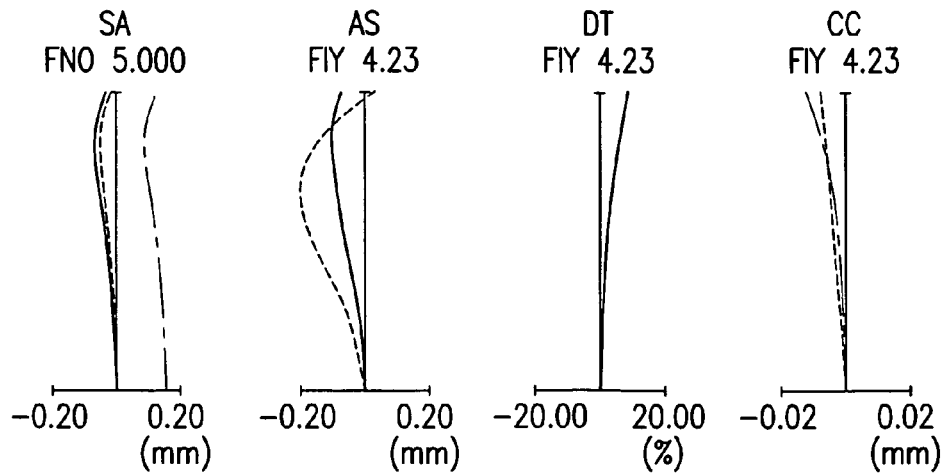
Figure 13A:
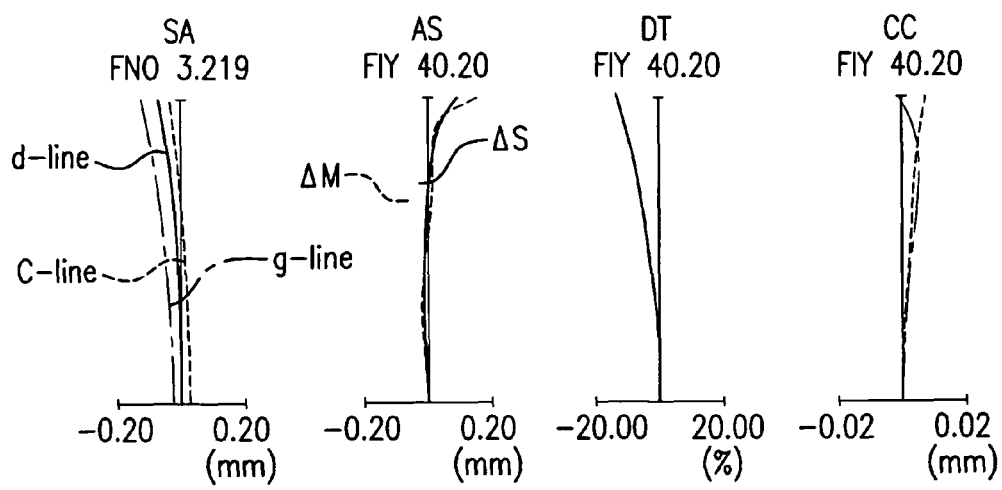
FIG. 13 is an aberration diagram for Example 3 upon focusing on an object point at infinity.
Figure 13B:
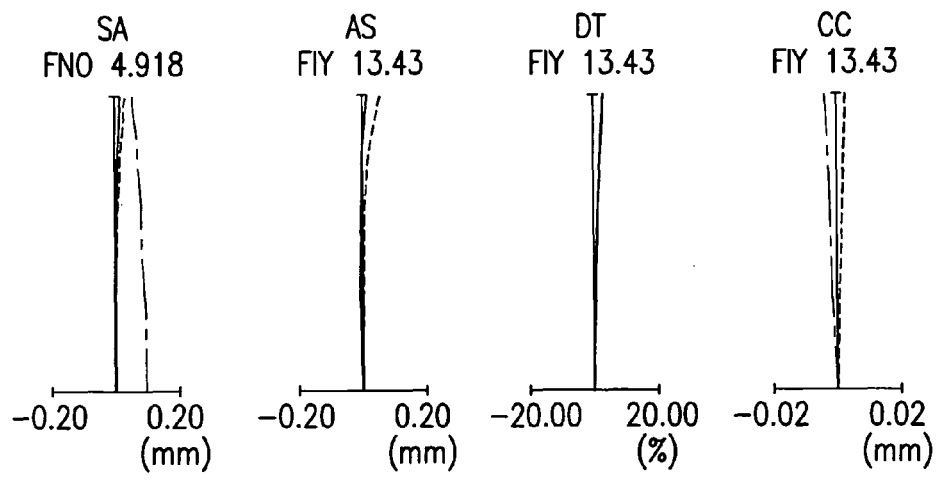
Figure 13C:
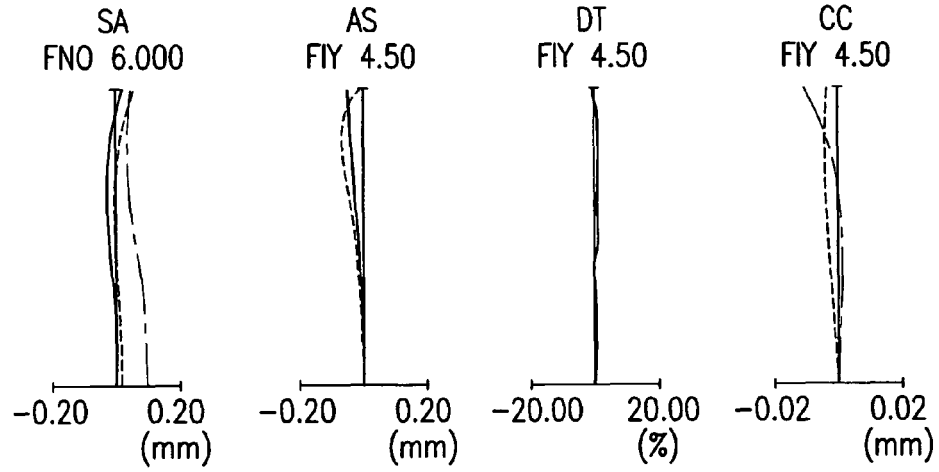
Figure 14A:
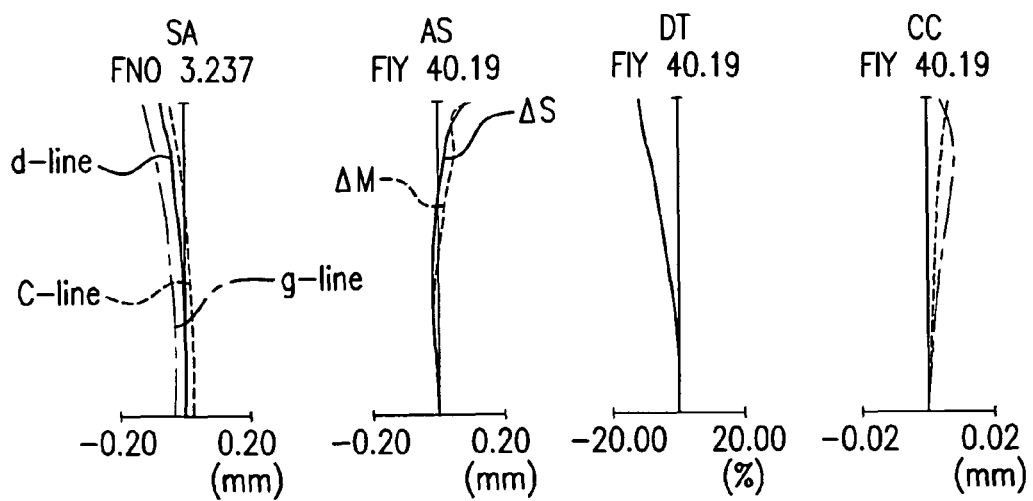
FIG. 14 is an aberration diagram for Example 4 upon focusing on an object point at infinity.
Figure 14B:
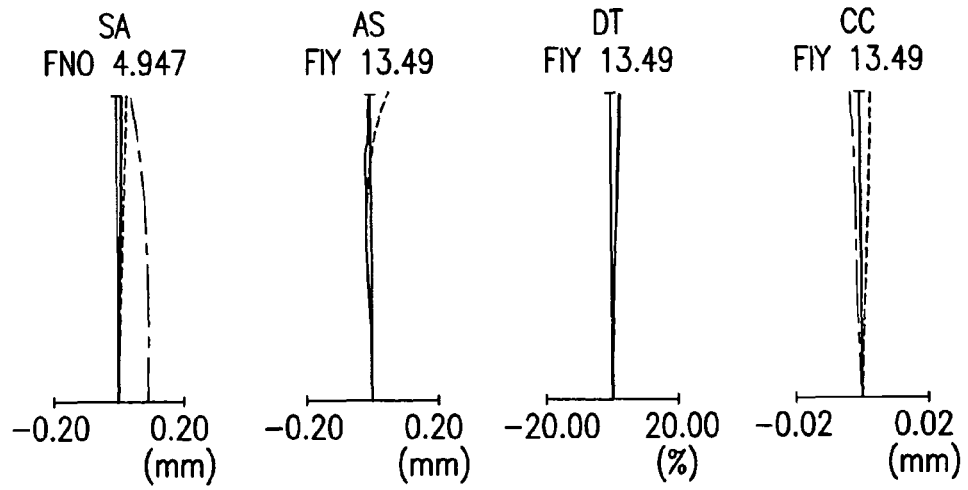
Figure 14C:
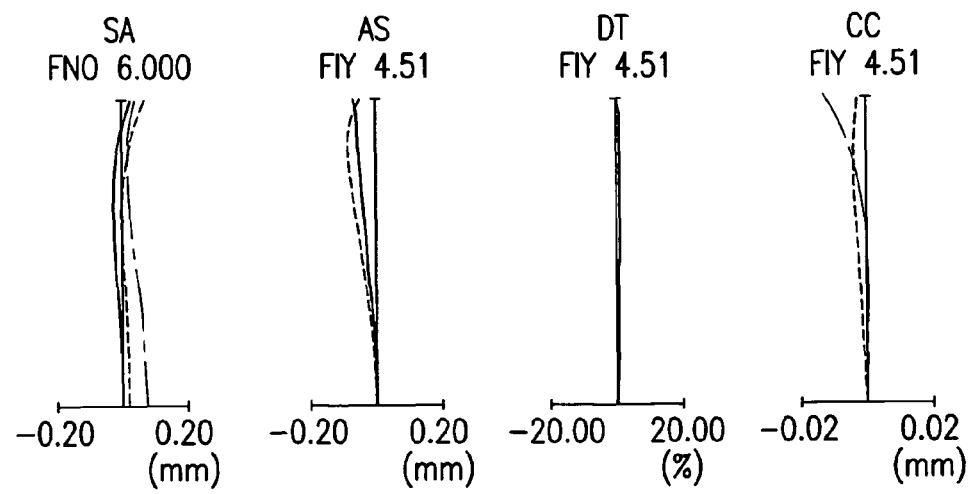
Figure 15A:
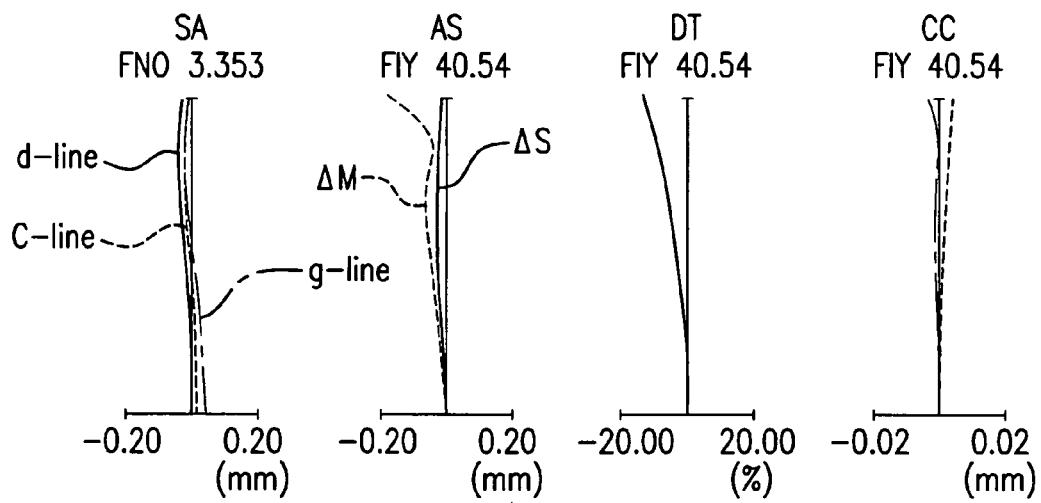
FIG. 15 is an aberration diagram for Example 5 upon focusing on an object point at infinity.
Figure 15B:
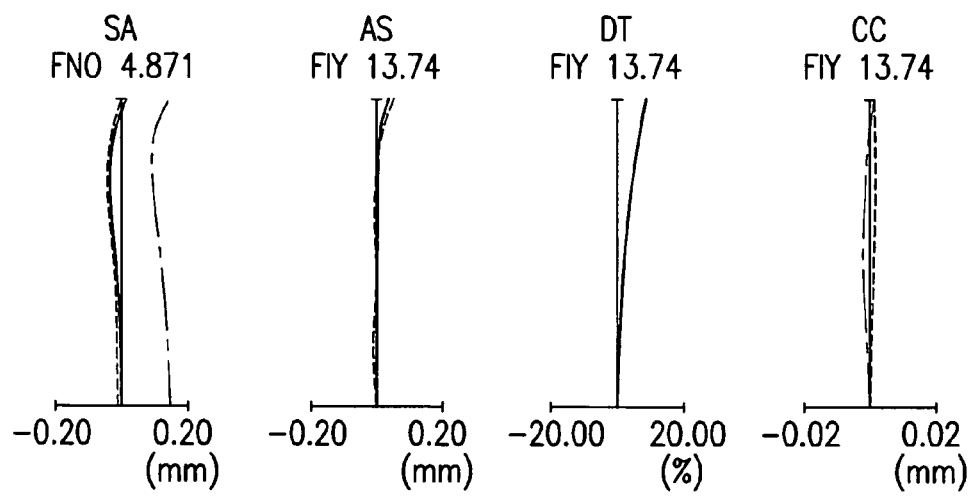
Figure 15C:
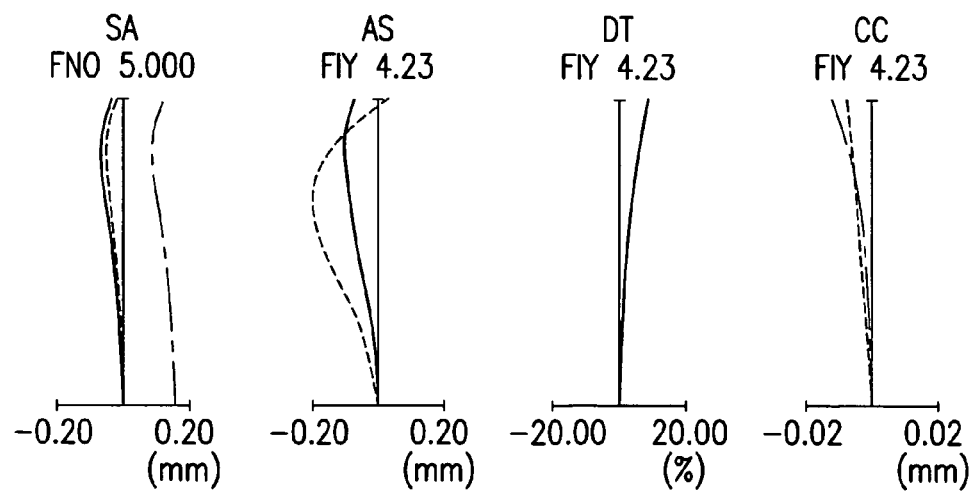
Figure 16A:
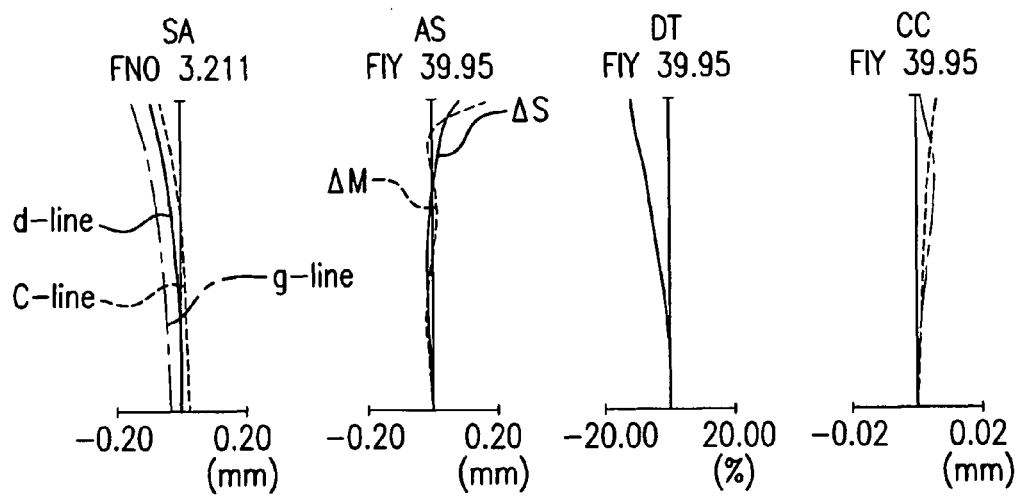
FIG. 16 is an aberration diagram for Example 6 upon focusing on an object point at infinity.
Figure 16B:
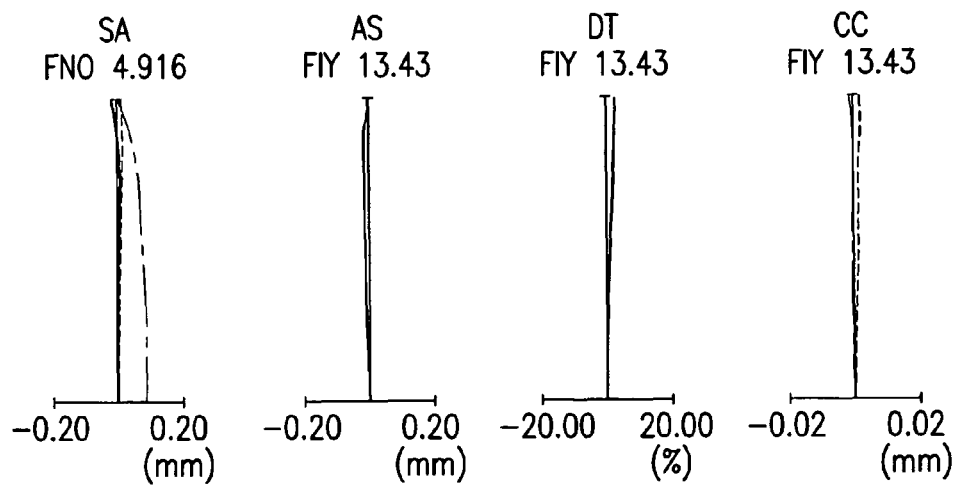
Figure 16C:
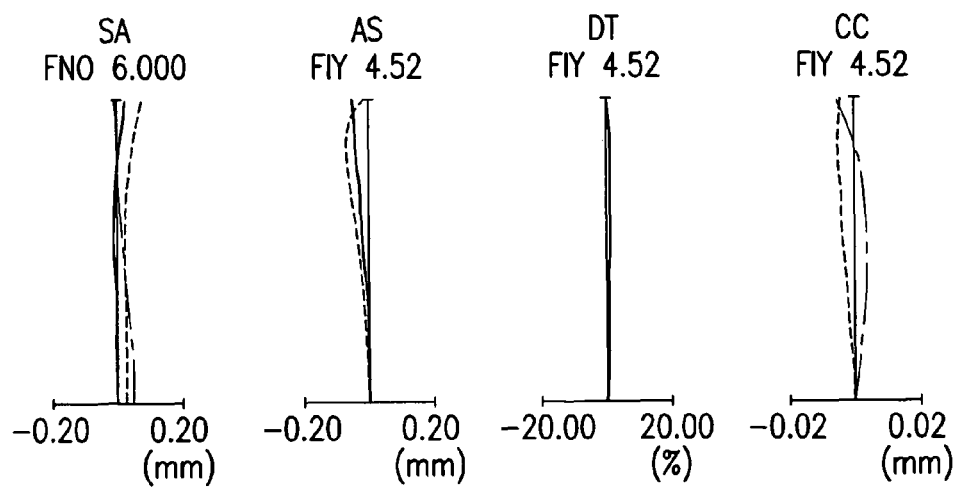
Figure 17A:
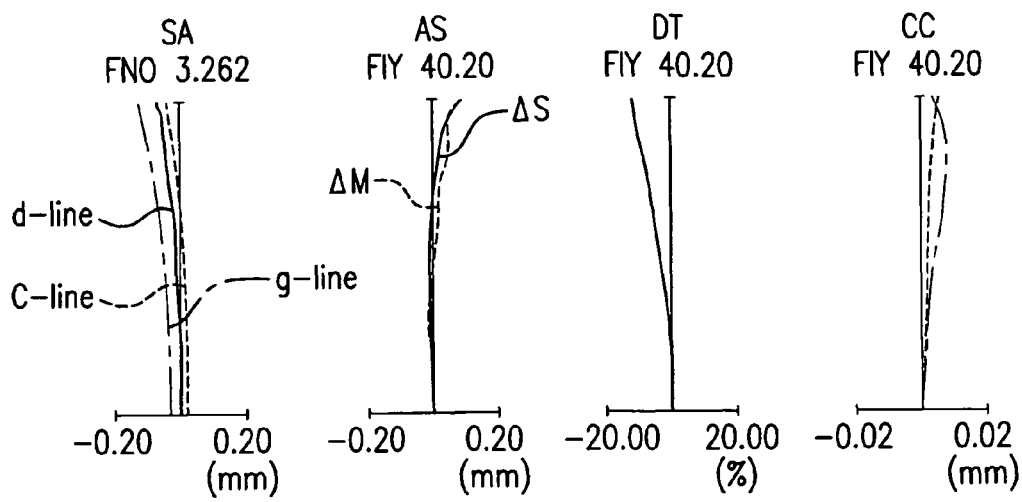
FIG. 17 is an aberration diagram for Example 7 upon focusing on an object point at infinity.
Figure 17B:
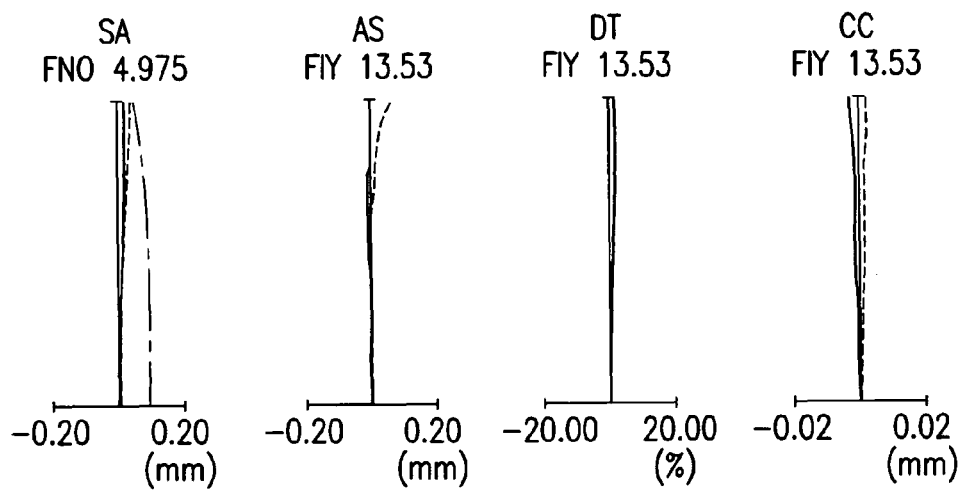
Figure 17C:
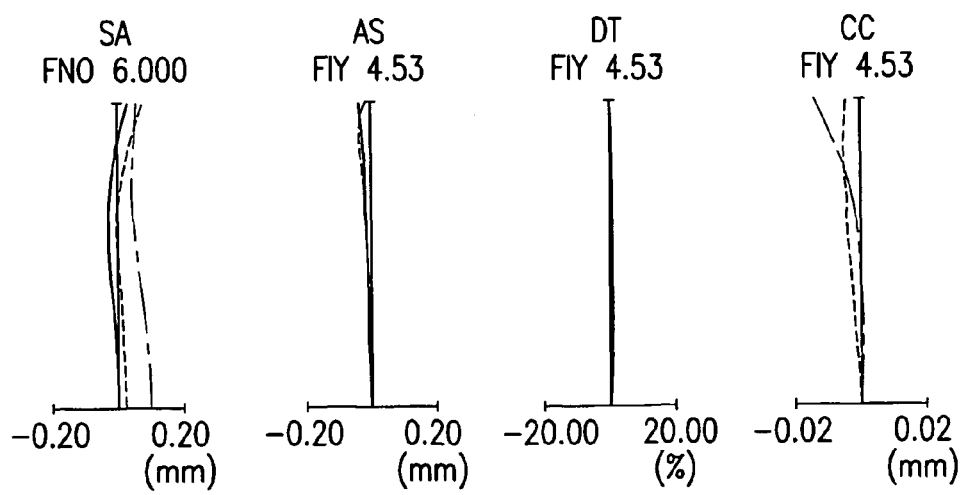
Figure 18A:
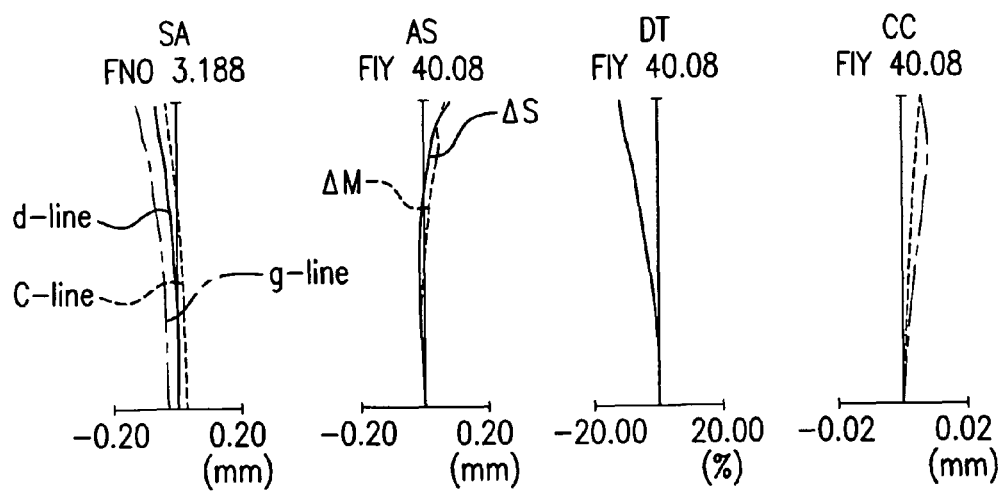
FIG. 18 is an aberration diagram for Example 8 upon focusing on an object point at infinity.
Figure 18B:
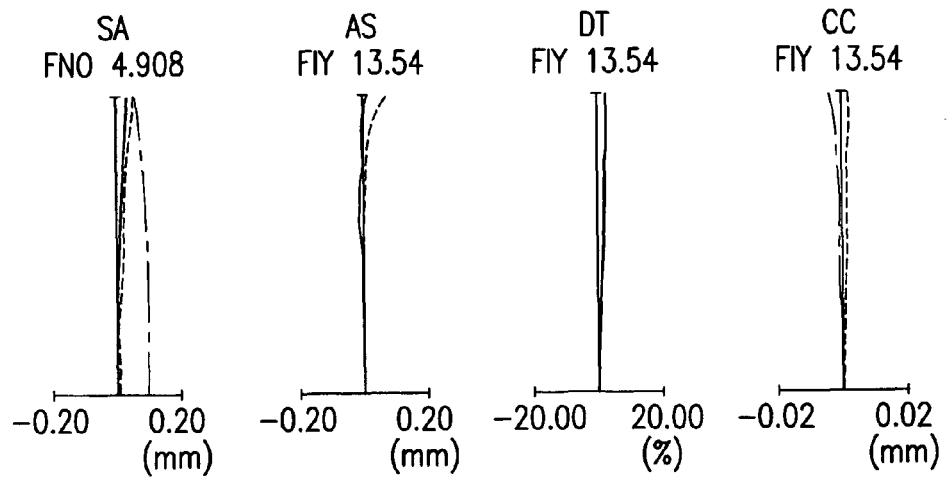
Figure 18C:
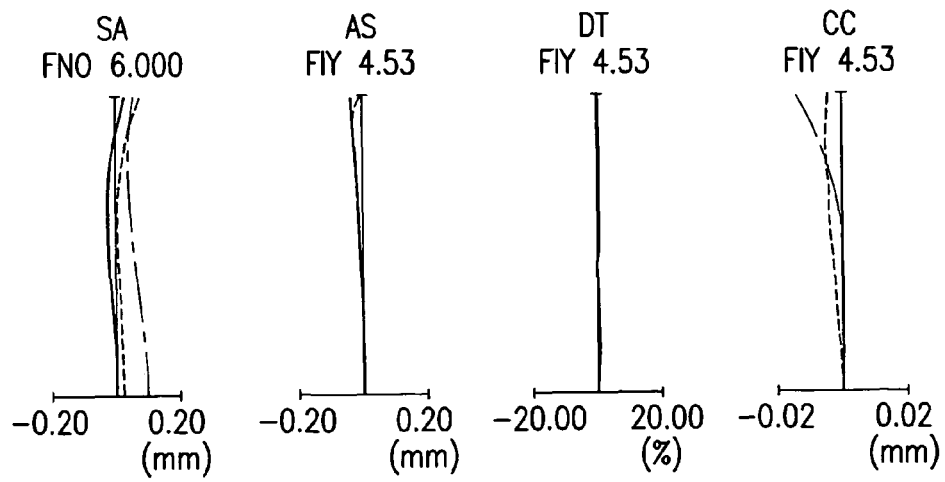
Figure 19A:
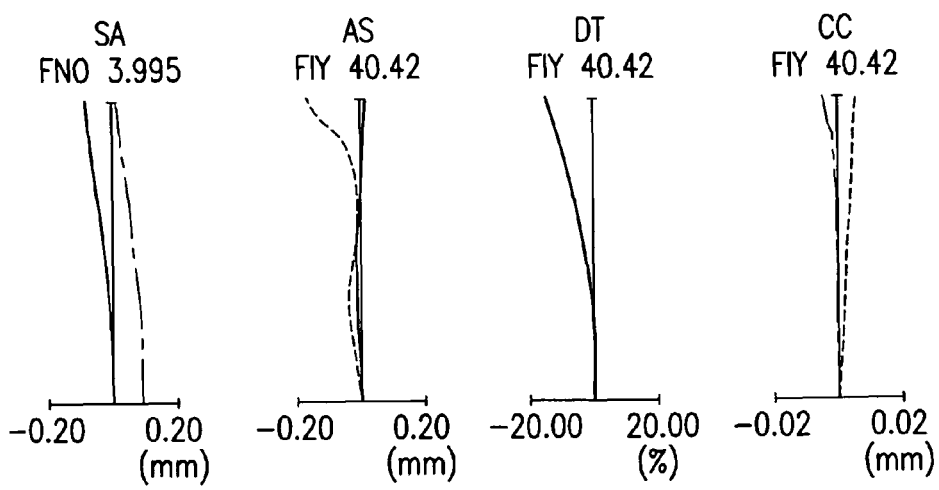
FIG. 19 is an aberration diagram for Example 9 upon focusing on an object point at infinity.
Figure 19B:
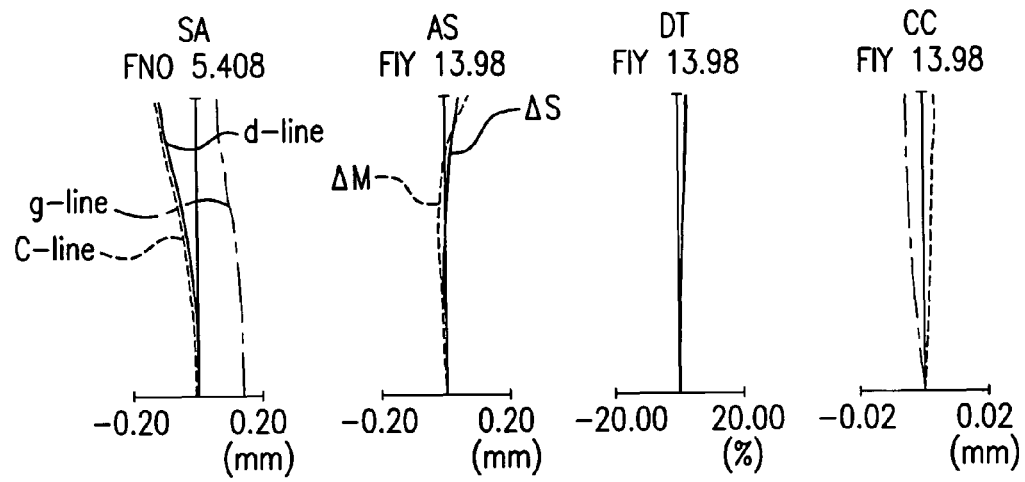
Figure 19C:
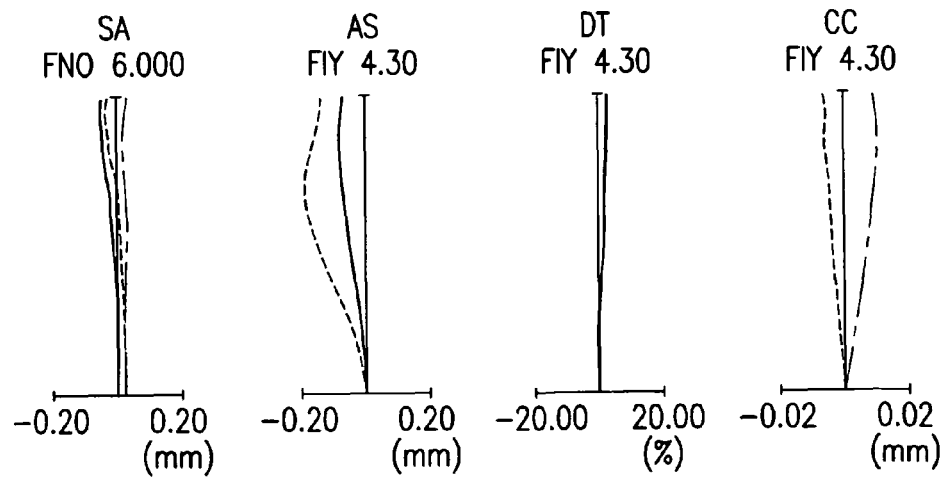
Figure 20A:
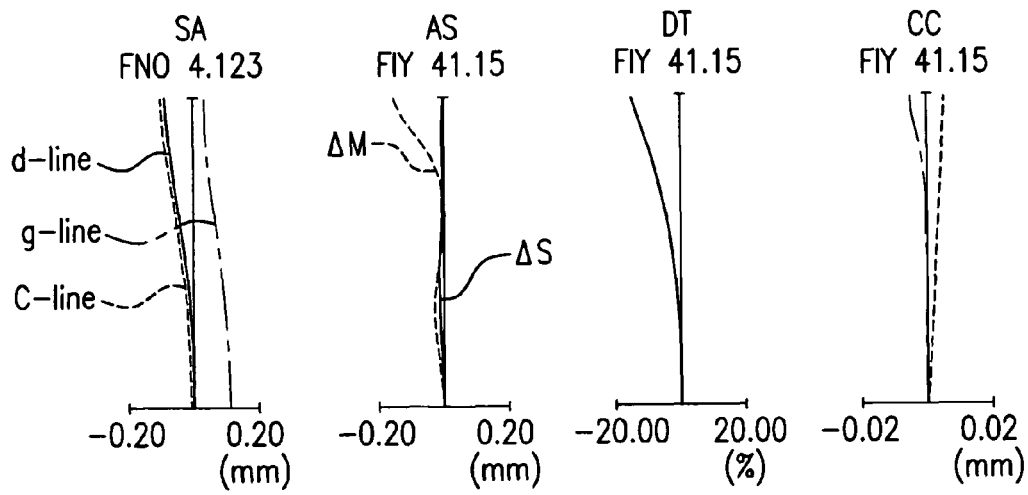
FIG. 20 is an aberration diagram for Example 10 upon focusing on an object point at infinity.
Figure 20B:
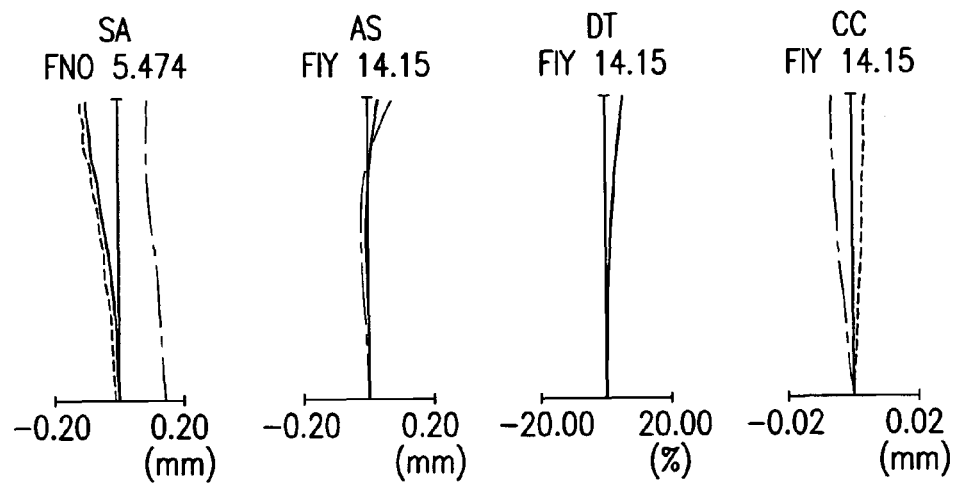
Figure 20C:
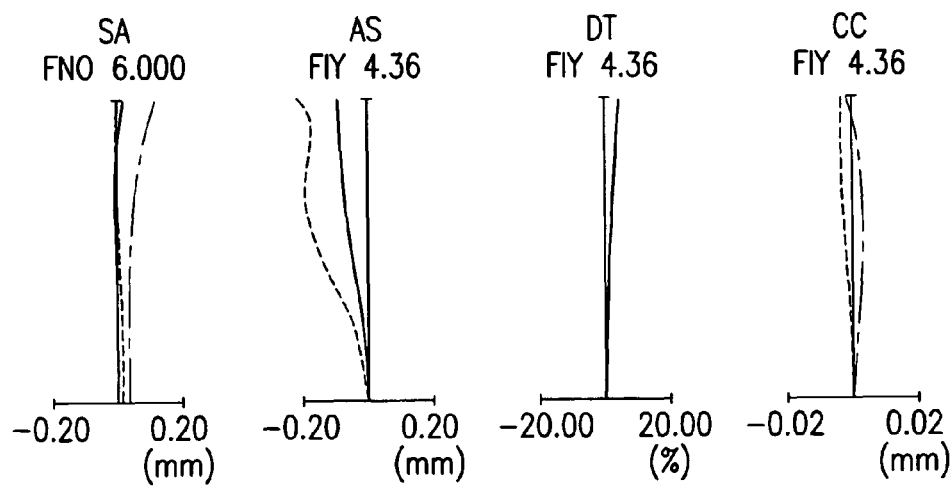

Example 10 is directed to a zoom lens made up of, in order from its object side, the first lens group G1 of positive refracting power, the second lens group G2 of negative refracting power, the aperture stop S, the third lens group G3 of positive refracting power and the fourth lens group G4, as shown in FIG. 10.

Upon zooming from the wide-angle end to the telephoto end, the respective lens groups move as follows.

The first lens group G1 moves toward the object side from the wide-angle end to the telephoto end.

From the wide-angle end to the intermediate state, the second lens group G2 moves toward the image side while the spacing between the first lens group G1 and it grows wide and the spacing between it and the third lens group G3 becomes narrow and, from the intermediate state to the telephoto end, the second lens group G2 moves toward the image side while the spacing between the first lens group G1 and it grows wide and the spacing between it and the third lens group G3 becomes narrow. In the intermediate state, the second lens group G2 is positioned more on the image side than at the wide-angle end, and at the telephoto end, it is positioned more on the image side than in the intermediate state.

From the wide-angle end to the telephoto end, the aperture stop S and the third lens group G3 move in unison toward the object side.

From the wide-angle end to the intermediate state, the fourth lens group G4 moves toward the object side while the spacing between the third lens group G3 and it grows wide and the spacing between it and the fifth lens group G5 grows wide, and from the intermediate state to the telephoto end, the fourth lens group G4 moves toward the image side while the spacing between the third lens group G3 and it grows wide and the spacing between it and the fifth lens group G5 becomes narrow. In the intermediate state, the fourth lens group G4 is positioned more on the object side than at the wide-angle end, and at the telephoto end, it is positioned more on the image side than at the wide-angle end.

In order from the object side, the first lens group G1 is made up of a cemented lens of a negative meniscus lens convex on its object side and a double-convex positive lens; the second lens group G2 is made up of a double-concave negative lens and a cemented lens of a positive meniscus lens convex on its image side and a negative meniscus lens convex on its image side; the third lens group G3 is made up of a double-convex positive lens and a negative meniscus lens convex on its object side; and the fourth lens group G4 is made up of one double-convex positive lens.

Eight aspheric surfaces are used: one at the surface of the cemented lens located in, and nearest to the image side of, the first lens group G1, two at both surfaces of the double-concave negative lens in the second lens group G2, one at the surface of the cemented lens nearest to the image side in the second lens group G2, two at both surfaces of the double-convex positive lens in the third lens group G3, one at the image-side surface of the negative meniscus lens in the third lens group G3, and one at the object-side surface of the double-convex positive lens in the fourth lens group G4.

Set out below are the numerical data about the zoom lens of each example.

With regard to Examples 11 to 20 similar in construction to Examples 1 to 10, there are only zoom lens data shown.

Symbols mentioned hereinafter but not hereinbefore have the following meanings:

r is the radius of curvature of each lens surface,
d is the space between adjoining lens surfaces,
n is the d-line refractive index of each lens,
νd is the d-line Abbe constant of each lens,
K is the conic coefficient,
A4, A6, A8, and A10 is the aspheric coefficient, and
E±n is ×10$^{\pm n}$.

Note here that each aspheric surface is given by the following equation using each aspheric coefficient in each example.

$$Z = (Y^2/r)/[1 + \{1-(K+1)\cdot(Y/r)^2\}^{1/2}] + A4\times Y^4 + A6\times Y^6 + A8\times Y^8 + A10\times Y^{10}$$

Here Z is the coordinates in the optical axis direction, and Y is the coordinates in a direction vertical to the optical axis.

Numerical Example 1
Unit mm

Surface data

| Surface No. | r | d | nd | vd |
|---|---|---|---|---|
| 1 | 18.671 | 0.80 | 1.94595 | 17.98 |
| 2 | 16.177 | 3.85 | 1.49700 | 81.54 |
| 3 (Aspheric surface) | −66.153 | Variable | | |
| 4 (Aspheric surface) | −24.070 | 0.80 | 1.85135 | 40.10 |
| 5 (Aspheric surface) | 5.779 | 2.57 | | |
| 6 | 59.959 | 1.60 | 2.00170 | 20.64 |
| 7 | −12.272 | 0.60 | 1.77250 | 49.60 |
| 8 (Aspheric surface) | 54.857 | Variable | | |
| 9 (Stop) | ∞ | 0.30 | | |
| 10 (Aspheric surface) | 4.180 | 2.35 | 1.49700 | 81.54 |
| 11 (Aspheric surface) | −14.626 | 0.10 | | |
| 12 | 5.823 | 0.70 | 2.00170 | 20.64 |
| 13 (Aspheric surface) | 3.620 | Variable | | |
| 14 | 62.555 | 1.60 | 1.76802 | 49.24 |
| 15 | −20.469 | Variable | | |
| 16 (Aspheric surface) | −46.810 | 0.40 | 1.52542 | 55.78 |
| 17 | −75.059 | 0.50 | | |
| 18 | ∞ | 0.50 | 1.51633 | 64.14 |
| 19 | ∞ | 0.37 | | |
| Image plane | ∞ | | | |

Aspheric surface data

3rd surface

K = 0.000, A4 = 2.04323E−05, A6 = −3.00803E−08
4th surface

K = 0.000, A4 = 1.18050E−03, A6 = −4.90687E−05, A8 = 9.80445E−07, A10 = −8.25305E−09
5th surface K = 0.000, A4 = 1.21707E−03, A6 = 3.60823E−05, A8 = −2.55122E−06, A10 = −1.82263E−08
8th surface K = 0.000, A4 = −4.99108E−04, A6 = −1.60668E−05, A8 = 4.60705E−07, A10 = −4.90352E−09
10th surface K = 0.000, A4 = −1.33737E−03, A6 = −2.81594E−05, A8 = −3.78589E−06, A10 = −7.30724E−08
11th surface K = 0.000, A4 = 9.13071E−04, A6 = −6.38110E−05, A8 = 2.56974E−06, A10 = −2.74414E−08
13th surface K = 0.000, A4 = −2.41554E−05, A6 = 8.05573E−05
16th surface

K = −0.082, A4 = 3.20633E−05, A6 = 3.75035E−07

Zoom lens data
Zoom ratio 9.35

| | Wide-angle | Intermediate | Telephoto |
|---|---|---|---|
| Focal length | 5.11 | 14.96 | 47.81 |
| F-number | 3.54 | 5.23 | 6.00 |
| Angle of view | 82.08 | 28.58 | 9.08 |
| Image height | 3.88 | 3.88 | 3.88 |
| Total lens length | 40.02 | 50.29 | 57.26 |
| BF | 1.19 | 1.16 | 1.28 |
| d3 | 0.30 | 8.11 | 18.43 |
| d8 | 12.41 | 5.40 | 1.14 |
| d13 | 4.28 | 13.50 | 17.72 |
| d15 | 6.16 | 6.44 | 3.03 |

Data on zoom lens groups

| Group | Starting surface | Focal length |
|---|---|---|
| 1 | 1 | 32.87 |
| 2 | 4 | −6.53 |
| 3 | 10 | 11.08 |
| 4 | 14 | 20.15 |
| 5 | 16 | −236.87 |

Numerical Example 2
Unit mm

Surface data

| Surface No. | r | d | nd | vd |
|---|---|---|---|---|
| 1 | 21.257 | 0.80 | 1.94595 | 17.98 |
| 2 | 18.209 | 3.85 | 1.49700 | 81.54 |
| 3 (Aspheric surface) | −66.917 | Variable | | |
| 4 (Aspheric surface) | −22.219 | 0.80 | 1.76802 | 49.24 |
| 5 (Aspheric surface) | 5.481 | 1.89 | | |
| 6 | 74.445 | 1.60 | 1.94595 | 17.98 |
| 7 | −23.299 | 0.60 | 1.76802 | 49.24 |
| 8 (Aspheric surface) | 215.699 | Variable | | |
| 9 (Stop) | ∞ | 0.30 | | |
| 10 (Aspheric surface) | 4.226 | 2.35 | 1.49700 | 81.54 |
| 11 (Aspheric surface) | −16.223 | 0.10 | | |
| 12 | 5.044 | 0.70 | 2.00170 | 20.64 |
| 13 (Aspheric surface) | 3.439 | Variable | | |
| 14 | −21.102 | 1.60 | 1.51825 | 64.14 |
| 15 (Aspheric surface) | −8.879 | Variable | | |
| 16 | ∞ | 0.40 | 1.51633 | 64.14 |
| 17 | ∞ | 0.50 | | |
| 18 | ∞ | 0.50 | 1.51633 | 64.14 |
| 19 | ∞ | 0.37 | | |
| Image plane | ∞ | | | |

Aspheric surface data

3rd surface

K = 0.000, A4 = 1.43757E−05, A6 = −1.36130E−08
4th surface

K = 0.000, A4 = 1.21703E−03, A6 = −5.46492E−05, A8 = 1.04169E−06, A10 = −7.77129E−09
5th surface K = 0.000, A4 = 1.04613E−03, A6 = 3.25777E−05, A8 = −2.65926E−06, A10 = −1.84775E−08
8th surface K = 0.000, A4 = −4.17728E−04, A6 = −2.92962E−05, A8 = 4.40061E−07, A10 = −4.99489E−09
10th surface K = 0.000, A4 = −1.10207E−03, A6 = −2.77492E−05, A8 = −3.77816E−06, A10 = −7.30453E−08
11th surface K = 0.000, A4 = 9.87282E−04, A6 = −6.65232E−05, A8 = 2.56751E−06, A10 = −2.74580E−08
13th surface -continued Numerical Example 2
Unit mm

K = 0.000, A4 = −1.52619E−05, A6 = 8.16567E−05
第15面
K = −2.836

Zoom lens data
Zoom ratio 9.35

|  | Wide-angle | Intermediate | Telephoto |
|---|---|---|---|
| Focal length | 5.10 | 14.79 | 49.26 |
| F-number | 3.35 | 4.87 | 5.00 |
| Angle of view | 81.14 | 27.47 | 8.45 |
| Image height | 3.88 | 3.88 | 3.88 |
| Total lens length | 39.80 | 48.84 | 56.76 |
| BF | 7.38 | 7.17 | 4.95 |
| d3 | 0.30 | 9.12 | 22.08 |
| d8 | 13.26 | 6.10 | 1.46 |
| d13 | 4.26 | 11.86 | 13.69 |
| d15 | 5.89 | 5.69 | 3.47 |

Data on zoom lens groups

| Group | Starting surface | Focal length |
|---|---|---|
| 1 | 1 | 36.74 |
| 2 | 4 | −6.49 |
| 3 | 10 | 10.09 |
| 4 | 14 | 28.20 |

Numerical Example 3
Unit mm

Surface data

| Surface No. | r | d | nd | νd |
|---|---|---|---|---|
| 1 | 20.909 | 0.80 | 2.00170 | 20.64 |
| 2 | 16.720 | 3.62 | 1.61881 | 63.85 |
| 3 (Aspheric surface) | −99.283 | Variable | | |
| 4 (Aspheric surface) | −76.528 | 0.80 | 1.83481 | 42.71 |
| 5 (Aspheric surface) | 7.133 | 2.58 | | |
| 6 | −206.923 | 1.63 | 2.10225 | 16.79 |
| 7 | −18.640 | 0.80 | 1.83481 | 42.71 |
| 8 (Aspheric surface) | 54.142 | Variable | | |
| 9 (Stop) | ∞ | 0.30 | | |
| 10 (Aspheric surface) | 5.593 | 2.49 | 1.69350 | 53.21 |
| 11 (Aspheric surface) | −19.473 | 0.08 | | |
| 12 | 5.572 | 1.46 | 1.49700 | 81.54 |
| 13 | 37.089 | 0.71 | 2.00330 | 28.27 |
| 14 | 3.573 | Variable | | |
| 15 (Aspheric surface) | 32.825 | 3.00 | 1.74330 | 49.33 |
| 16 (Aspheric surface) | −14.479 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.37 | | |
| Image plane | ∞ | | | |

Aspheric surface data

3rd surface

K = 0.000, A4 = 1.14689E−05, A6 = 4.83606E−09, A8 = −2.02752E−10,
A10 = 7.85884E−13
4th surface K = 9.178, A4 = 8.86386E−05, A6 = −2.97753E−06, A8 = 4.62415E−08,
A10 = −3.04205E−10
5th surface K = 0.265, A4 = 1.50448E−04, A6 = 6.43712E−06, A8 = −2.33528E−07,
A10 = −2.66160E−09

-continued

Numerical Example 3
Unit mm

8th surface

K = −1.493, A4 = −3.07535E−04, A6 = −4.47187E−06,
A8 = 2.37774E−07, A10 = −5.43727E−09
10th surface K = 0.822, A4 = −1.07173E−03, A6 = −3.12892E−05,
A8 = −1.48549E−06, A10 = −1.40758E−08
11th surface K = −3.282, A4 = 4.48842E−04, A6 = 3.09551E−06,
A8 = −8.51889E−07, A10 = 1.92356E−07
第15第
K = 0.000, A4 = 3.25911E−05, A6 = 1.49778E−07
16th surface

K = 0.000, A4 = 1.36486E−04, A6 = −4.26236E−06,
A8 = 7.39509E−08

Zoom lens data
Zoom ratio 9.35

|  | Wide-angle | Intermediate | Telephoto |
|---|---|---|---|
| Focal length | 5.14 | 15.85 | 49.07 |
| F-number | 3.22 | 4.92 | 6.00 |
| Angle of view | 80.40 | 26.86 | 9.00 |
| Image height | 3.88 | 3.88 | 3.88 |
| Total lens length | 42.87 | 51.96 | 57.58 |
| BF | 5.44 | 5.15 | 4.75 |
| d3 | 0.18 | 8.37 | 16.20 |
| d8 | 16.03 | 8.55 | 1.75 |
| d14 | 2.97 | 11.62 | 16.62 |
| d16 | 3.93 | 3.71 | 3.30 |

Data on zoom lens groups

| Group | Starting surface | Focal length |
|---|---|---|
| 1 | 1 | 32.05 |
| 2 | 4 | −7.25 |
| 3 | 10 | 10.94 |
| 4 | 15 | 13.89 |

Numerical Example 4
Unit mm

Surface data

| Surface No. | r | d | nd | νd |
|---|---|---|---|---|
| 1 | 20.015 | 0.80 | 2.00170 | 20.64 |
| 2 | 16.318 | 3.62 | 1.59201 | 67.02 |
| 3 (Aspheric surface) | −95.128 | Variable | | |
| 4 (Aspheric surface) | −72.309 | 0.80 | 1.83481 | 42.71 |
| 5 (Aspheric surface) | 7.089 | 2.58 | | |
| 6 | −222.779 | 1.64 | 2.10225 | 16.79 |
| 7 | −18.442 | 0.80 | 1.83481 | 42.71 |
| 8 (Aspheric surface) | 56.401 | Variable | | |
| 9 (Stop) | ∞ | 0.30 | | |
| 10 (Aspheric surface) | 5.596 | 2.49 | 1.69350 | 53.21 |
| 11 (Aspheric surface) | −19.119 | 0.08 | | |
| 12 | 5.586 | 1.46 | 1.49700 | 81.54 |
| 13 | 38.700 | 0.71 | 2.00330 | 28.27 |
| 14 | 3.565 | Variable | | |
| 15 (Aspheric surface) | 33.330 | 3.00 | 1.74330 | 49.33 |
| 16 (Aspheric surface) | −14.041 | Variable | | |
| 17 | ∞ | 0.40 | 1.54771 | 62.84 |
| 18 | ∞ | 0.50 | | |

-continued

Numerical Example 4
Unit mm

| | | | | |
|---|---|---|---|---|
| 19 | ∞ | 0.50 | 1.51633 | 64.14 |
| 20 | ∞ | 0.37 | | |
| Image plane | ∞ | | | |

Aspheric surface data

3rd surface

K = 0.000, A4 = 1.25893E−05, A6 = 5.29224E−09, A8 = −2.09551E−10,
A10 = 7.93834E−13
4th surface K = 7.869, A4 = 6.69751E−05, A6 = −2.58449E−06, A8 = 6.22145E−08,
A10 = −5.23773E−10
5th surface K = 0.227, A4 = 1.07973E−04, A6 = 6.32093E−06, A8 = −5.41685E−07,
A10 = 1.70854E−08
8th surface K = −1.493, A4 = −3.10021E−04, A6 = 5.60758E−07,
A8 = −8.83358E−08, A10 = −2.21573E−09
10th surface K = 0.822, A4 = −1.11343E−03, A6 = −3.05892E−05,
A8 = −1.85139E−06, A10 = −1.78845E−08
11th surface K = −2.814, A4 = 4.08676E−04, A6 = −1.21638E−06,
A8 = −7.04762E−07, A10 = 1.50032E−07
第15面
K = 0.000, A4 = 4.74683E−05, A6 = −7.77189E−07
16th surface

K = 0.000, A4 = 1.67236E−04, A6 = −5.05549E−06, A8 = 6.48089E−08

Zoom lens data
Zoom ratio 9.35

| | Wide-angle | Intermediate | Telephoto |
|---|---|---|---|
| Focal length | 5.11 | 15.78 | 48.99 |
| F-number | 3.24 | 4.95 | 6.00 |
| Angle of view | 80.45 | 26.99 | 9.02 |
| Image height | 3.88 | 3.88 | 3.88 |
| Total lens length | 42.85 | 51.98 | 57.55 |
| BF | 5.43 | 5.17 | 4.72 |
| d3 | 0.18 | 8.37 | 16.20 |
| d8 | 16.03 | 8.55 | 1.74 |
| d14 | 2.96 | 11.63 | 16.63 |
| d16 | 3.93 | 3.73 | 3.25 |

Data on zoom lens groups

| Group | Starting surface | Focal length |
|---|---|---|
| 1 | 1 | 32.03 |
| 2 | 4 | −7.26 |
| 3 | 10 | 10.97 |
| 4 | 15 | 13.59 |

Numerical Example 5
Unit mm

Surface data

| Surface No. | r | d | nd | vd |
|---|---|---|---|---|
| 1 | 21.257 | 0.80 | 1.94595 | 17.98 |
| 2 | 18.209 | 3.85 | 1.49700 | 81.54 |
| 3 (Aspheric surface) | −66.917 | Variable | | |

-continued

Numerical Example 5
Unit mm

| | | | | |
|---|---|---|---|---|
| 4 (Aspheric surface) | −22.219 | 0.80 | 1.76802 | 49.24 |
| 5 (Aspheric surface) | 5.481 | 1.89 | | |
| 6 | 74.445 | 1.60 | 1.94595 | 17.98 |
| 7 | −23.299 | 0.60 | 1.76802 | 49.24 |
| 8 (Aspheric surface) | 215.699 | Variable | | |
| 9 (Stop) | ∞ | 0.30 | | |
| 10 (Aspheric surface) | 4.226 | 2.35 | 1.49700 | 81.54 |
| 11 (Aspheric surface) | −16.223 | 0.10 | | |
| 12 | 5.044 | 0.70 | 2.00170 | 20.64 |
| 13 (Aspheric surface) | 3.439 | Variable | | |
| 14 | −21.102 | 1.60 | 1.51825 | 64.14 |
| 15 (Aspheric surface) | −8.879 | Variable | | |
| 16 | ∞ | 0.40 | 1.51633 | 64.14 |
| 17 | ∞ | 0.50 | | |
| 18 | ∞ | 0.50 | 1.51633 | 64.14 |
| 19 | ∞ | 0.37 | | |
| Image plane | ∞ | | | |

Aspheric surface data

3rd surface

K = 0.000, A4 = 1.43757E−05, A6 = −1.36130E−08
4th surface

K = 0.000, A4 = 1.21703E−03, A6 = −5.46492E−05, A8 = 1.04169E−06,
A10 = −7.77129E−09
5th surface K = 0.000, A4 = 1.04613E−03, A6 = 3.25777E−05, A8 = −2.65926E−06,
A10 = −1.84775E−08
8th surface K = 0.000, A4 = −4.17728E−04, A6 = −2.92962E−05,
A8 = 4.40061E−07, A10 = −4.99489E−09
10th surface K = 0.000, A4 = −1.10207E−03, A6 = −2.77492E−05,
A8 = −3.77816E−06, A10 = −7.30453E−08
11th surface K = 0.000, A4 = 9.87282E−04, A6 = −6.65232E−05, A8 = 2.56751E−06,
A10 = −2.74580E−08
13th surface

K = 0.000, A4 = −1.52619E−05, A6 = 8.16567E−05
第15面
K = −2.836

Zoom lens data
Zoom ratio 9.35

| | Wide-angle | Intermediate | Telephoto |
|---|---|---|---|
| Focal length | 5.10 | 14.79 | 49.26 |
| F-number | 3.35 | 4.87 | 5.00 |
| Angle of view | 81.14 | 27.47 | 8.45 |
| Image height | 3.88 | 3.88 | 3.88 |
| Total lens length | 39.80 | 48.84 | 56.76 |
| BF | 7.38 | 7.17 | 4.95 |
| d3 | 0.30 | 9.12 | 22.08 |
| d8 | 13.26 | 6.10 | 1.46 |
| d13 | 4.26 | 11.86 | 13.69 |
| d15 | 5.89 | 5.69 | 3.47 |

Data on zoom lens groups

| Group | Starting surface | Focal length |
|---|---|---|
| 1 | 1 | 36.74 |
| 2 | 4 | −6.49 |
| 3 | 10 | 10.09 |
| 4 | 14 | 28.20 |

Numerical Example 6
Unit mm

Surface data

| Surface No. | r | d | nd | vd |
|---|---|---|---|---|
| 1 | 20.846 | 0.80 | 2.00170 | 20.64 |
| 2 | 16.766 | 0.10 | | |
| 3 | 16.944 | 3.62 | 1.61881 | 63.85 |
| 4 (Aspheric surface) | −97.907 | Variable | | |
| 5 (Aspheric surface) | −77.096 | 0.80 | 1.83481 | 42.71 |
| 6 (Aspheric surface) | 7.139 | 2.58 | | |
| 7 | −210.704 | 1.63 | 2.10225 | 16.79 |
| 8 | −18.613 | 0.80 | 1.83481 | 42.71 |
| 9 (Aspheric surface) | 54.391 | Variable | | |
| 10 (Stop) | ∞ | 0.30 | | |
| 11 (Aspheric surface) | 5.591 | 2.49 | 1.69350 | 53.21 |
| 12 (Aspheric surface) | −19.444 | 0.08 | | |
| 13 | 5.570 | 1.46 | 1.49700 | 81.54 |
| 14 | 36.999 | 0.71 | 2.00330 | 28.27 |
| 15 | 3.573 | Variable | | |
| 16 (Aspheric surface) | 32.909 | 3.00 | 1.74330 | 49.33 |
| 17 (Aspheric surface) | −14.495 | Variable | | |
| 18 | ∞ | 0.40 | 1.54771 | 62.84 |
| 19 | ∞ | 0.50 | | |
| 20 | ∞ | 0.50 | 1.51633 | 64.14 |
| 21 | ∞ | 0.37 | | |
| Image plane | ∞ | | | |

Aspheric surface data

4th surface $K = 0.000, A4 = 1.11417E{-}05, A6 = 4.77301E{-}09, A8 = -1.76384E{-}10, A10 = 5.67505E{-}13$ 5th surface $K = 9.178, A4 = 8.69795E{-}05, A6 = -1.63148E{-}06, A8 = 8.03659E{-}09, A10 = -1.24224E{-}11$

第6面

$K = 0.265, A4 = 1.50147E{-}04, A6 = 7.13726E{-}06, A8 = -8.18039E{-}08, A10 = -8.56450E{-}09$

第9面

$K = -1.493, A4 = -3.05420E{-}04, A6 = -3.72321E{-}06, A8 = 1.95408E{-}07, A10 = -4.53534E{-}09$

11th surface $K = 0.822, A4 = -1.07795E{-}03, A6 = -3.09591E{-}05, A8 = -1.21284E{-}06, A10 = 1.00402E{-}08$

第12面

$K = -3.118, A4 = 4.44583E{-}04, A6 = 4.62513E{-}06, A8 = -3.41403E{-}07, A10 = 2.10091E{-}07$

16th surface $K = 0.000, A4 = 3.25824E{-}05, A6 = 4.25516E{-}07$

第17面

$K = 0.000, A4 = 1.37067E{-}04, A6 = -4.13492E{-}06, A8 = 7.46073E{-}08$

Zoom lens data
Zoom ratio 9.35

| | Wide-angle | Intermediate | Telephoto |
|---|---|---|---|
| Focal length | 5.12 | 15.83 | 48.93 |
| F-number | 3.21 | 4.92 | 6.00 |
| Angle of view | 79.98 | 26.88 | 9.04 |
| Image height | 3.88 | 3.88 | 3.88 |
| Total lens length | 42.93 | 51.97 | 57.60 |
| BF | 5.40 | 5.06 | 4.68 |
| d4 | 0.18 | 8.37 | 16.20 |
| d9 | 16.03 | 8.55 | 1.75 |
| d15 | 2.97 | 11.62 | 16.62 |
| d17 | 3.90 | 3.62 | 3.22 |

Data on zoom lens groups

| Group | Starting surface | Focal length |
|---|---|---|
| 1 | 1 | 32.05 |
| 2 | 5 | −7.27 |
| 3 | 11 | 10.91 |
| 4 | 16 | 13.85 |

Numerical Example 7
Unit mm

Surface data

| Surface No. | r | d | nd | vd |
|---|---|---|---|---|
| 1 | 19.302 | 0.80 | 2.00170 | 20.64 |
| 2 | 15.365 | 3.62 | 1.58913 | 61.14 |
| 3 (Aspheric surface) | −104.689 | Variable | | |
| 4 (Aspheric surface) | −93.884 | 0.80 | 1.83481 | 42.71 |
| 5 (Aspheric surface) | 6.716 | 2.58 | | |
| 6 | −700.605 | 1.68 | 2.10225 | 16.79 |
| 7 | −19.733 | 0.10 | | |
| 8 | −17.664 | 0.80 | 1.83481 | 42.71 |
| 9 (Aspheric surface) | 95.016 | Variable | | |
| 10 (Stop) | ∞ | 0.30 | | |
| 11 (Aspheric surface) | 5.420 | 2.49 | 1.69350 | 53.21 |
| 12 (Aspheric surface) | −19.583 | 0.08 | | |
| 13 | 5.498 | 1.46 | 1.49700 | 81.54 |
| 14 | 34.975 | 0.54 | 2.00330 | 28.27 |
| 15 | 3.525 | Variable | | |
| 16 (Aspheric surface) | 39.743 | 3.00 | 1.74330 | 49.33 |
| 17 (Aspheric surface) | −13.96 | Variable | | |
| 18 | ∞ | 0.40 | 1.54771 | 62.84 |
| 19 | ∞ | 0.50 | | |
| 20 | ∞ | 0.50 | 1.51633 | 64.14 |
| 21 | ∞ | 0.37 | | |
| Image plane | ∞ | | | |

Aspheric surface data

3rd surface $K = 0.000, A4 = 1.23054E{-}05, A6 = 2.60212E{-}09, A8 = -3.07823E{-}10, A10 = 1.71458E{-}12$ 4th surface $K = 7.869, A4 = 3.85724E{-}05, A6 = -1.69314E{-}06, A8 = 4.09224E{-}08, A10 = -3.42105E{-}10$ 5th surface $K = 0.227, A4 = 4.89518E{-}05, A6 = 5.35203E{-}06, A8 = -5.51299E{-}07, A10 = 1.60553E{-}08$

第9面

$K = -1.493, A4 = -3.26017E{-}04, A6 = 9.90185E{-}07, A8 = -1.35284E{-}07, A10 = -1.79042E{-}09$

11th surface $K = 0.781, A4 = -1.18366E{-}03, A6 = -2.67284E{-}05, A8 = -2.83249E{-}06, A10 = 2.20918E{-}08$

第12面

$K = -2.672, A4 = 4.44282E{-}04, A6 = 1.65015E{-}05, A8 = -3.53535E{-}06, A10 = 3.82848E{-}07$

16th surface $K = 0.000, A4 = 5.39933E{-}05, A6 = -2.94851E{-}06$

第17面

$K = 0.000, A4 = 1.52333E{-}04, A6 = -7.37192E{-}06, A8 = 8.02981E{-}08$

-continued

Numerical Example 7
Unit mm

Zoom lens data
Zoom ratio 9.35

|  | Wide-angle | Intermediate | Telephoto |
|---|---|---|---|
| Focal length | 5.12 | 15.83 | 49.08 |
| F-number | 3.26 | 4.97 | 6.00 |
| Angle of view | 80.46 | 27.07 | 9.06 |
| Image height | 3.88 | 3.88 | 3.88 |
| Total lens length | 42.91 | 51.75 | 57.66 |
| BF | 5.49 | 5.17 | 4.74 |
| d3 | 0.18 | 8.28 | 16.32 |
| d9 | 16.03 | 8.34 | 1.61 |
| d15 | 2.98 | 11.72 | 16.76 |
| d17 | 4.00 | 3.73 | 3.27 |

Data on zoom lens groups

| Group | Starting surface | Focal length |
|---|---|---|
| 1 | 1 | 32.45 |
| 2 | 4 | −7.30 |
| 3 | 11 | 10.95 |
| 4 | 16 | 14.17 |

Numerical Example 8
Unit mm

Surface data

| Surface No. | r | d | nd | vd |
|---|---|---|---|---|
| 1 | 19.671 | 0.80 | 2.00170 | 20.64 |
| 2 | 15.603 | 0.10 | | |
| 3 | 15.450 | 3.62 | 1.58913 | 61.14 |
| 4 (Aspheric surface) | −100.545 | Variable | | |
| 5 (Aspheric surface) | −84.986 | 0.80 | 1.83481 | 42.71 |
| 6 (Aspheric surface) | 6.782 | 2.58 | | |
| 7 | 20800.198 | 1.65 | 2.10225 | 16.79 |
| 8 | −20.211 | 0.10 | | |
| 9 | −17.058 | 0.80 | 1.83481 | 42.71 |
| 10 (Aspheric surface) | 114.384 | Variable | | |
| 11 (Stop) | ∞ | 0.30 | | |
| 12 (Aspheric surface) | 5.434 | 2.49 | 1.69350 | 53.21 |
| 13 (Aspheric surface) | −19.397 | 0.08 | | |
| 14 | 5.474 | 1.46 | 1.49700 | 81.54 |
| 15 | 33.364 | 0.52 | 2.00330 | 28.27 |
| 16 | 3.517 | Variable | | |
| 17 (Aspheric surface) | 40.792 | 2.99 | 1.74330 | 49.33 |
| 18 (Aspheric surface) | −13.902 | Variable | | |
| 19 | ∞ | 0.40 | 1.54771 | 62.84 |
| 20 | ∞ | 0.50 | | |
| 21 | ∞ | 0.50 | 1.51633 | 64.14 |
| 22 | ∞ | 0.37 | | |
| Image plane | ∞ | | | |

Aspheric surface data

4th surface

K = 0.000, A4 = 1.29756E−05, A6 = 6.43761E−09, A8 = −3.58863E−10, A10 = 2.03026E−12

5th surface

K = 7.869, A4 = 8.02051E−05, A6 = −2.23965E−06, A8 = 3.94995E−08, A10 = −3.00060E−10

第6面

K = 0.227, A4 = 7.38440E−05, A6 = 6.33121E−06, A8 = −4.73985E−07, A10 = 1.42758E−08

10th surface

K = −1.493, A4 = −3.07032E−04, A6 = −8.00912E−07, A8 = −8.47630E−08, A10 = −2.11918E−09

第12面

K = 0.781, A4 = −1.18705E−03, A6 = −2.86980E−05, A8 = −2.73106E−06, A10 = 5.40040E−09

13th surface

K = −2.671, A4 = 4.20020E−04, A6 = 1.36038E−05, A8 = −3.42454E−06, A10 = 3.29100E−07

第17面

K = 0.000, A4 = 5.57926E−05, A6 = −2.76078E−06

第18面

K = 0.000, A4 = 1.63767E−04, A6 = −7.83584E−06, A8 = 9.06245E−08

Zoom lens data
Zoom ratio 9.35

|  | Wide-angle | Intermediate | Telephoto |
|---|---|---|---|
| Focal length | 5.12 | 15.82 | 49.12 |
| F-number | 3.19 | 4.91 | 6.00 |
| Angle of view | 80.22 | 27.08 | 9.06 |
| Image height | 3.88 | 3.88 | 3.88 |
| Total lens length | 42.99 | 51.80 | 57.66 |
| BF | 5.51 | 5.18 | 4.72 |
| d4 | 0.18 | 8.26 | 16.33 |
| d10 | 16.03 | 8.33 | 1.58 |
| d16 | 2.99 | 11.75 | 16.76 |
| d18 | 3.65 | 3.37 | 2.88 |

Data on zoom lens groups

| Group | Starting surface | Focal length |
|---|---|---|
| 1 | 1 | 32.39 |
| 2 | 4 | −7.32 |
| 3 | 12 | 10.96 |
| 4 | 17 | 14.21 |

Numerical Example 9
Unit mm

Surface data

| Surface No. | r | d | nd | vd |
|---|---|---|---|---|
| 1 | 16.961 | 0.50 | 2.00330 | 28.272 |
| 2 | 14.770 | 4.00 | 1.43875 | 94.93 |
| 3 (Aspheric surface) | −53.613 | Variable | | |
| 4 (Aspheric surface) | −34.831 | 0.80 | 1.85135 | 40.10 |
| 5 (Aspheric surface) | 5.706 | 2.40 | | |
| 6 | −100.668 | 1.60 | 2.00170 | 20.64 |
| 7 | −10.639 | 0.60 | 1.77250 | 49.60 |
| 8 (Aspheric surface) | −637.390 | Variable | | |
| 9 (Stop) | ∞ | 0.30 | | |
| 10 (Aspheric surface) | 4.308 | 2.35 | 1.49700 | 81.54 |
| 11 (Aspheric surface) | −22.956 | 0.10 | | |
| 12 | 4.628 | 0.70 | 2.11753 | 16.79 |
| 13 (Aspheric surface) | 3.321 | Variable | | |
| 14 (Aspheric surface) | 47.653 | 1.60 | 1.76802 | 49.24 |
| 15 | −47.407 | Variable | | |
| 16 | ∞ | 0.40 | 1.51633 | 64.14 |
| 17 | ∞ | 0.40 | | |
| 18 | ∞ | 0.40 | 1.51633 | 64.14 |
| 19 | ∞ | 0.37 | | |
| Image plane | ∞ | | | |

-continued

Numerical Example 9
Unit mm

Aspheric surface data

3rd surface

K = 0.000, A4 = 2.35896E−05, A6 = −2.69490E−08
4th surface

K = 0.000, A4 = 1.11996E−03, A6 = −5.27085E−05, A8 = 1.02790E−06,
A10 = −8.27781E−09
5th surface K = 0.000, A4 = 1.14365E−03, A6 = 3.28026E−05, A8 = −2.56467E−06,
A10 = −1.82498E−08
8th surface K = 0.000, A4 = −3.36403E−04, A6 = −2.39068E−05,
A8 = 4.13921E−07, A10 = −5.00834E−09
10th surface K = 0.000, A4 = −8.40786E−04, A6 = −2.45662E−05,
A8 = −3.78182E−06, A10 = −7.30622E−08
11th surface K = 0.000, A4 = 7.01731E−04, A6 = −6.28115E−05, A8 = 2.56803E−06,
A10 = −2.74507E−08
13th surface K = 0.000, A4 = 1.25269E−04, A6 = 8.07357E−05
第14面
K = 0.003, A4 = −5.52596E−05, A6 = 4.86922E−06

Zoom lens data
Zoom ratio 9.35

|  | Wide-angle | Intermediate | Telephoto |
|---|---|---|---|
| Focal length | 5.10 | 14.79 | 49.28 |
| F-number | 3.99 | 5.41 | 6.00 |
| Angle of view | 80.86 | 27.97 | 8.59 |
| Image height | 3.80 | 3.80 | 3.80 |
| Total lens length | 42.32 | 48.72 | 56.76 |
| BF | 6.72 | 9.67 | 4.79 |
| d3 | 0.30 | 8.84 | 20.09 |
| d8 | 14.68 | 5.92 | 1.47 |
| d13 | 5.67 | 9.34 | 15.46 |
| d15 | 5.39 | 8.34 | 3.48 |

Data on zoom lens groups

| Group | Starting surface | Focal length |
|---|---|---|
| 1 | 1 | 34.37 |
| 2 | 4 | −6.52 |
| 3 | 10 | 10.76 |
| 4 | 14 | 31.02 |

Numerical Example 10
Unit mm

Surface data

| Surface No. | r | d | nd | vd |
|---|---|---|---|---|
| 1 | 16.897 | 0.20 | 2.00330 | 28.27 |
| 2 | 14.779 | 4.00 | 1.43875 | 94.93 |
| 3 (Aspheric surface) | −49.691 | Variable | | |
| 4 (Aspheric surface) | −31.866 | 0.80 | 1.85135 | 40.10 |
| 5 (Aspheric surface) | 5.725 | 2.40 | | |
| 6 | −117.803 | 1.60 | 2.00170 | 20.64 |
| 7 | −10.489 | 0.60 | 1.77250 | 49.60 |
| 8 (Aspheric surface) | −1044.801 | Variable | | |
| 9 (Stop) | ∞ | 0.30 | | |
| 10 (Aspheric surface) | 4.258 | 2.35 | 1.43875 | 94.93 |
| 11 (Aspheric surface) | −16.042 | 0.10 | | |
| 12 | 4.743 | 0.70 | 2.11753 | 16.79 |
| 13 (Aspheric surface) | 3.502 | Variable | | |
| 14 (Aspheric surface) | 53.061 | 1.60 | 1.76802 | 49.24 |
| 15 | −53.202 | Variable | | |
| 16 | ∞ | 0.40 | 1.51633 | 64.14 |
| 17 | ∞ | 0.40 | | |
| 18 | ∞ | 0.40 | 1.51633 | 64.14 |
| 19 | ∞ | 0.37 | | |
| Image plane | ∞ | | | |

Aspheric surface data

3rd surface

K = 0.000, A4 = 2.47118E−05, A6 = −3.04634E−08
4th surface

K = 0.000, A4 = 1.14452E−03, A6 = −5.29437E−05, A8 = 1.02645E−06,
A10 = −8.30318E−09
5th surface K = 0.000, A4 = 1.13134E−03, A6 = 3.28374E−05, A8 = −2.56480E−06,
A10 = −1.82504E−08
8th surface K = 0.000, A4 = −3.14067E−04, A6 = −2.40621E−05,
A8 = 4.11703E−07, A10 = −5.01045E−09
10th surface K = 0.000, A4 = −8.85261E−04, A6 = −2.50159E−05,
A8 = −3.78209E−06, A10 = −7.30617E−08
11th surface K = 0.000, A4 = 8.40012E−04, A6 = −6.26357E−05, A8 = 2.56818E−06,
A10 = −2.74502E−08
13th surface K = 0.000, A4 = 9.93954E−05, A6 = 8.05403E−05
第14面
K = 0.074, A4 = −9.22032E−05, A6 = 5.26721E−06

Zoom lens data
Zoom ratio 9.35

|  | Wide-angle | Intermediate | Telephoto |
|---|---|---|---|
| Focal length | 5.10 | 14.79 | 49.29 |
| F-number | 4.12 | 5.47 | 6.00 |
| Angle of view | 82.31 | 28.29 | 8.71 |
| Image height | 3.88 | 3.88 | 3.88 |
| Total lens length | 43.17 | 49.09 | 56.58 |
| BF | 6.76 | 10.23 | 4.82 |
| d3 | 0.30 | 8.98 | 20.04 |
| d8 | 15.23 | 6.15 | 1.55 |
| d13 | 6.24 | 9.07 | 15.52 |
| d15 | 5.43 | 8.89 | 3.53 |

Data on zoom lens groups

| Group | Starting surface | Focal length |
|---|---|---|
| 1 | 1 | 33.69 |
| 2 | 4 | −6.52 |
| 3 | 10 | 11.00 |
| 4 | 14 | 34.65 |

Numerical Example 11
Unit mm

|  | Wide-angle | Intermediate | Telephoto |
|---|---|---|---|
| Focal length | 5.11 | 14.96 | 47.81 |
| F-number | 3.54 | 5.23 | 6.00 |
| Angle of view | 78.15 | 28.58 | 9.08 |
| Image height | 3.66 | 3.88 | 3.88 |

Numerical Example 12
Unit mm

|  | Wide-angle | Intermediate | Telephoto |
|---|---|---|---|
| Focal length | 5.10 | 14.79 | 49.26 |
| F-number | 3.35 | 4.87 | 5.00 |
| Angle of view | 77.31 | 27.47 | 8.45 |
| Image height | 3.69 | 3.88 | 3.88 |

Numerical Example 13
Unit mm

|  | Wide-angle | Intermediate | Telephoto |
|---|---|---|---|
| Focal length | 5.14 | 15.85 | 49.07 |
| F-number | 3.22 | 4.92 | 6.00 |
| Angle of view | 77.63 | 26.86 | 9.00 |
| Image height | 3.71 | 3.88 | 3.88 |

Numerical Example 14
Unit mm

|  | Wide-angle | Intermediate | Telephoto |
|---|---|---|---|
| Focal length | 5.11 | 15.78 | 48.99 |
| F-number | 3.24 | 4.95 | 6.00 |
| Angle of view | 77.73 | 26.99 | 9.02 |
| Image height | 3.71 | 3.88 | 3.88 |

Numerical Example 15
Unit mm

|  | Wide-angle | Intermediate | Telephoto |
|---|---|---|---|
| Focal length | 5.10 | 14.79 | 49.26 |
| F-number | 3.35 | 4.87 | 5.00 |
| Angle of view | 80.41 | 28.65 | 8.84 |
| Image height | 3.69 | 3.88 | 3.88 |

Numerical Example 16
Unit mm

|  | Wide-angle | Intermediate | Telephoto |
|---|---|---|---|
| Focal length | 5.12 | 15.83 | 48.93 |
| F-number | 3.21 | 4.92 | 6.00 |
| Angle of view | 77.67 | 26.88 | 9.04 |
| Image height | 3.74 | 3.88 | 3.88 |

Numerical Example 17
Unit mm

|  | Wide-angle | Intermediate | Telephoto |
|---|---|---|---|
| Focal length | 5.12 | 15.83 | 49.08 |
| F-number | 3.26 | 4.97 | 6.00 |
| Angle of view | 77.63 | 27.07 | 9.06 |
| Image height | 3.71 | 3.88 | 3.88 |

Numerical Example 18
Unit mm

|  | Wide-angle | Intermediate | Telephoto |
|---|---|---|---|
| Focal length | 5.12 | 15.82 | 49.12 |
| F-number | 3.19 | 4.91 | 6.00 |
| Angle of view | 77.54 | 27.08 | 9.06 |
| Image height | 3.72 | 3.88 | 3.88 |

Numerical Example 19
Unit mm

|  | Wide-angle | Intermediate | Telephoto |
|---|---|---|---|
| Focal length | 5.10 | 14.79 | 49.28 |
| F-number | 3.99 | 5.41 | 6.00 |
| Angle of view | 76.72 | 27.97 | 8.59 |
| Image height | 3.59 | 3.80 | 3.80 |

Numerical Example 20
Unit mm

|  | Wide-angle | Intermediate | Telephoto |
|---|---|---|---|
| Focal length | 5.10 | 14.79 | 49.28 |
| F-number | 3.99 | 5.41 | 6.00 |
| Angle of view | 76.72 | 27.97 | 8.59 |
| Image height | 3.61 | 3.88 | 3.88 |

FIGS. 11 to 20 are aberration diagrams for Examples 1 to 10 upon focusing on an object point at infinity. In these aberration diagrams, (a), (b) and (c) are indicative of spherical aberrations, astigmatism, distortion and chromatic aberration of magnification at the wide-angle end, in the intermediate state, and at the telephoto end, respectively, and FIY stands for a half angle of view. Note here that there are no aberration diagrams presented for Examples 11 to 20 attached hereto because they are similar in construction to Examples 1 to 10, respectively.

Set out below are the values of conditions (1) to (13) in the aforesaid Examples 1 to 10.

| Condition | Example 1 | Example 2 | Example 3 | Example 4 | Example 5 |
|---|---|---|---|---|---|
| (1) | 9.35 | 9.66 | 9.55 | 9.58 | 9.66 |
| (2) | 1.50 | 1.50 | 1.62 | 1.59 | 1.50 |
| (3) | 1.07 | 1.05 | 1.06 | 1.07 | 1.05 |
| (4) | 1.96 | 1.96 | 2.00 | 2.01 | 1.96 |
| (5) | 17.98 | 17.98 | 20.64 | 20.64 | 17.98 |
| (6) | 0.208 | 0.208 | 0.221 | 0.221 | 0.208 |
| (7) | −13.98 | −12.95 | −8.98 | −9.83 | −12.95 |
| (8) | 0.46 | 0.46 | 0.38 | 0.42 | 0.46 |
| (9) | 63.56 | 63.56 | 43.21 | 46.38 | 63.56 |
| (10) | 0.688 | 0.746 | 0.653 | 0.654 | 0.746 |
| (11) | −0.137 | −0.132 | −0.148 | −0.148 | −0.132 |
| (12) | 0.759 | 0.761 | 0.755 | 0.759 | 0.761 |
| (13) | 14.80 | 14.71 | 14.92 | 14.91 | 14.71 |

| Condition | Example 6 | Example 7 | Example 8 | Example 9 | Example 10 |
|---|---|---|---|---|---|
| (1) | 9.55 | 9.59 | 9.59 | 9.66 | 9.67 |
| (2) | 1.62 | 1.59 | 1.59 | 1.44 | 1.44 |
| (3) | 1.05 | 1.10 | 1.09 | 1.09 | 1.07 |
| (4) | 2.01 | 2.01 | 2.01 | 2.01 | 2.01 |
| (5) | 20.64 | 20.64 | 20.64 | 28.27 | 28.27 |
| (6) | 0.221 | 0.221 | 0.221 | 0.125 | 0.050 |
| (7) | −9.22 | −8.81 | −8.67 | −8.67 | −14.96 |
| (8) | 0.39 | 0.42 | 0.42 | 0.57 | 0.57 |
| (9) | 43.21 | 40.50 | 40.50 | 66.66 | 66.66 |
| (10) | 0.655 | 0.661 | 0.659 | 0.697 | 0.683 |
| (11) | −0.149 | −0.149 | −0.149 | −0.132 | −0.132 |
| (12) | 0.757 | 0.758 | 0.758 | 0.745 | 0.761 |
| (13) | 14.93 | 14.94 | 14.94 | 15.01 | 14.65 |

| Condition | Example 11 | Example 12 | Example 13 | Example 14 | Example 15 |
|---|---|---|---|---|---|
| (1) | 9.35 | 9.66 | 9.55 | 9.58 | 9.66 |
| (2) | 1.50 | 1.50 | 1.62 | 1.59 | 1.50 |
| (3) | 1.07 | 1.05 | 1.06 | 1.07 | 1.05 |
| (4) | 1.96 | 1.96 | 2.00 | 2.01 | 1.96 |
| (5) | 17.98 | 17.98 | 20.64 | 20.64 | 17.98 |
| (6) | 0.208 | 0.208 | 0.221 | 0.221 | 0.208 |
| (7) | −13.98 | −12.95 | −8.98 | −9.83 | −12.95 |
| (8) | 0.46 | 0.46 | 0.38 | 0.42 | 0.46 |
| (9) | 63.56 | 63.56 | 43.21 | 46.38 | 63.56 |
| (10) | 0.688 | 0.746 | 0.653 | 0.654 | 0.746 |
| (11) | −0.137 | −0.132 | −0.148 | −0.148 | −0.132 |
| (12) | 0.717 | 0.724 | 0.723 | 0.726 | 0.724 |
| (13) | 15.70 | 15.47 | 15.59 | 15.58 | 15.47 |

| Condition | Example 16 | Example 17 | Example 18 | Example 19 | Example 20 |
|---|---|---|---|---|---|
| (1) | 9.55 | 9.59 | 9.59 | 9.66 | 9.67 |
| (2) | 1.62 | 1.59 | 1.59 | 1.44 | 1.44 |
| (3) | 1.05 | 1.10 | 1.09 | 1.09 | 1.07 |
| (4) | 2.01 | 2.01 | 2.01 | 2.01 | 2.01 |
| (5) | 20.64 | 20.64 | 20.64 | 28.27 | 28.27 |
| (6) | 0.221 | 0.221 | 0.221 | 0.125 | 0.050 |
| (7) | −9.22 | −8.81 | −8.67 | −8.67 | −14.96 |
| (8) | 0.39 | 0.42 | 0.42 | 0.57 | 0.57 |
| (9) | 43.21 | 40.50 | 40.50 | 66.66 | 66.66 |
| (10) | 0.655 | 0.661 | 0.659 | 0.697 | 0.683 |
| (11) | −0.149 | −0.149 | −0.149 | −0.132 | −0.132 |
| (12) | 0.729 | 0.725 | 0.726 | 0.703 | 0.709 |
| (13) | 15.50 | 15.63 | 15.60 | 15.91 | 15.73 |

Each example may further be modified as follows.

In the zoom lens of each example, barrel distortion is produced on the rectangular photoelectric transformation plane at the wide-angle end, while the occurrence of distortion is hold back near an intermediate focal length or at the telephoto end. For electrical correction of distortion, the effective imaging area should preferably be configured into barrel form at the wide-angle end and rectangular form near the intermediate focal length or at the telephoto end. And the predetermined effective imaging area is converted by image processing into rectangular image information with reduced distortion. The image height $I_{mw}$ at the wide-angle end is lower than the image height $I_{mt}$ at the telephoto end.

Preferably, the zoom lens has an image transformation block in which electric signals for an image taken through the zoom lens are transformed into image signals that are corrected by image processing for color shifts from chromatic aberration of magnification. Electric correction of the zoom lens for chromatic aberration of magnification is going to make sure much better images are obtained.

Generally speaking, an electronic still camera is designed such that the image of a subject is separated into three primary colors images: the first, the second and the third primary color image, so that the respective output signals are superposed one upon another by operation to reconstruct a color image. Suppose here that a zoom lens has chromatic aberration of magnification. Then, given an image from light of the first primary color, the positions where light of the second and the third primary color is imaged is going to be off the position where the light of the first primary color is imaged. For electronic correction of the image for chromatic aberration of magnification, the amount of shifts of the imaging positions for the second and the third primary color from that for the first primary color is previously found for each pixel of an imaging device based on aberration information about the zoom lens. Then, coordination transformation is implemented such that only the amount of the shifts from the first primary color is corrected for each pixel of the taken image.

Referring typically to an image made up of three primary colors output signals of red (R), green (G) and blue (B), shifts of the imaging positions R and B from G are first found for each pixel. Then, coordination transformation is applied to the taken image to eliminate any shift from G, and finally signals of R and G are produced.

Chromatic aberration of magnification varies with zoom, focus and f numbers; it is preferable that the amount of shifts of the second and the third primary color from the first primary color is stored as correction data in a storage device for each lens position (zoom, focus and f numbers). By referring to this correction data depending on the zoom position, it is possible to produce the second and the third primary color signals that are corrected for the shifts of the second and the third primary color from the first primary color signal.

To cut off unwanted light such as ghosts and flares, it is acceptable to rely on a flare stop other than the aperture stop. That flare stop may then be located somewhere on the object side of the first lens group, between the first and the second lens group, between the second and the third lens group, between the third and the fourth lens group, between the fourth and the fifth lens group, and between the group nearest to the image plane side and the image plane. A frame member or other member may also be located to cut off flare rays. For that purpose, the optical system may be directly printed, coated or sealed in any desired shape inclusive of round, oval, rectangular, polygonal shapes or a shape delimited by a function curve. Further, just only a harmful light beam but also coma flares around the screen may be cut off.

Each lens may be applied with an antireflection coating to reduce ghosts and flares. A multicoating is then desired because of being capable of effectively reducing ghosts and flares. Each lens, a cover glass or the like may just as well be applied with an infrared cut coating.

Desirously, focusing for the adjusting the focus is implemented with the lens group nearest to the image plane side. Focusing with that lens group eases off loads on a motor because the lens weight is light, and works for making the lens barrel compact because there is none of the change in the total length during zooming, and a drive motor is mounted in the lens barrel.

As noted just above, it is desired that focusing for adjusting the focus is implemented with the lens group nearest to the image plane side; however, it may be implemented with the first, the second, the third or the fourth lens group, or by the movement of multiple lens groups. The movement of multiple lens groups is more effectively capable of holding back deterioration of the performance in association with focusing. Furthermore, focusing may be implemented by letting out the whole lens system or letting out or in some lenses.

The shading of brightness at the peripheral position of an image may be reduced by shifting the mircolenses of a CCD. For instance, the CCD microlens design may be modified in conformity with the angle of incidence of light rays at each image height, or decreases in the quantity of light at the peripheral position of the image may be corrected by image processing.

By the way, an antireflection coating is generally applied to the air contact surface of a lens for the purpose of preventing ghosts and flares. At the cementing surface of a cemented lens, on the other hand, the refractive index of an adhesive material is much higher than that of air; in most cases, the cementing surface has a reflectivity that is on a par with or lower than that of a single layer coating, so that there is little need of applying the antireflection coating to it. However, if the antireflection coating is intentionally applied to the cementing surface too, there are then further reductions achievable in ghosts and flares, which could in turn make sure images of better quality.

Especially in recent years, vitreous materials having high refractive indices have gained popularity, and they have often been used with camera optical systems for the reasons of their enhanced effect on correction of aberrations. When a high-refractive-index vitreous material is used as a cemented lens, however, the reflection of light off the cementing surface would also be not negligible. In such a case, it would be particularly effective to have an antireflection coating applied on the cementing surface.

Effective use of cementing surface coating is disclosed in JP(A)s 2-27301, 2001-324676 and 2005-92115 and U.S. Pat. No. 7,116,482, etc. In those publications, there is the particular mention of the cementing lens surface coating in the first lens group of the zoom lens having positive power at the foremost lens group. In the invention, too, the cementing lens surface in the first lens group of positive power may just as well be coated, as set forth there.

Depending on the refractive index of the lens involved and the refractive index of the adhesive material used, use may be made of coating materials of relatively high refractive indices such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ as well as coating materials of relatively low refractive indices such as $MgF_2$, $SiO_2$, and $Al_2O_3$. These coating materials may then have a suitable thickness selected in such a way as to meet phase conditions. As a matter of course, the cementing surface coating may just as well be multi-coating as is the case with the coating to the air contact surface of the lens. By optional combinations of two- or multi-layer coating materials with thicknesses, it is possible to achieve a further lowering of reflectivity, and control the spectral and angle properties of reflectivity, etc. On the base of a similar idea, cementing surface coating can effectively be applied to lens cementing surfaces other than those in the first lens group, too.

Figure 21:
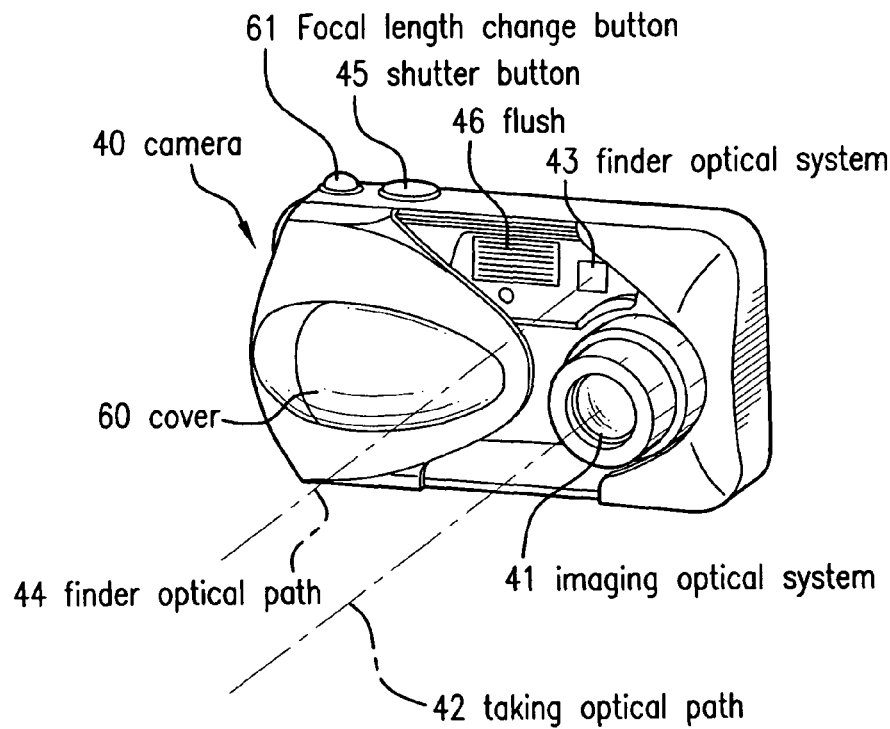
FIG. 21 is a front perspective view of the outside shape of a digital camera according to the invention.
Figure 22:
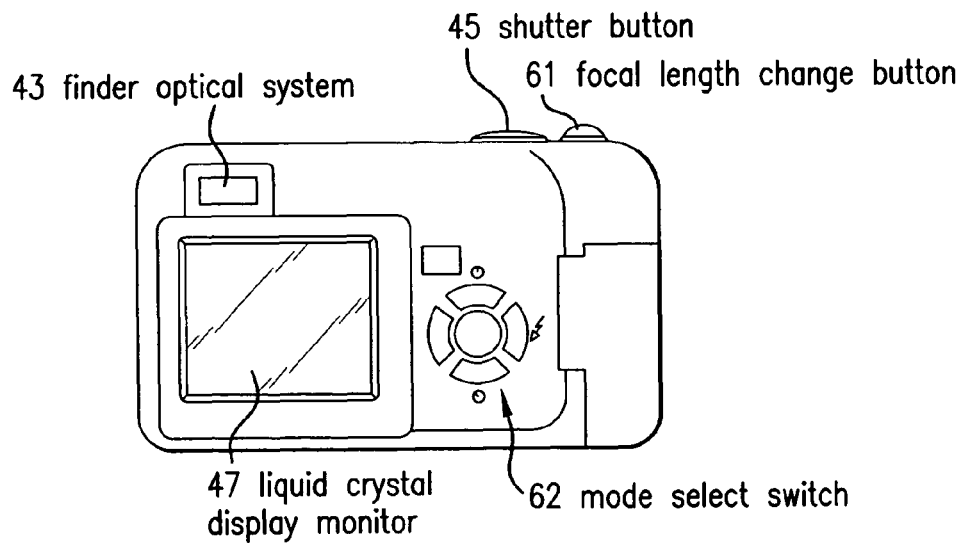
FIG. 22 is a rear perspective view of the digital camera of FIG. 21.
Figure 23:
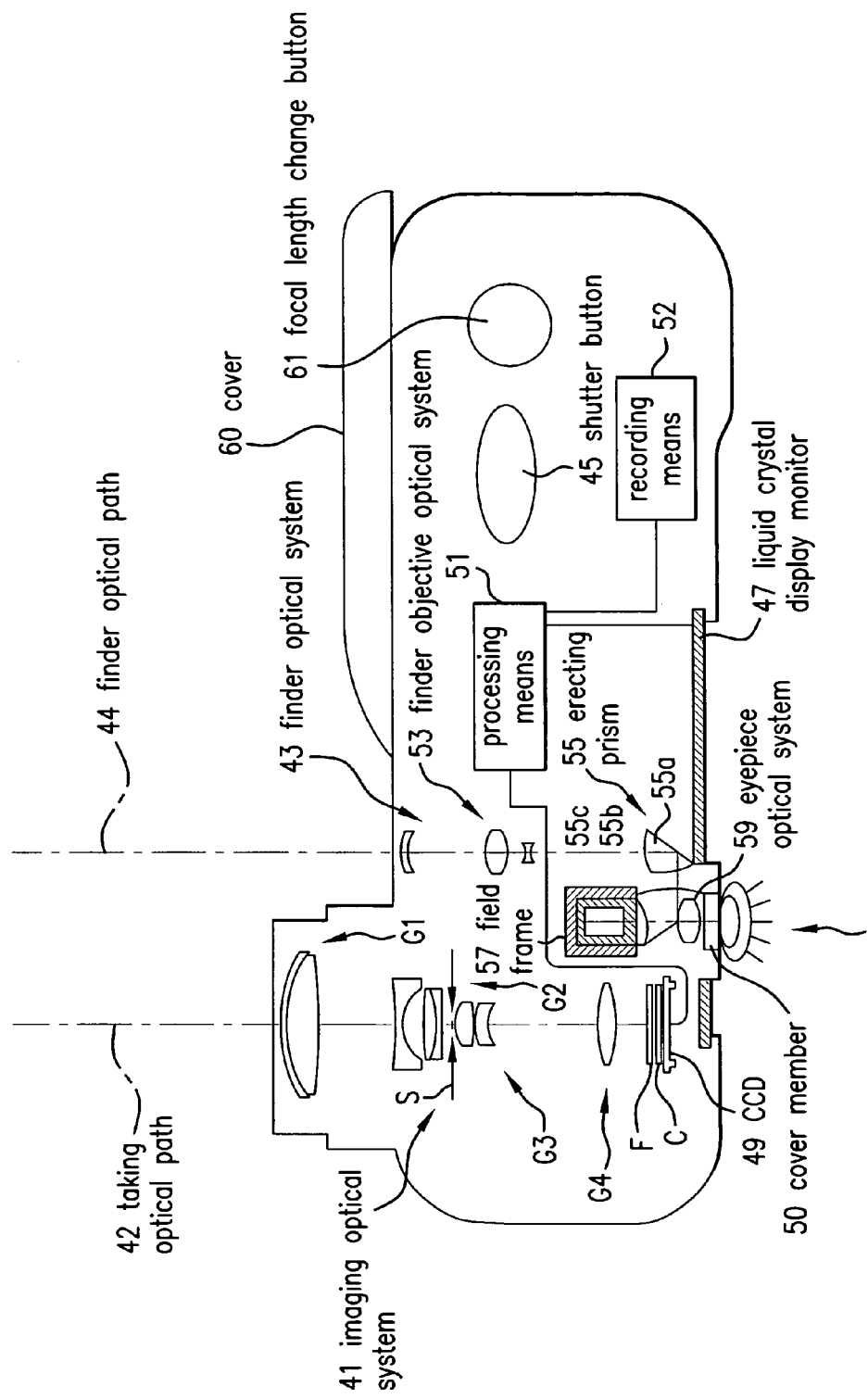
FIG. 23 is a sectional view of the digital camera of FIG. 21.

FIGS. 21, 22 and 23 are conceptual illustrations of a digital camera, in which such an inventive zoom lens as set forth above is incorporated in a taking optical system 41. FIG. 21 is a front perspective view of the appearance of a digital camera 40; FIG. 22 is a rear perspective view of the same; and FIG. 23 is a schematic sectional view of the setup of the digital camera 40. However, FIGS. 21 and 23 show the taking optical system 41 in operation. In the embodiment here, the digital camera 40 comprises a taking optical system 41 positioned on a taking optical path 42, a finder optical system 43 positioned on a finder optical path 44, a shutter button 45, a flash 46, a liquid crystal display monitor 47, a focal length change button 61, a mode select switch 62, and so on. With the taking optical system 41 received at a lens mount, a cover 60 is slid over the taking optical system 41, finder optical system 43 and flash 46. And, as the cover 60 is slid open to place the camera 40 in operation, the taking optical system 41 is let out, as in FIG. 23. As the shutter 45 mounted on the upper portion of the camera 40 is pressed down, it causes an image to be taken through the taking optical system 41, for instance, the zoom optical system of Example 1. An object image formed by the taking optical system 41 is formed on the imaging plane (photoelectric transformation plane) of CCD 49 via a low-pass filter F with a wavelength limiting coating applied on it and a cover glass C. An object image received at CCD 49 is shown as an electronic image on the liquid crystal display monitor 47 via processing means 51, which monitor is mounted on the back of the camera. This processing means 51 is connected with recording means 52 in which the taken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera could also be set up in the form of a silver-halide camera using a silver-halide film in place of CCD 49.

Moreover, a finder objective optical system 53 is located on the finder optical path 44. The finder objective optical system 53 comprises a zoom optical system which is made up of a plurality of lens groups (three in FIGS. 21-23) and an erecting prism system 55 composed of erecting prisms 55a, 55b and 55c, and whose focal length varies in association with the zoom optical system that is the taking optical system 41. An object image formed by the finder objective optical system 53 is in turn formed on the field frame 57 of the erecting prism system 55 that is an image-erecting member. In the rear of the erecting prism system 55 there is an eyepiece optical system 59 located for guiding an erected image into the eyeball E of an observer. It is here noted that a cover member 50 is provided on the exit side of the eyepiece optical system 59.

Figure 24:
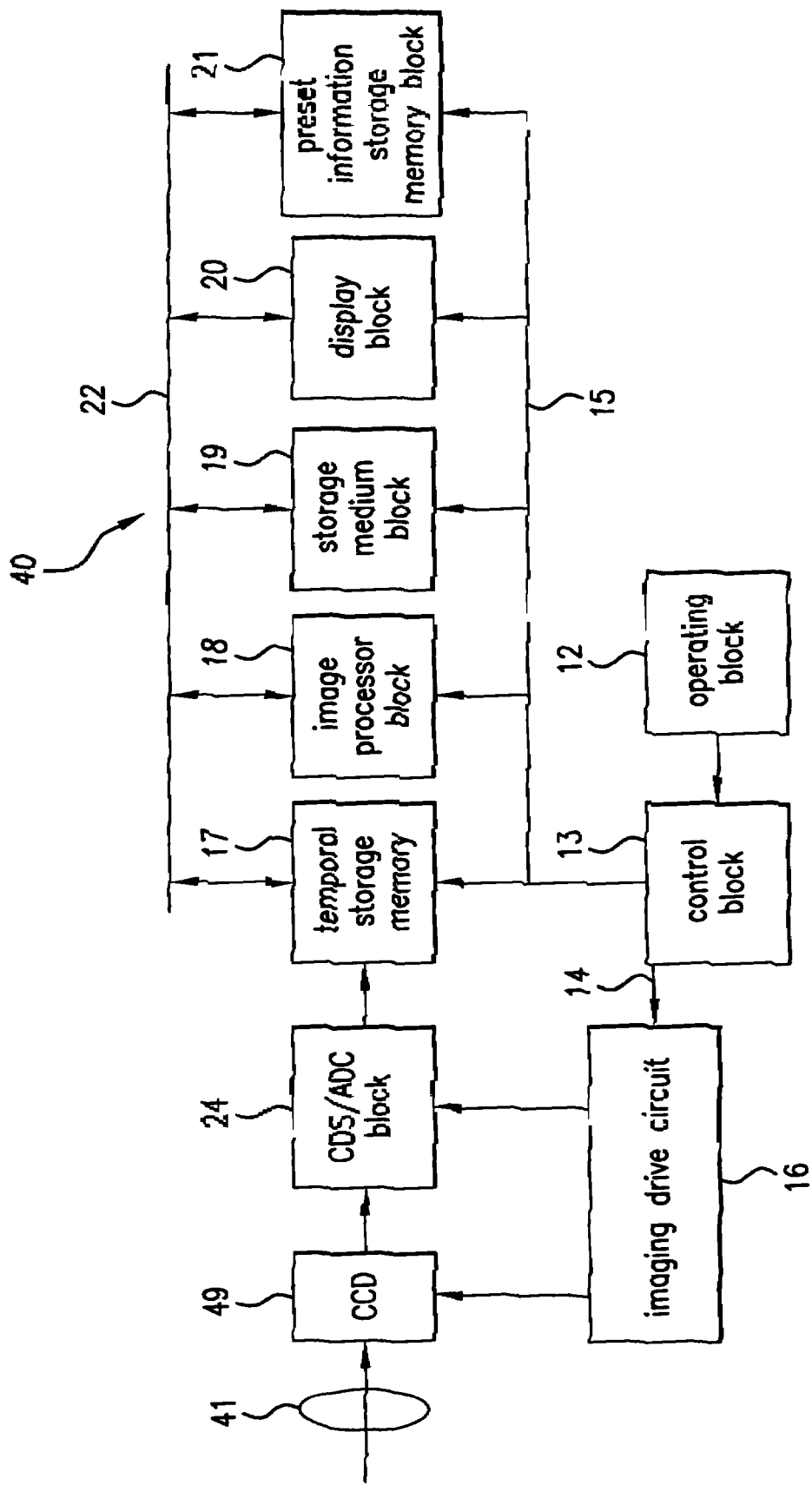
FIG. 24 is a block diagram illustrative of the construction of internal circuits in part of the digital camera of FIG. 21.

FIG. 24 is a block diagram for the internal circuits of the main part of the aforesaid digital camera 40. In the following explanation, the aforesaid processing means 51 comprises, for instance, a CDS/ADC block 24, a temporal storage memory block 17, an image processor block 18 and so on, and the storage means 52 comprises, for instance, a storage medium block 19 and so on.

As shown in FIG. 24, the digital camera 40 is built up of an operating block 12, a control block 13 connected to the operating block 12 and an imaging drive circuit 16 connected to the control signal output port of the control block 13 via buses 14 and 15 as well as a temporal storage memory block 17, an image processor block 18, a storage medium block 19, a display block 20 and a preset information storage memory block 21.

Data may be entered in or produced out of the aforesaid temporal storage memory block 17, image processor block 18, storage medium block 19, display block 20 and preset information storage memory block 21 via a bus 22, and the imaging drive circuit 16 is connected with CCD 49 and CDS/ADC block 24.

The operating block 12 comprising various input buttons and switches is a circuit through which event information entered from outside (a camera operator) via such input buttons and switches is notified to the control block. The control block 13 is a central processor comprising a CPU as an example: it is a circuit that, according to a program loaded in a program memory (not shown) stored therein, puts the whole digital camera 40 under control in response to the instruction and order entered by the camera operator via the operating block 12.

The CCD 49 receives an object image formed through the inventive taking optical system 41. The CCD 49 is an imaging device that is driven and controlled by the imaging drive circuit 16 to convert the quantity of light of that object image for each pixel into an electric signal and produce it to the CDS/ADC block 24.

The CDS/ADC block 24 is a circuit that amplifies an electric signal entered from CCD 49 and subjects it to analog/digital conversion to produce image raw data (Bayer data: hereinafter called RAW data) only subjected to such amplification and digital conversion to the temporal storage memory 17.

The temporal storage memory 17 is a buffer comprising SDRAM for instance: it is a memory device that temporarily stores the aforesaid RAW data produced out of the CDS/ADC block 24. The image processor block 18 is a circuit that reads the RAW data stored in the temporal storage memory 17 or the RAW data stored in the storage medium 19 to implement a variety of image processing including distortion correction on the basis of an image quality parameter designated from the control block 13.

The recording medium block 19 is a control circuit that detachably receives a card type or stick type recording medium comprising, for instance, a flash memory or the like so that the RAW data transferred from the temporal storage memory 17 or the image data subjected to image processing at the image processor block 18 are recorded and loaded in the card type or stick type flash memory.

The display block 20 is a circuit that comprises a liquid crystal display monitor 47 to display images, menus or the like on that liquid crystal display monitor 47. The preset information storage memory block 21 comprises a ROM block having various image quality parameters previously loaded in it and a RAM block in which an image quality parameter selected by input operation at the operating block 12 from the image quality parameters read out of that ROM block is stored. The preset information storage memory block 21 is a circuit that puts inputs in and outputs from those memories under control.

With the thus constructed digital camera 40, it is possible to achieve high performance, size reductions and a wide-angle arrangement, because the taking optical system 41 incorporated in it has high zoom capabilities and extremely stable image-formation capabilities all over the zoom range, albeit having a sufficient wide-angle arrangement and compact construction. And faster focusing operation is achievable on the wide-angle and telephoto sides.

The present invention may be applied to just only the so-called compact digital camera adapted to take pictures of general subjects but also surveillance cameras required to have wide angles of view and lens interchangeable type cameras.

What is claimed is:

1. A zoom lens comprising, in order from an object side thereof,
a first lens group having positive refracting power,
a second lens group having negative refracting power,
a third lens group having positive refracting power, and
a fourth lens group having positive refracting power,
wherein:
zooming is implemented by changing a spacing between the respective lens groups;
said first lens group consists of, in order from the object side,
a negative lens element, and
a positive lens element; and
the following conditions are satisfied:

$$5.0 < f_t/f_w < 50.0 \tag{1}$$

$$1.4 < N_{d1p} < 1.7 \tag{2}$$

where $f_w$ is a focal length of the whole zoom lens system at a wide-angle end, $f_t$ is a focal length of the whole zoom lens system at a telephoto end, and $N_{d1p}$ is the d-line refractive index of the positive lens in said first lens group.

2. The zoom lens according to claim 1, which further satisfies the following conditions:

$$1.99 < N_{d1n} < 2.3 \tag{4}$$

$$13.0 < v_{d1n} < 35.0 \tag{5}$$

$$0.02 < d_{1n}/d_{1p} < 0.35 \tag{6}$$

where $N_{d1n}$ is a d-line refractive index of the negative lens in said first lens group, $v_{d1n}$ is an Abbe constant of the negative lens in said first lens group, $d_{1n}$ is an axial thickness of the negative lens in said first lens group, and $d_{1p}$ is a axial thickness of the positive lens in said first lens group.

3. The zoom lens according to claim 1, which further satisfies the following condition:

$$15.0 < (R_{nr}+R_{nf})/(R_{nr}-R_{nf}) < -1.0 \tag{7}$$

where $R_{nr}$ is a radius of curvature of an image plane side of the negative lens in said first lens group, and $R_{nf}$ is a radius of curvature of an object side of the negative lens in said first lens group.

4. The zoom lens according to claim 1, which further satisfies the following conditions:

$$0.20 < N_{d1n} - N_{d1p} < 0.70 \tag{8}$$

$$35 < v_{d1p} - v_{d1n} < 80 \tag{9}$$

$$0.02 < d_{1n}/d_{1p} < 0.35 \tag{10}$$

where $N_{d1n}$ is a d-line refractive index of the negative lens in said first lens group, $v_{d1n}$ is an Abbe constant of the negative lens in said first lens group, $N_{d1p}$ is a d-line refractive index of the positive lens in said first lens group, $v_{d1p}$ is an Abbe constant of the positive lens in said first lens group, $d_1$ is an axial thickness of the negative lens in said first lens group, and $d_{1p}$ is a axial thickness of the positive lens in said first lens group.

5. The zoom lens according to claim 1, which further satisfies the following condition:

$$0.2 < f_1/f_t < 1.0 \tag{10}$$

where $f_1$ is a focal length of said first lens group, and $f_t$ is a focal length of the whole zoom lens system at the telephoto end.

6. The zoom lens according to claim 1, which further satisfies the following condition:

$$-0.5 < f_2/f_t < -0.05 \quad (11)$$

where $f_2$ is a focal length of said second lens group, and $f_t$ is a focal length of the whole zoom lens system at the telephoto end.

7. The zoom lens according to claim 1, which comprises a total of up to nine lenses.

8. An imaging apparatus comprising:
   a zoom lens as recited in claim 1, and
   an imaging device adapted to convert an image formed through said zoom lens into electric signals.

9. The imaging apparatus according to claim 8, which further satisfies the following condition:

$$0.5 < I_{mw}/f_w < 1.0 \quad (12)$$

where $I_{mw}$ is an image height at the wide-angle end, and $f_w$ is a focal length of the whole zoom lens system at the wide-angle end.

10. The imaging apparatus according to claim 8, which further satisfies the following condition:

$$5.0 < L_t/I_{mw} < 17.5 \quad (13)$$

where $L_t$ is a total length of the whole zoom lens system at the telephoto end, and $I_{mw}$ is an image height at the wide-angle end.

11. The imaging apparatus according to claim 8, which further comprises an image transformation block wherein electric signals containing distortion from said zoom lens are converted into image signals with distortion corrected by image processing.

12. The imaging apparatus according to claim 11, which further comprises an image transformation block wherein electric signals of an image taken by said zoom lens are converted into image signals with a color shift that results from chromatic aberration of magnification and is corrected by image processing.

13. A zoom lens comprising, in order from an object side thereof,
   a first lens group having positive refracting power,
   a second lens group having negative refracting power,
   a third lens group having positive refracting power, and
   a fourth lens group having positive refracting power,
   wherein:
   zooming is implemented by changing a spacing between the respective lens groups;
   said first lens group consists of, in order from the object side,
   a negative lens element, and
   a positive lens element; and
   the following conditions are satisfied:

$$0.8 < ((R_{pr}+R_{pf})/(R_{pr}-R_{pf})+1)/N_{d1p} < 1.4 \quad (3)$$

$$5.0 < f_t/f_w < 50.0 \quad (1)$$

where $R_{pr}$ is a radius of curvature of an image-side surface of the positive lens in said first lens group, $R_{pf}$ is a radius of curvature of an object-side surface of the positive lens in said first lens group, $N_{d1p}$ is the d-line refractive index of the positive lens in the aforesaid first lens group, $f_w$ is a focal length of the whole zoom lens system at a wide-angle end, and $f_t$ is a focal length of the whole zoom lens system at a telephoto end.

14. The zoom lens according to claim 13, which further satisfies the following conditions:

$$1.99 < N_{d1n} < 2.3 \quad (4)$$

$$13.0 < V_{d1n} < 35.0 \quad (5)$$

$$0.02 < d_{1n}/d_{1p} < 0.35 \quad (6)$$

where $N_{d1n}$ is a d-line refractive index of the negative lens in said first lens group, $v_{d1n}$ is an Abbe constant of the negative lens in said first lens group, $d_{1n}$ is an axial thickness of the negative lens in said first lens group, and $d_{1p}$ is a axial thickness of the positive lens in said first lens group.

15. The zoom lens according to claim 13, which further satisfies the following condition:

$$-15.0 < (R_{nr}+R_{nf})/(R_{nr}-R_{nf}) < -1.0 \quad (7)$$

where $R_{nr}$ is a radius of curvature of an image plane side of the negative lens in said first lens group, and $R_{nf}$ is a radius of curvature of an object side of the negative lens in said first lens group.

16. The zoom lens according to claim 13, which further satisfies the following conditions:

$$0.20 < N_{d1n}-N_{d1p} < 0.70 \quad (8)$$

$$35 < v_{d1p}-v_{d1n} < 80 \quad (9)$$

$$0.02 < d_{1n}/d_{1p} < 0.35 \quad (10)$$

where $N_{d1n}$ is a d-line refractive index of the negative lens in said first lens group, $v_{d1n}$ is an Abbe constant of the negative lens in said first lens group, $N_{d1p}$ is a d-line refractive index of the positive lens in said first lens group, $v_{d1p}$ is an Abbe constant of the positive lens in said first lens group, $d_{1n}$ is an axial thickness of the negative lens in said first lens group, and $d_{1p}$ is a axial thickness of the positive lens in said first lens group.

17. The zoom lens according to claim 13, which further satisfies the following condition:

$$0.2 < f_1/f_t < 1.0 \quad (10)$$

where $f_1$ is a focal length of said first lens group, and $f_t$ is a focal length of the whole zoom lens system at the telephoto end.

18. The zoom lens according to claim 13, which further satisfies the following condition:

$$-0.5 < f_2/f_t < -0.05 \quad (11)$$

where $f_2$ is a focal length of said second lens group, and $f_t$ is a focal length of the whole zoom lens system at the telephoto end.

19. The zoom lens according to claim 13, which further comprises an aperture stop, and wherein upon zooming from the wide-angle end to the telephoto end,
   said first lens group moves in such a way as to be positioned more on the object side at the telephoto end than at the wide-angle end,
   said second lens group moves,
   said third lens group moves in such a way as to be positioned more on the object side at the telephoto end than at the wide-angle end,
   said fourth lens group moves, and
   said aperture stop moves.

20. The zoom lens according to claim 13, which comprises a total of up to nine lenses.

21. An imaging apparatus comprising:
a zoom lens as recited in claim 13, and
an imaging device adapted to convert an image formed through said zoom lens into electric signals.

22. The imaging apparatus according to claim 21, which further satisfies the following condition:

$$0.5 < I_{mw}/f_w < 1.0 \tag{12}$$

where $I_{mw}$ is an image height at the wide-angle end, and $f_w$ is a focal length of the whole zoom lens system at the wide-angle end.

23. The imaging apparatus according to claim 21, which further satisfies the following condition:

$$5.0 < L_t/I_{mw} < 17.5 \tag{13}$$

where $L_t$ is a total length of the whole zoom lens system at the telephoto end, and $I_{mw}$ is an image height at the wide-angle end.

24. The imaging apparatus according to claim 21, which further comprises an image transformation block wherein electric signals containing distortion from said zoom lens are converted into image signals with distortion corrected by image processing.

25. The imaging apparatus according to claim 24, which further comprises an image transformation block wherein electrical signals of an image taken by said zoom lens are converted into image signals with a color shift that results from chromatic aberration of magnification and is corrected by image processing.

* * * * *